United States Patent
Odell et al.

(10) Patent No.: US 10,033,669 B2
(45) Date of Patent: Jul. 24, 2018

(54) MANAGING ELECTRONIC MESSAGES SENT TO REPLY TELEPHONE NUMBERS

(71) Applicant: Facebook, Inc., Menlo Park, CA (US)

(72) Inventors: James A. Odell, Potomac Falls, VA (US); Barry Appelman, McLean, VA (US); Andrew L. Wick, McLean, VA (US); Alan Keister, Oakton, VA (US); Raine Bergstrom, Shoreline, WA (US); Xiaoyan Yin, Fairfax Station, VA (US); Barbara McNally, Leesburg, VA (US); Keith C. Hullfish, Snohomish, WA (US)

(73) Assignee: FACEBOOK, INC., Menlo Park, CA (US)

( * ) Notice: Subject to any disclaimer, the term of this patent is extended or adjusted under 35 U.S.C. 154(b) by 694 days.

(21) Appl. No.: 14/447,905

(22) Filed: Jul. 31, 2014

(65) Prior Publication Data
US 2014/0344385 A1 Nov. 20, 2014

Related U.S. Application Data

(63) Continuation of application No. 14/322,834, filed on Jul. 2, 2014, which is a continuation of application
(Continued)

(51) Int. Cl.
*G06F 15/16* (2006.01)
*H04L 12/58* (2006.01)
(Continued)

(52) U.S. Cl.
CPC ............ *H04L 51/04* (2013.01); *G06F 3/0482* (2013.01); *G06Q 10/107* (2013.01); *H04L 51/14* (2013.01);
(Continued)

(58) Field of Classification Search
CPC . G06Q 10/107; G06F 3/0482; H04M 3/42382
See application file for complete search history.

(56) References Cited

U.S. PATENT DOCUMENTS

| 4,649,481 A | 3/1987 | Takahashi |
| 4,650,927 A | 3/1987 | James |

(Continued)

FOREIGN PATENT DOCUMENTS

| CA | 2547240 | 12/2009 |
| CA | 2506417 | 6/2011 |

(Continued)

OTHER PUBLICATIONS

U.S. Appl. No. 13/619,036, Jun. 9, 2016, Office Action.
(Continued)

*Primary Examiner* — Larry Donaghue
(74) *Attorney, Agent, or Firm* — Keller Jolley Preece

(57) ABSTRACT

A graphical user interface on a display device of a computer enables communications using a computer service. The graphical user interface includes a list of potential message recipients selected by a user as significant to the user. The graphical user interface also includes a mobile device identifier associated with one or more of the listed potential message recipients and a user account identifier associated with one or more of the listed potential message recipients. At least one of the listed potential recipients includes a mobile device identifier as the only available conduit for data delivery to the potential message recipient using the computer service.

20 Claims, 42 Drawing Sheets

Related U.S. Application Data

No. 13/442,226, filed on Apr. 9, 2012, now Pat. No. 9,356,890, which is a continuation of application No. 12/548,338, filed on Aug. 26, 2009, now Pat. No. 8,156,193, which is a continuation of application No. 10/895,421, filed on Jul. 21, 2004, now Pat. No. 7,590,696, and a continuation-in-part of application No. 10/723,040, filed on Nov. 26, 2003, now Pat. No. 7,428,580, and a continuation-in-part of application No. 10/715,213, filed on Nov. 18, 2003, now Pat. No. 8,701,014.

(60) Provisional application No. 60/488,749, filed on Jul. 22, 2003, provisional application No. 60/488,376, filed on Jul. 21, 2003, provisional application No. 60/456,963, filed on Mar. 25, 2003, provisional application No. 60/427,566, filed on Nov. 20, 2002, provisional application No. 60/426,806, filed on Nov. 18, 2002.

(51) Int. Cl.
*G06Q 10/10* (2012.01)
*G06F 3/0482* (2013.01)
*H04M 3/42* (2006.01)
*H04L 29/08* (2006.01)

(52) U.S. Cl.
CPC .............. *H04L 51/28* (2013.01); *H04L 51/32* (2013.01); *H04L 51/38* (2013.01); *H04L 67/306* (2013.01); *H04M 3/42382* (2013.01)

(56) References Cited

U.S. PATENT DOCUMENTS

| | | |
|---|---|---|
| 4,817,129 A | 3/1989 | Riskin |
| 4,837,798 A | 6/1989 | Cohen et al. |
| 5,008,853 A | 4/1991 | Bly et al. |
| 5,021,949 A | 6/1991 | Morten et al. |
| 5,025,252 A | 6/1991 | DeLuca et al. |
| 5,086,394 A | 2/1992 | Shapira |
| 5,101,424 A | 3/1992 | Clayto et al. |
| 5,276,905 A | 1/1994 | Hurst et al. |
| 5,315,636 A | 5/1994 | Patel |
| 5,329,619 A | 7/1994 | Page et al. |
| 5,351,235 A | 9/1994 | Lahtinen |
| 5,425,028 A | 6/1995 | Bitton et al. |
| 5,436,960 A | 7/1995 | Campana, Jr. et al. |
| 5,438,611 A | 8/1995 | Campana, Jr. et al. |
| 5,440,551 A | 8/1995 | Suzuki |
| 5,448,566 A | 9/1995 | Richter et al. |
| 5,448,567 A | 9/1995 | Dighe et al. |
| 5,459,458 A | 10/1995 | Richardson et al. |
| 5,479,472 A | 12/1995 | Campana, Jr. et al. |
| 5,487,100 A | 1/1996 | Kane |
| 5,491,800 A | 2/1996 | Goldsmith et al. |
| 5,497,463 A | 3/1996 | Stein et al. |
| 5,499,343 A | 3/1996 | Pettus |
| 5,548,637 A | 8/1996 | Heller |
| 5,555,346 A | 9/1996 | Gross et al. |
| 5,557,320 A | 9/1996 | Krebs |
| 5,559,949 A | 9/1996 | Reimer et al. |
| 5,561,703 A | 10/1996 | Arledge et al. |
| 5,568,536 A | 10/1996 | Tiller et al. |
| 5,572,643 A | 11/1996 | Judson |
| 5,579,472 A | 11/1996 | Keyworth, II et al. |
| 5,590,133 A | 12/1996 | Bilstrom et al. |
| 5,592,538 A | 1/1997 | Kosowsky et al. |
| 5,604,788 A | 2/1997 | Tett |
| 5,608,786 A | 3/1997 | Gordon |
| 5,615,336 A | 3/1997 | Robson et al. |
| 5,619,648 A | 4/1997 | Canale et al. |
| 5,625,670 A | 4/1997 | Campana, Jr. et al. |
| 5,631,946 A | 5/1997 | Campana, Jr. et al. |
| 5,634,129 A | 5/1997 | Dickinson |
| 5,646,982 A | 7/1997 | Hogan et al. |
| 5,673,308 A | 9/1997 | Akhavan |
| 5,678,179 A | 10/1997 | Turcotte et al. |
| 5,684,494 A | 11/1997 | Nathrath et al. |
| 5,694,616 A | 12/1997 | Johnson |
| 5,697,060 A | 12/1997 | Akahane |
| 5,706,211 A | 1/1998 | Beletic et al. |
| 5,706,501 A | 1/1998 | Horikiri |
| 5,710,884 A | 1/1998 | Dedrick |
| 5,726,984 A | 3/1998 | Kubler et al. |
| 5,737,726 A | 4/1998 | Cameron et al. |
| 5,742,668 A | 4/1998 | Pepe et al. |
| 5,742,905 A | 4/1998 | Pepe et al. |
| 5,749,081 A | 5/1998 | Whiteis et al. |
| 5,760,771 A | 6/1998 | Blonder et al. |
| 5,761,196 A | 6/1998 | Ayerst et al. |
| 5,764,916 A | 6/1998 | Busey et al. |
| 5,771,280 A | 6/1998 | Johnson et al. |
| 5,774,673 A | 6/1998 | Beuk |
| 5,793,365 A | 8/1998 | Tang et al. |
| 5,793,762 A | 8/1998 | Penners et al. |
| 5,796,394 A | 8/1998 | Wicks et al. |
| 5,796,948 A | 8/1998 | Cohen |
| 5,799,157 A | 8/1998 | Escallon |
| 5,799,284 A | 8/1998 | Bourquin |
| 5,802,466 A | 9/1998 | Gallant et al. |
| 5,802,470 A | 9/1998 | Gaulke et al. |
| 5,812,865 A | 9/1998 | Theimer et al. |
| 5,819,084 A | 10/1998 | Shapiro et al. |
| 5,826,025 A | 10/1998 | Gramlich |
| 5,835,089 A | 11/1998 | Skarbo et al. |
| 5,835,722 A | 11/1998 | Bradshaw et al. |
| 5,835,905 A | 11/1998 | Pirolli et al. |
| 5,845,073 A | 12/1998 | Carlin et al. |
| 5,845,300 A | 12/1998 | Comer et al. |
| 5,864,684 A | 1/1999 | Nielsen |
| 5,864,874 A | 1/1999 | Shapiro |
| 5,867,162 A | 2/1999 | O'Leary |
| 5,870,744 A | 2/1999 | Sprague |
| 5,872,521 A | 2/1999 | Lopatukin et al. |
| 5,873,108 A | 2/1999 | Goyal et al. |
| 5,878,219 A | 3/1999 | Vance, Jr. et al. |
| 5,878,233 A | 3/1999 | Schloss |
| 5,878,397 A | 3/1999 | Stille et al. |
| 5,895,454 A | 4/1999 | Harrington |
| 5,896,321 A | 4/1999 | Miller et al. |
| 5,897,635 A | 4/1999 | Torres et al. |
| 5,903,726 A | 5/1999 | Donovan et al. |
| 5,913,032 A | 6/1999 | Schwartz et al. |
| 5,933,477 A | 8/1999 | Wu |
| 5,938,725 A | 8/1999 | Hara |
| 5,940,379 A | 8/1999 | Startup et al. |
| 5,940,488 A | 8/1999 | DeGrazia et al. |
| 5,944,791 A | 8/1999 | Scherpbier |
| 5,946,616 A | 8/1999 | Schornack |
| 5,946,617 A | 8/1999 | Portaro et al. |
| 5,946,629 A | 8/1999 | Sawyer et al. |
| 5,946,630 A | 8/1999 | Willars et al. |
| 5,950,193 A | 9/1999 | Kulkarni |
| 5,960,074 A | 9/1999 | Clark |
| 5,960,173 A | 9/1999 | Tang et al. |
| 5,960,429 A | 9/1999 | Peercy et al. |
| 5,961,620 A | 10/1999 | Trent et al. |
| 5,966,663 A | 10/1999 | Gleason |
| 5,970,122 A | 10/1999 | LaPorta et al. |
| 5,974,446 A | 10/1999 | Sonnenreich et al. |
| 5,978,673 A | 11/1999 | Alperovich et al. |
| 5,987,113 A | 11/1999 | James |
| 5,987,376 A | 11/1999 | Olson et al. |
| 5,999,932 A | 12/1999 | Paul |
| 6,006,331 A | 12/1999 | Chu et al. |
| 6,014,429 A | 1/2000 | LaPorta et al. |
| 6,014,711 A | 1/2000 | Brown |
| 6,020,884 A | 2/2000 | MacNaughton et al. |
| 6,026,429 A | 2/2000 | Jones et al. |
| 6,028,866 A | 2/2000 | Engel |
| 6,038,451 A | 3/2000 | Syed et al. |
| 6,041,311 A | 3/2000 | Chislenko et al. |

(56) References Cited

U.S. PATENT DOCUMENTS

| | | |
|---|---|---|
| 6,049,533 A | 4/2000 | Norman et al. |
| 6,064,723 A | 5/2000 | Cohen et al. |
| 6,065,047 A | 5/2000 | Carpenter et al. |
| 6,065,056 A | 5/2000 | Bradshaw et al. |
| 6,067,529 A | 5/2000 | Ray et al. |
| 6,067,561 A | 5/2000 | Dillon |
| 6,073,109 A | 6/2000 | Flores |
| 6,073,138 A | 6/2000 | de l'Etraz |
| 6,076,100 A | 6/2000 | Cottrille et al. |
| 6,078,820 A | 6/2000 | Wells et al. |
| 6,081,829 A | 6/2000 | Sidana |
| 6,081,830 A | 6/2000 | Schindler |
| 6,088,435 A | 7/2000 | Barber |
| 6,091,948 A | 7/2000 | Carr et al. |
| 6,091,958 A | 7/2000 | Bergkvist et al. |
| 6,092,049 A | 7/2000 | Chislenko et al. |
| 6,101,393 A | 8/2000 | Alperovich et al. |
| 6,112,078 A | 8/2000 | Sormunen et al. |
| 6,112,181 A | 8/2000 | Shear |
| 6,115,455 A | 8/2000 | Picard |
| 6,115,605 A | 9/2000 | Siccardo et al. |
| 6,119,014 A | 9/2000 | Alperovich et al. |
| 6,128,739 A | 10/2000 | Fleming, III |
| 6,134,432 A | 10/2000 | Holmes et al. |
| 6,134,582 A | 10/2000 | Kennedy |
| 6,138,146 A | 10/2000 | Moon et al. |
| 6,138,158 A | 10/2000 | Boyle et al. |
| 6,141,545 A | 10/2000 | Begeja et al. |
| 6,144,959 A | 11/2000 | Anderson |
| 6,148,328 A | 11/2000 | Cuomo et al. |
| 6,148,377 A | 11/2000 | Carter |
| 6,157,618 A | 12/2000 | Boss et al. |
| 6,161,129 A | 12/2000 | Rochkind |
| 6,161,130 A | 12/2000 | Horvitz et al. |
| 6,167,256 A | 12/2000 | Yla-Outinen |
| 6,169,911 B1 | 1/2001 | Wagner et al. |
| 6,175,831 B1 | 1/2001 | Weinreich et al. |
| 6,175,859 B1 | 1/2001 | Mohler |
| 6,178,331 B1 | 1/2001 | Holmes et al. |
| 6,185,603 B1 | 2/2001 | Henderson et al. |
| 6,189,026 B1 | 2/2001 | Birrell et al. |
| 6,192,396 B1 | 2/2001 | Kohler |
| 6,195,354 B1 | 2/2001 | Skalecki et al. |
| 6,198,738 B1 | 3/2001 | Chang et al. |
| 6,199,099 B1 | 3/2001 | Gershman et al. |
| 6,199,103 B1 | 3/2001 | Sakaguchi et al. |
| 6,208,996 B1 | 3/2001 | Ben-Shachar et al. |
| 6,212,175 B1 | 4/2001 | Harsch |
| 6,212,548 B1 | 4/2001 | DeSimone et al. |
| 6,212,550 B1 | 4/2001 | Segur |
| 6,223,177 B1 | 4/2001 | Tatham |
| 6,237,027 B1 | 5/2001 | Namekawa |
| 6,237,092 B1 | 5/2001 | Hayes, Jr. |
| 6,243,039 B1 | 6/2001 | Elliot |
| 6,243,714 B1 | 6/2001 | Shapiro et al. |
| 6,247,043 B1 | 6/2001 | Bates et al. |
| 6,252,952 B1 | 6/2001 | Kung et al. |
| 6,256,516 B1 | 7/2001 | Wagner et al. |
| 6,259,911 B1 | 7/2001 | Bims et al. |
| 6,260,148 B1 | 7/2001 | Aggarwal et al. |
| 6,269,369 B1 | 7/2001 | Robertson |
| 6,282,435 B1 | 8/2001 | Wagner et al. |
| 6,292,743 B1 | 9/2001 | Pu et al. |
| 6,301,609 B1 | 10/2001 | Aravamudan et al. |
| 6,304,864 B1 | 10/2001 | Liddy et al. |
| 6,311,211 B1 | 10/2001 | Shaw |
| 6,324,541 B1 | 11/2001 | de l'Etraz et al. |
| 6,327,590 B1 | 12/2001 | Chidlovski et al. |
| 6,330,590 B1 | 12/2001 | Cotten |
| 6,334,111 B1 | 12/2001 | Carrott |
| 6,337,712 B1 | 1/2002 | Shiota et al. |
| 6,343,317 B1 | 1/2002 | Glorikian |
| 6,347,332 B1 | 2/2002 | Malet |
| 6,349,299 B1 | 2/2002 | Spencer et al. |
| 6,351,777 B1 | 2/2002 | Simonoff |
| 6,360,251 B1 | 3/2002 | Fujita et al. |
| 6,363,248 B1 | 3/2002 | Silverman |
| 6,366,907 B1 | 4/2002 | Fanning |
| 6,374,246 B1 | 4/2002 | Matsuo |
| 6,374,260 B1 | 4/2002 | Hoffert et al. |
| 6,374,290 B1 | 4/2002 | Scharber |
| 6,389,127 B1 | 5/2002 | Vardi et al. |
| 6,389,372 B1 | 5/2002 | Glance et al. |
| 6,392,669 B1 | 5/2002 | Matoba et al. |
| 6,393,464 B1 | 5/2002 | Dieterman |
| 6,393,465 B2 | 5/2002 | Leeds |
| 6,396,512 B1 | 5/2002 | Nickerson |
| 6,404,438 B1 | 6/2002 | Hatleid |
| 6,405,035 B1 | 6/2002 | Singh |
| 6,415,318 B1 | 7/2002 | Aggarwal et al. |
| 6,421,439 B1 | 7/2002 | Liffick |
| 6,421,675 B1 | 7/2002 | Ryan |
| 6,421,709 B1 | 7/2002 | McCormick et al. |
| 6,423,012 B1 | 7/2002 | Kato et al. |
| 6,425,012 B1 | 7/2002 | Trovato et al. |
| 6,430,602 B1 | 8/2002 | Kay et al. |
| 6,430,604 B1 | 8/2002 | Ogle et al. |
| 6,434,599 B1 | 8/2002 | Porter |
| 6,442,589 B1 | 8/2002 | Takahashi et al. |
| 6,442,591 B1 | 8/2002 | Haynes et al. |
| 6,446,119 B1 | 9/2002 | Olah et al. |
| 6,449,344 B1 | 9/2002 | Goldfinger et al. |
| 6,449,634 B1 | 9/2002 | Capiel |
| 6,457,044 B1 | 9/2002 | Iwazaki |
| 6,457,062 B1 | 9/2002 | Pivowar |
| 6,460,073 B1 | 10/2002 | Asakura |
| 6,463,464 B1 | 10/2002 | Lazaridis et al. |
| 6,463,471 B1 | 10/2002 | Dreke et al. |
| 6,466,918 B1 | 10/2002 | Spiegel et al. |
| 6,480,885 B1 | 11/2002 | Olivier |
| 6,483,913 B1 | 11/2002 | Smith |
| 6,484,196 B1 | 11/2002 | Maurille |
| 6,487,583 B1 | 11/2002 | Harvey et al. |
| 6,487,584 B1 | 11/2002 | Bunney |
| 6,493,703 B1 | 12/2002 | Knight et al. |
| 6,493,744 B1 | 12/2002 | Emens et al. |
| 6,499,053 B1 | 12/2002 | Marquette |
| 6,505,167 B1 | 1/2003 | Horvitz et al. |
| 6,507,866 B1 | 1/2003 | Barchi |
| 6,512,570 B2 | 1/2003 | Garfinkle et al. |
| 6,512,930 B2 | 1/2003 | Sandegren |
| 6,519,629 B2 | 2/2003 | Harvey et al. |
| 6,519,639 B1 | 2/2003 | Glasser et al. |
| 6,519,648 B1 | 2/2003 | Eyal |
| 6,529,903 B2 | 3/2003 | Smith et al. |
| 6,535,228 B1 | 3/2003 | Bandaru et al. |
| 6,535,586 B1 | 3/2003 | Cloutier et al. |
| 6,539,421 B1 | 3/2003 | Appelman et al. |
| 6,542,500 B1 | 4/2003 | Gerzberg et al. |
| 6,549,933 B1 | 4/2003 | Barrett et al. |
| 6,549,937 B1 | 4/2003 | Auerbach et al. |
| 6,557,027 B1 | 4/2003 | Cragun |
| 6,564,213 B1 | 5/2003 | Ortega et al. |
| 6,564,261 B1 | 5/2003 | Gudjonsson et al. |
| 6,564,264 B1 | 5/2003 | Creswell et al. |
| 6,567,796 B1 | 5/2003 | Yost et al. |
| 6,567,807 B1 | 5/2003 | Robles |
| 6,571,234 B1 | 5/2003 | Knight et al. |
| 6,574,484 B1 | 6/2003 | Carley |
| 6,583,799 B1 | 6/2003 | Manolis et al. |
| 6,584,494 B1 | 6/2003 | Manabe et al. |
| 6,591,291 B1 | 7/2003 | Gabber et al. |
| 6,594,673 B1 | 7/2003 | Smith et al. |
| 6,604,133 B2 | 8/2003 | Aggarwal et al. |
| 6,606,647 B2 | 8/2003 | Shah et al. |
| 6,606,657 B1 | 8/2003 | Zilberstein et al. |
| 6,611,822 B1 | 8/2003 | Beams |
| 6,615,237 B1 | 9/2003 | Kyne et al. |
| 6,615,241 B1 | 9/2003 | Miller et al. |
| 6,618,747 B1 | 9/2003 | Flynn et al. |
| 6,625,423 B1 | 9/2003 | Wang |
| 6,628,194 B1 | 9/2003 | Hellebust et al. |
| 6,633,630 B1 | 10/2003 | Owens et al. |

(56) References Cited

U.S. PATENT DOCUMENTS

| | | | |
|---|---|---|---|
| 6,636,733 B1 * | 10/2003 | Helferich | H04L 12/6418 |
| | | | 379/88.17 |
| 6,636,850 B2 | 10/2003 | Lepien | |
| 6,636,888 B1 | 10/2003 | Bookspan et al. | |
| 6,640,218 B1 | 10/2003 | Golding | |
| 6,640,223 B1 | 10/2003 | Jones et al. | |
| 6,643,641 B1 | 11/2003 | Snyder | |
| 6,643,669 B1 | 11/2003 | Novak et al. | |
| 6,647,259 B1 | 11/2003 | Boyle et al. | |
| 6,647,383 B1 | 11/2003 | August et al. | |
| 6,654,800 B1 | 11/2003 | Rieger, III | |
| 6,658,095 B1 | 12/2003 | Yoakum et al. | |
| 6,658,260 B2 | 12/2003 | Knotts | |
| 6,665,676 B2 | 12/2003 | Twig et al. | |
| 6,665,715 B1 | 12/2003 | Houri | |
| 6,677,968 B1 | 1/2004 | Appelman | |
| 6,678,719 B1 | 1/2004 | Stimmel | |
| 6,684,240 B1 | 1/2004 | Goddard | |
| 6,687,362 B1 | 2/2004 | Lindquist et al. | |
| 6,687,739 B2 | 2/2004 | Anupam | |
| 6,687,745 B1 | 2/2004 | Franco et al. | |
| 6,691,162 B1 | 2/2004 | Wick | |
| 6,694,353 B2 | 2/2004 | Sommerer | |
| 6,697,807 B2 | 2/2004 | McGeachie | |
| 6,697,824 B1 | 2/2004 | Bowman-Amuah | |
| 6,697,840 B1 | 2/2004 | Godefroid | |
| 6,699,125 B2 | 3/2004 | Kirmse et al. | |
| 6,701,343 B1 | 3/2004 | Kenyon | |
| 6,701,348 B2 | 3/2004 | Sommerer | |
| 6,701,351 B1 | 3/2004 | Gann | |
| 6,704,727 B1 | 3/2004 | Kravets | |
| 6,708,205 B2 | 3/2004 | Sheldon et al. | |
| 6,711,565 B1 | 3/2004 | Subramaniam et al. | |
| 6,714,519 B2 | 3/2004 | Luzzatti et al. | |
| 6,714,791 B2 | 3/2004 | Friedman | |
| 6,714,793 B1 | 3/2004 | Carey et al. | |
| 6,721,784 B1 | 4/2004 | Leonard et al. | |
| 6,728,357 B2 | 4/2004 | O'Neal et al. | |
| 6,731,308 B1 | 5/2004 | Tang et al. | |
| 6,732,103 B1 | 5/2004 | Strick et al. | |
| 6,732,155 B2 | 5/2004 | Meek | |
| 6,732,185 B1 | 5/2004 | Reistad | |
| 6,750,881 B1 | 6/2004 | Appelman | |
| 6,751,603 B1 | 6/2004 | Bauer et al. | |
| 6,754,904 B1 | 6/2004 | Cooper et al. | |
| 6,757,365 B1 | 6/2004 | Bogard | |
| 6,757,531 B1 | 6/2004 | Haaramo | |
| 6,760,412 B1 | 7/2004 | Loucks | |
| 6,760,580 B2 | 7/2004 | Robinson et al. | |
| 6,760,753 B1 | 7/2004 | Ohgushi et al. | |
| 6,760,754 B1 | 7/2004 | Isaacs et al. | |
| 6,772,188 B1 | 8/2004 | Cloutier | |
| 6,781,608 B1 | 8/2004 | Crawford | |
| 6,782,414 B1 | 8/2004 | Xue et al. | |
| 6,785,554 B1 | 8/2004 | Amerga | |
| 6,788,769 B1 | 9/2004 | Waites | |
| 6,799,039 B2 | 9/2004 | Wu et al. | |
| 6,800,031 B2 | 10/2004 | Di Cesare | |
| 6,801,659 B1 | 10/2004 | O'Dell | |
| 6,807,562 B1 | 10/2004 | Pennock et al. | |
| 6,816,884 B1 | 11/2004 | Summers | |
| 6,829,607 B1 | 12/2004 | Tafoya et al. | |
| 6,832,245 B1 | 12/2004 | Isaacs et al. | |
| 6,839,554 B2 | 1/2005 | McDowell | |
| 6,839,735 B2 | 1/2005 | Wong et al. | |
| 6,839,737 B1 | 1/2005 | Friskel | |
| 6,848,008 B1 | 1/2005 | Sevanto et al. | |
| 6,848,542 B2 | 2/2005 | Gailey et al. | |
| 6,853,982 B2 | 2/2005 | Smith et al. | |
| 6,854,007 B1 | 2/2005 | Hammond | |
| 6,856,999 B2 | 2/2005 | Flanagin et al. | |
| 6,868,498 B1 | 3/2005 | Katsikas | |
| 6,895,426 B1 | 5/2005 | Cortright et al. | |
| 6,895,427 B1 | 5/2005 | Quine et al. | |
| 6,898,626 B2 | 5/2005 | Ohashi | |
| 6,901,398 B1 | 5/2005 | Horvitz et al. | |
| 6,901,559 B1 | 5/2005 | Blum | |
| 6,904,026 B1 | 6/2005 | Tarnanen et al. | |
| 6,907,243 B1 | 6/2005 | Patel | |
| 6,912,505 B2 | 6/2005 | Linden et al. | |
| 6,912,563 B1 | 6/2005 | Parker et al. | |
| 6,912,564 B1 | 6/2005 | Appelman et al. | |
| 6,917,813 B2 | 7/2005 | Elizondo | |
| 6,917,965 B2 | 7/2005 | Gupta et al. | |
| 6,920,478 B2 | 7/2005 | Mendiola et al. | |
| 6,925,469 B2 | 8/2005 | Headings et al. | |
| 6,931,419 B1 | 8/2005 | Lindquist | |
| 6,934,367 B1 | 8/2005 | LaPierre et al. | |
| 6,952,805 B1 | 10/2005 | Tafoya et al. | |
| 6,957,077 B2 | 10/2005 | Dehlin | |
| 6,985,943 B2 | 1/2006 | Deryugin et al. | |
| 6,990,628 B1 | 1/2006 | Palmer et al. | |
| 6,993,325 B1 | 1/2006 | Wasterlid | |
| 6,999,566 B1 | 2/2006 | Eason et al. | |
| 6,999,959 B1 | 2/2006 | Lawrence et al. | |
| 7,003,551 B2 | 2/2006 | Malik | |
| 7,003,794 B2 | 2/2006 | Ayre | |
| 7,007,008 B2 | 2/2006 | Goel et al. | |
| 7,007,228 B1 | 2/2006 | Carro | |
| 7,010,312 B1 | 3/2006 | Zechlin | |
| 7,016,978 B2 | 3/2006 | Malik et al. | |
| 7,020,849 B1 | 3/2006 | Chen | |
| 7,031,961 B2 | 4/2006 | Pitkow et al. | |
| 7,032,007 B2 | 4/2006 | Fellenstein et al. | |
| 7,035,865 B2 | 4/2006 | Doss et al. | |
| 7,035,926 B1 | 4/2006 | Cohen et al. | |
| 7,039,639 B2 | 5/2006 | Brezin et al. | |
| 7,054,918 B2 | 5/2006 | Poleyn | |
| 7,058,036 B1 | 6/2006 | Yu et al. | |
| 7,058,690 B2 | 6/2006 | Maehiro | |
| 7,058,892 B1 | 6/2006 | MacNaughton et al. | |
| 7,062,533 B2 | 6/2006 | Brown et al. | |
| 7,065,186 B1 | 6/2006 | Myers et al. | |
| 7,068,769 B1 | 6/2006 | Weaver et al. | |
| 7,076,504 B1 | 7/2006 | Handel | |
| 7,076,545 B2 | 7/2006 | Bates et al. | |
| 7,076,546 B1 | 7/2006 | Bates et al. | |
| 7,080,139 B1 | 7/2006 | Briggs et al. | |
| 7,082,407 B1 | 7/2006 | Bezos et al. | |
| 7,089,237 B2 | 8/2006 | Turnbull et al. | |
| 7,089,287 B2 | 8/2006 | Bellotti et al. | |
| 7,092,509 B1 | 8/2006 | Mears et al. | |
| 7,092,952 B1 | 8/2006 | Wilens | |
| 7,092,998 B2 | 8/2006 | Frietas | |
| 7,096,009 B2 | 8/2006 | Mousseau et al. | |
| 7,096,030 B2 | 8/2006 | Huomo | |
| 7,096,214 B1 | 8/2006 | Bharat et al. | |
| 7,113,803 B2 | 9/2006 | Dehlin | |
| 7,117,254 B2 | 10/2006 | Lunt et al. | |
| 7,124,123 B1 | 10/2006 | Roskind et al. | |
| 7,127,232 B2 | 10/2006 | O'Neil et al. | |
| 7,130,956 B2 | 10/2006 | Rao | |
| 7,133,506 B1 | 11/2006 | Smith | |
| 7,133,898 B1 | 11/2006 | Malik | |
| 7,136,903 B1 | 11/2006 | Phillips | |
| 7,139,806 B2 | 11/2006 | Hayes et al. | |
| 7,142,642 B2 | 11/2006 | McClelland et al. | |
| 7,146,404 B2 | 12/2006 | Kay et al. | |
| 7,146,416 B1 | 12/2006 | Yoo et al. | |
| 7,155,725 B1 | 12/2006 | Kister et al. | |
| 7,162,513 B1 | 1/2007 | Kister et al. | |
| 7,162,528 B1 | 1/2007 | Simonoff | |
| 7,177,880 B2 | 2/2007 | Ruvolo | |
| 7,181,498 B2 | 2/2007 | Zhu et al. | |
| 7,185,059 B2 | 2/2007 | Daniell et al. | |
| 7,188,143 B2 | 3/2007 | Szeto | |
| 7,188,153 B2 | 3/2007 | Lunt et al. | |
| 7,190,773 B1 | 3/2007 | D'Silva et al. | |
| 7,190,956 B2 | 3/2007 | Dorenbosch et al. | |
| 7,194,516 B2 | 3/2007 | Giacobbe et al. | |
| 7,200,634 B2 | 4/2007 | Mendiola et al. | |
| 7,203,507 B2 | 4/2007 | Smith et al. | |
| 7,206,814 B2 | 4/2007 | Kirsch | |
| 7,212,617 B2 | 5/2007 | Owens et al. | |

(56) References Cited

U.S. PATENT DOCUMENTS

| | | |
|---|---|---|
| 7,218,921 B2 | 5/2007 | Mendiola et al. |
| 7,219,303 B2 | 5/2007 | Fish |
| 7,222,309 B2 | 5/2007 | Chupin et al. |
| 7,231,428 B2 | 6/2007 | Teague |
| 7,231,478 B2 | 6/2007 | Leijten |
| 7,237,002 B1 | 6/2007 | Estrada |
| 7,237,011 B1 | 6/2007 | St Pierre |
| 7,240,093 B1 | 7/2007 | Danieli et al. |
| 7,246,371 B2 | 7/2007 | Diacakis et al. |
| 7,257,639 B1 | 8/2007 | Li et al. |
| 7,266,584 B2 | 9/2007 | Mullen et al. |
| 7,266,585 B2 | 9/2007 | Kay et al. |
| 7,269,590 B2 | 9/2007 | Hull et al. |
| 7,269,627 B2 | 9/2007 | Knauerhase |
| 7,275,214 B2 | 9/2007 | Itoh |
| 7,275,215 B2 | 9/2007 | Werndorfer et al. |
| 7,284,046 B1 | 10/2007 | Kreiner et al. |
| 7,297,110 B2 | 11/2007 | Goyal et al. |
| 7,299,257 B2 | 11/2007 | Boyer et al. |
| 7,305,624 B1 | 12/2007 | Siegel |
| 7,313,760 B2 | 12/2007 | Grossman |
| 7,319,882 B2 | 1/2008 | Mendiola et al. |
| 7,324,826 B2 | 1/2008 | Carey et al. |
| 7,337,219 B1 | 2/2008 | Meenan et al. |
| 7,366,522 B2 | 4/2008 | Thomas |
| 7,370,035 B2 | 5/2008 | Gross et al. |
| 7,383,339 B1 | 6/2008 | Meenan et al. |
| 7,401,098 B2 | 7/2008 | Baker |
| 7,403,942 B1 | 7/2008 | Bayliss |
| 7,406,715 B2 | 7/2008 | Clapper |
| 7,411,939 B1 | 8/2008 | Lamb et al. |
| 7,424,510 B2 | 9/2008 | Gross et al. |
| 7,428,580 B2 | 9/2008 | Hullfish et al. |
| 7,428,585 B1 | 9/2008 | Owens et al. |
| 7,428,750 B1 | 9/2008 | Dunn et al. |
| 7,454,472 B2 | 11/2008 | Szeto |
| 7,475,113 B2 | 1/2009 | Stolze |
| 7,478,414 B1 | 1/2009 | Glusker et al. |
| 7,499,973 B2 | 3/2009 | Couts et al. |
| 7,512,407 B2 | 3/2009 | Wu et al. |
| 7,512,652 B1 | 3/2009 | Appelman et al. |
| 7,543,243 B2 | 6/2009 | Schwartz et al. |
| 7,552,460 B2 | 6/2009 | Goldman |
| 7,590,696 B1 | 9/2009 | Odell |
| 7,603,417 B2 | 10/2009 | Ben-Yoseph |
| 7,603,683 B2 | 10/2009 | Reto |
| 7,613,776 B1 | 11/2009 | Ben-Yoseph |
| 7,640,305 B1 | 12/2009 | Arthur et al. |
| 7,640,306 B2 | 12/2009 | Appelman et al. |
| 7,653,693 B2 | 1/2010 | Heikes |
| 7,675,903 B2 | 3/2010 | Ozugur et al. |
| 7,680,796 B2 | 3/2010 | Yeh et al. |
| 7,686,693 B2 | 3/2010 | Danieli et al. |
| 7,716,287 B2 | 5/2010 | Appelman et al. |
| 7,725,541 B2 | 5/2010 | Daniell et al. |
| 7,725,542 B2 | 5/2010 | Daniell et al. |
| 7,752,273 B2 | 7/2010 | Ito et al. |
| 7,774,410 B2 | 8/2010 | Gang |
| 7,774,711 B2 | 8/2010 | Valeski |
| 7,788,382 B1 | 8/2010 | Jones et al. |
| 7,899,862 B2 | 3/2011 | Appelman et al. |
| 7,903,796 B1 | 3/2011 | Kheradpir et al. |
| 7,908,327 B2 | 3/2011 | Kucharewski |
| 7,921,368 B2 | 4/2011 | Moody et al. |
| 8,001,199 B2 | 8/2011 | Appelman |
| 8,005,919 B2 | 8/2011 | Mehanna |
| 8,055,675 B2 | 11/2011 | Higgins et al. |
| 8,117,265 B2 | 2/2012 | Ben-Yoseph |
| 8,122,137 B2 | 2/2012 | Appelman et al. |
| 8,150,922 B2 | 4/2012 | Griffin et al. |
| 8,156,193 B1 | 4/2012 | Odell |
| 8,167,712 B2 | 5/2012 | Sarkar et al. |
| 8,204,942 B2 | 6/2012 | Roskind et al. |
| 8,224,916 B2 | 7/2012 | Kucharewski |
| 8,352,551 B2 | 1/2013 | Campbell et al. |
| 8,452,849 B2 | 5/2013 | Mehanna |
| 8,577,972 B1 | 11/2013 | Heikes |
| 8,611,873 B2 | 12/2013 | Onyon et al. |
| 8,701,014 B1 | 4/2014 | Schlegel |
| 8,775,538 B2 | 7/2014 | Heikes |
| 8,775,560 B2 | 7/2014 | Mehanna |
| 8,819,176 B2 | 8/2014 | Mehanna |
| 8,965,964 B1 | 2/2015 | Odell et al. |
| 2001/0002469 A1 | 5/2001 | Bates et al. |
| 2001/0003202 A1 | 6/2001 | Mache et al. |
| 2001/0003203 A1 | 6/2001 | Mache |
| 2001/0005861 A1 | 6/2001 | Mousseau et al. |
| 2001/0013050 A1 | 8/2001 | Shah |
| 2001/0013069 A1 | 8/2001 | Shah |
| 2001/0016823 A1 | 8/2001 | Richards et al. |
| 2001/0018858 A1 | 9/2001 | Dwek |
| 2001/0025280 A1 | 9/2001 | Mandato et al. |
| 2001/0034224 A1 | 10/2001 | McDowell et al. |
| 2001/0048735 A1 | 12/2001 | O'Neal |
| 2001/0056363 A1 | 12/2001 | Gantz et al. |
| 2002/0002586 A1 | 1/2002 | Rafal et al. |
| 2002/0006803 A1 | 1/2002 | Mendiola et al. |
| 2002/0007398 A1 | 1/2002 | Mendiola et al. |
| 2002/0016818 A1 | 2/2002 | Kirani et al. |
| 2002/0021307 A1 | 2/2002 | Glenn et al. |
| 2002/0023132 A1 | 2/2002 | Tornabene et al. |
| 2002/0023147 A1 | 2/2002 | Kovacs et al. |
| 2002/0029224 A1 | 3/2002 | Carlsson |
| 2002/0032729 A1 | 3/2002 | Erickson et al. |
| 2002/0032742 A1 | 3/2002 | Anderson |
| 2002/0035605 A1 | 3/2002 | McDowell et al. |
| 2002/0042830 A1 | 4/2002 | Bose et al. |
| 2002/0046243 A1 | 4/2002 | Morris |
| 2002/0049610 A1 | 4/2002 | Gropper |
| 2002/0049704 A1 | 4/2002 | Vanderveldt et al. |
| 2002/0049751 A1 | 4/2002 | Chen et al. |
| 2002/0049806 A1 | 4/2002 | Gatz et al. |
| 2002/0049847 A1 | 4/2002 | McArdle et al. |
| 2002/0049852 A1 | 4/2002 | Lee et al. |
| 2002/0052921 A1 | 5/2002 | Morkel |
| 2002/0052971 A1 | 5/2002 | Okudera |
| 2002/0054092 A1 | 5/2002 | Hedloy |
| 2002/0059379 A1 | 5/2002 | Harvey et al. |
| 2002/0059401 A1 | 5/2002 | Austin |
| 2002/0059425 A1 | 5/2002 | Belfore et al. |
| 2002/0059526 A1 | 5/2002 | Dillon et al. |
| 2002/0065828 A1 | 5/2002 | Goodspeed |
| 2002/0065856 A1 | 5/2002 | Kisiel |
| 2002/0065894 A1 | 5/2002 | Dalal et al. |
| 2002/0066036 A1 | 5/2002 | Makineni et al. |
| 2002/0071539 A1 | 6/2002 | Diament et al. |
| 2002/0078077 A1 | 6/2002 | Baumann et al. |
| 2002/0083127 A1 | 6/2002 | Agrawal |
| 2002/0083136 A1 | 6/2002 | Whitten, II |
| 2002/0084888 A1 | 7/2002 | Jin |
| 2002/0087630 A1 | 7/2002 | Wu |
| 2002/0087649 A1 | 7/2002 | Horvitz |
| 2002/0087704 A1 | 7/2002 | Chesnais et al. |
| 2002/0091667 A1 | 7/2002 | Jaipuria et al. |
| 2002/0091775 A1 | 7/2002 | Morehead et al. |
| 2002/0091936 A1 | 7/2002 | Tema |
| 2002/0095464 A1 | 7/2002 | Meek |
| 2002/0095663 A1 | 7/2002 | Joory |
| 2002/0097856 A1 | 7/2002 | Wullert, II |
| 2002/0101446 A1 | 8/2002 | Tang et al. |
| 2002/0103801 A1 | 8/2002 | Lyons |
| 2002/0112181 A1 | 8/2002 | Smith |
| 2002/0112239 A1 | 8/2002 | Goldman |
| 2002/0116461 A1 | 8/2002 | Diacakis et al. |
| 2002/0116463 A1 | 8/2002 | Hart |
| 2002/0116528 A1 | 8/2002 | Vale |
| 2002/0116641 A1 | 8/2002 | Mastrianni |
| 2002/0118809 A1 | 8/2002 | Eisenberg |
| 2002/0119789 A1 | 8/2002 | Friedman |
| 2002/0120687 A1 | 8/2002 | Diacakis et al. |
| 2002/0120697 A1 | 8/2002 | Generous et al. |
| 2002/0120779 A1 | 8/2002 | Teeple et al. |
| 2002/0123328 A1 | 9/2002 | Snip et al. |
| 2002/0123988 A1 | 9/2002 | Dean et al. |

(56) References Cited

U.S. PATENT DOCUMENTS

| | | |
|---|---|---|
| 2002/0128047 A1 | 9/2002 | Gates |
| 2002/0130904 A1 | 9/2002 | Becker et al. |
| 2002/0133369 A1 | 9/2002 | Johnson |
| 2002/0136390 A1 | 9/2002 | Lang et al. |
| 2002/0137530 A1 | 9/2002 | Karve |
| 2002/0138650 A1 | 9/2002 | Yamamoto et al. |
| 2002/0143565 A1 | 10/2002 | Headings et al. |
| 2002/0144283 A1 | 10/2002 | Headings et al. |
| 2002/0151294 A1 | 10/2002 | Kirby et al. |
| 2002/0154178 A1 | 10/2002 | Barnett |
| 2002/0155826 A1 | 10/2002 | Robinson et al. |
| 2002/0160757 A1 | 10/2002 | Shavit et al. |
| 2002/0160805 A1 | 10/2002 | Laitinen et al. |
| 2002/0165000 A1 | 11/2002 | Fok |
| 2002/0165729 A1 | 11/2002 | Kuebert et al. |
| 2002/0169748 A1 | 11/2002 | Macholda |
| 2002/0174050 A1 | 11/2002 | Enyard et al. |
| 2002/0174260 A1 | 11/2002 | Huang |
| 2002/0175953 A1 | 11/2002 | Lin |
| 2002/0178072 A1 | 11/2002 | Gusler et al. |
| 2002/0178161 A1 | 11/2002 | Brezin et al. |
| 2002/0181703 A1 | 12/2002 | Logan et al. |
| 2002/0184089 A1 | 12/2002 | Tsou et al. |
| 2002/0184128 A1 | 12/2002 | Holtsinger |
| 2002/0184309 A1 | 12/2002 | Danker et al. |
| 2002/0187794 A1 | 12/2002 | Fostick et al. |
| 2002/0188620 A1 | 12/2002 | Doss et al. |
| 2002/0194378 A1 | 12/2002 | Foti |
| 2002/0199095 A1 | 12/2002 | Bandini et al. |
| 2003/0004855 A1 | 1/2003 | Dutta |
| 2003/0004872 A1 | 1/2003 | Gardi et al. |
| 2003/0006912 A1 | 1/2003 | Brescia |
| 2003/0009385 A1 | 1/2003 | Tucciarone et al. |
| 2003/0009698 A1 | 1/2003 | Lindeman et al. |
| 2003/0014485 A1 | 1/2003 | Banatwala |
| 2003/0016639 A1 | 1/2003 | Kransmo et al. |
| 2003/0018704 A1 | 1/2003 | Polychronidis et al. |
| 2003/0018720 A1 | 1/2003 | Chang et al. |
| 2003/0018726 A1 | 1/2003 | Low et al. |
| 2003/0018747 A1 | 1/2003 | Herland et al. |
| 2003/0023681 A1 | 1/2003 | Brown et al. |
| 2003/0023684 A1 | 1/2003 | Brown et al. |
| 2003/0023692 A1 | 1/2003 | Moroo |
| 2003/0023875 A1 | 1/2003 | Hursey |
| 2003/0025824 A1 | 2/2003 | Ishikawa |
| 2003/0028524 A1 | 2/2003 | Keskar |
| 2003/0028595 A1 | 2/2003 | Vogt |
| 2003/0028597 A1 | 2/2003 | Salmi |
| 2003/0028884 A1 | 2/2003 | Swart et al. |
| 2003/0037110 A1 | 2/2003 | Yamamoto |
| 2003/0037112 A1 | 2/2003 | Fitzpatrick et al. |
| 2003/0037114 A1 | 2/2003 | Nishio et al. |
| 2003/0042306 A1 | 3/2003 | Irwin |
| 2003/0045272 A1 | 3/2003 | Burr |
| 2003/0046097 A1 | 3/2003 | LaSalle et al. |
| 2003/0050916 A1 | 3/2003 | Ortega |
| 2003/0050976 A1 | 3/2003 | Block |
| 2003/0051161 A1 | 3/2003 | Smith et al. |
| 2003/0052915 A1 | 3/2003 | Brown et al. |
| 2003/0054830 A1 | 3/2003 | Williams et al. |
| 2003/0055831 A1 | 3/2003 | Ryan |
| 2003/0055897 A1 | 3/2003 | Brown et al. |
| 2003/0058478 A1 | 3/2003 | Aoki |
| 2003/0060211 A1 | 3/2003 | Chern |
| 2003/0064422 A1 | 4/2003 | McDevitt |
| 2003/0065721 A1 | 4/2003 | Roskind |
| 2003/0078981 A1 | 4/2003 | Harms et al. |
| 2003/0078987 A1 | 4/2003 | Serebrennikov et al. |
| 2003/0079024 A1 | 4/2003 | Hough et al. |
| 2003/0081001 A1 | 5/2003 | Munro |
| 2003/0083046 A1 | 5/2003 | Mathis |
| 2003/0087632 A1 | 5/2003 | Sagi et al. |
| 2003/0088554 A1 | 5/2003 | Ryan |
| 2003/0101226 A1 | 5/2003 | Quine |
| 2003/0101343 A1 | 5/2003 | Eaton et al. |
| 2003/0105682 A1 | 6/2003 | Dicker et al. |
| 2003/0105820 A1 | 6/2003 | Haims et al. |
| 2003/0105822 A1 | 6/2003 | Gusler et al. |
| 2003/0106054 A1 | 6/2003 | Billmaier et al. |
| 2003/0110056 A1 | 6/2003 | Berghofer et al. |
| 2003/0110212 A1 | 6/2003 | Lewis |
| 2003/0112945 A1 | 6/2003 | Brown et al. |
| 2003/0115585 A1 | 6/2003 | Barsness et al. |
| 2003/0119532 A1 | 6/2003 | Hatch |
| 2003/0119561 A1 | 6/2003 | Hatch et al. |
| 2003/0120732 A1 | 6/2003 | Couts et al. |
| 2003/0126267 A1 | 7/2003 | Gutta et al. |
| 2003/0129969 A1 | 7/2003 | Rucinski |
| 2003/0130014 A1 | 7/2003 | Rucinski |
| 2003/0131061 A1 | 7/2003 | Newton |
| 2003/0131143 A1 | 7/2003 | Myers |
| 2003/0135659 A1 | 7/2003 | Bellotti et al. |
| 2003/0154254 A1 | 8/2003 | Awasthi |
| 2003/0154257 A1 | 8/2003 | Hantsch et al. |
| 2003/0154373 A1 | 8/2003 | Shimada et al. |
| 2003/0154398 A1 | 8/2003 | Eaton et al. |
| 2003/0156138 A1 | 8/2003 | Vronay et al. |
| 2003/0156707 A1 | 8/2003 | Brown et al. |
| 2003/0158855 A1 | 8/2003 | Farnham et al. |
| 2003/0158860 A1 | 8/2003 | Caughey |
| 2003/0158864 A1 | 8/2003 | Samn |
| 2003/0158902 A1 | 8/2003 | Volach |
| 2003/0167308 A1 | 9/2003 | Schran |
| 2003/0167310 A1 | 9/2003 | Moody et al. |
| 2003/0167324 A1 | 9/2003 | Farnham et al. |
| 2003/0172349 A1 | 9/2003 | Katayama |
| 2003/0174164 A1 | 9/2003 | Capps |
| 2003/0177175 A1 | 9/2003 | Worley et al. |
| 2003/0177190 A1 | 9/2003 | Moody et al. |
| 2003/0179930 A1 | 9/2003 | O'Dell et al. |
| 2003/0185232 A1 | 10/2003 | Moore et al. |
| 2003/0185360 A1 | 10/2003 | Moore et al. |
| 2003/0187813 A1 | 10/2003 | Goldman |
| 2003/0188263 A1 | 10/2003 | Bates et al. |
| 2003/0191673 A1 | 10/2003 | Cohen |
| 2003/0191753 A1 | 10/2003 | Hoch |
| 2003/0191969 A1 | 10/2003 | Katsikas |
| 2003/0196967 A1 | 10/2003 | Robinson et al. |
| 2003/0197729 A1 | 10/2003 | Denoue et al. |
| 2003/0200268 A1 | 10/2003 | Morris |
| 2003/0200272 A1 | 10/2003 | Campise et al. |
| 2003/0204568 A1 | 10/2003 | Bhargava et al. |
| 2003/0204741 A1 | 10/2003 | Schoen et al. |
| 2003/0206195 A1 | 11/2003 | Matsa et al. |
| 2003/0206619 A1 | 11/2003 | Curbow et al. |
| 2003/0208545 A1 | 11/2003 | Eaton et al. |
| 2003/0208547 A1 | 11/2003 | Branimir |
| 2003/0210265 A1 | 11/2003 | Haimberg |
| 2003/0212745 A1 | 11/2003 | Caughey |
| 2003/0217109 A1 | 11/2003 | Ordille et al. |
| 2003/0220946 A1 | 11/2003 | Malik |
| 2003/0220976 A1 | 11/2003 | Malik |
| 2003/0222902 A1 | 12/2003 | Chupin et al. |
| 2003/0225834 A1 | 12/2003 | Lee et al. |
| 2003/0225836 A1 | 12/2003 | Lee et al. |
| 2003/0225850 A1 | 12/2003 | Teague |
| 2003/0227487 A1 | 12/2003 | Hugh |
| 2003/0227894 A1 | 12/2003 | Wang et al. |
| 2003/0228908 A1 | 12/2003 | Caiafa et al. |
| 2003/0229668 A1 | 12/2003 | Malik |
| 2003/0229717 A1 | 12/2003 | Teague |
| 2003/0229722 A1 | 12/2003 | Beyda |
| 2003/0233265 A1 | 12/2003 | Lee et al. |
| 2003/0233413 A1 | 12/2003 | Becker |
| 2003/0233416 A1 | 12/2003 | Beyda |
| 2003/0233417 A1 | 12/2003 | Beyda et al. |
| 2003/0233418 A1 | 12/2003 | Goldman |
| 2003/0233650 A1 | 12/2003 | Zaner et al. |
| 2004/0001480 A1 | 1/2004 | Tanigawa et al. |
| 2004/0003041 A1 | 1/2004 | Moore et al. |
| 2004/0003046 A1 | 1/2004 | Grabelsky et al. |
| 2004/0003071 A1 | 1/2004 | Mathew et al. |
| 2004/0005881 A1 | 1/2004 | Ala-Luukko |
| 2004/0010808 A1 | 1/2004 | deCarmo |

(56) References Cited

U.S. PATENT DOCUMENTS

| | | |
|---|---|---|
| 2004/0015553 A1 | 1/2004 | Griffin et al. |
| 2004/0017396 A1 | 1/2004 | Werndorfer et al. |
| 2004/0019637 A1 | 1/2004 | Goodman et al. |
| 2004/0019645 A1 | 1/2004 | Goodman et al. |
| 2004/0019650 A1 | 1/2004 | Auvenshine |
| 2004/0019671 A1 | 1/2004 | Metz |
| 2004/0019695 A1 | 1/2004 | Fellenstein et al. |
| 2004/0024478 A1 | 2/2004 | Hans et al. |
| 2004/0024822 A1 | 2/2004 | Werndorfer et al. |
| 2004/0024892 A1 | 2/2004 | Creswell et al. |
| 2004/0029567 A1 | 2/2004 | Timmins et al. |
| 2004/0029572 A1 | 2/2004 | Nerot |
| 2004/0030741 A1 | 2/2004 | Wolton et al. |
| 2004/0030750 A1 | 2/2004 | Moore et al. |
| 2004/0030787 A1 | 2/2004 | Jandel |
| 2004/0031058 A1 | 2/2004 | Reisman |
| 2004/0044536 A1 | 3/2004 | Fitzpatrick et al. |
| 2004/0044723 A1 | 3/2004 | Bell et al. |
| 2004/0044736 A1 | 3/2004 | Austin-Lane et al. |
| 2004/0052356 A1 | 3/2004 | McKinzie et al. |
| 2004/0054646 A1 | 3/2004 | Daniell et al. |
| 2004/0054729 A1 | 3/2004 | Fukuizumi et al. |
| 2004/0054733 A1 | 3/2004 | Weeks |
| 2004/0054735 A1 | 3/2004 | Daniell et al. |
| 2004/0054736 A1 | 3/2004 | Daniell et al. |
| 2004/0056901 A1 | 3/2004 | March et al. |
| 2004/0058694 A1 | 3/2004 | Mendiola et al. |
| 2004/0059708 A1 | 3/2004 | Dean et al. |
| 2004/0059781 A1 | 3/2004 | Yoakum et al. |
| 2004/0059942 A1 | 3/2004 | Xie |
| 2004/0064586 A1 | 4/2004 | Weigand |
| 2004/0073643 A1 | 4/2004 | Hayes et al. |
| 2004/0078440 A1 | 4/2004 | Potter et al. |
| 2004/0078445 A1 | 4/2004 | Malik |
| 2004/0078448 A1 | 4/2004 | Malik et al. |
| 2004/0083270 A1 | 4/2004 | Heckerman et al. |
| 2004/0092250 A1 | 5/2004 | Valloppillil |
| 2004/0092272 A1 | 5/2004 | Valloppillil |
| 2004/0092273 A1 | 5/2004 | Valloppillil |
| 2004/0098491 A1 | 5/2004 | Costa-Requena et al. |
| 2004/0101123 A1* | 5/2004 | Garcia .............. H04M 3/42008 379/220.01 |
| 2004/0103156 A1 | 5/2004 | Quillen et al. |
| 2004/0107119 A1 | 6/2004 | Ohishi |
| 2004/0111261 A1 | 6/2004 | Chaudhari et al. |
| 2004/0111476 A1 | 6/2004 | Trossen et al. |
| 2004/0117443 A1 | 6/2004 | Barsness |
| 2004/0117451 A1 | 6/2004 | Chung |
| 2004/0117831 A1 | 6/2004 | Ellis et al. |
| 2004/0122681 A1 | 6/2004 | Ruvolo |
| 2004/0122730 A1 | 6/2004 | Tucciarone et al. |
| 2004/0122810 A1 | 6/2004 | Mayer |
| 2004/0122855 A1 | 6/2004 | Ruvolo |
| 2004/0122901 A1 | 6/2004 | Sylvain |
| 2004/0133564 A1 | 7/2004 | Gross et al. |
| 2004/0137882 A1 | 7/2004 | Forsyth |
| 2004/0141599 A1 | 7/2004 | Tang et al. |
| 2004/0143564 A1 | 7/2004 | Gross et al. |
| 2004/0148347 A1 | 7/2004 | Appelman et al. |
| 2004/0152477 A1 | 8/2004 | Wu et al. |
| 2004/0152517 A1 | 8/2004 | Hardisty et al. |
| 2004/0153506 A1 | 8/2004 | Ito et al. |
| 2004/0153518 A1 | 8/2004 | Seligman et al. |
| 2004/0154022 A1 | 8/2004 | Boss et al. |
| 2004/0157586 A1 | 8/2004 | Robinson et al. |
| 2004/0162830 A1 | 8/2004 | Shirwadkar et al. |
| 2004/0171396 A1 | 9/2004 | Carey et al. |
| 2004/0172396 A1 | 9/2004 | Vanska |
| 2004/0172481 A1 | 9/2004 | Engstrom |
| 2004/0176076 A1 | 9/2004 | Uppuluri |
| 2004/0176081 A1 | 9/2004 | Bryham et al. |
| 2004/0177110 A1 | 9/2004 | Rounthwaite et al. |
| 2004/0177119 A1 | 9/2004 | Mason et al. |
| 2004/0179039 A1 | 9/2004 | Blatter et al. |
| 2004/0183829 A1 | 9/2004 | Kontny et al. |
| 2004/0186738 A1 | 9/2004 | Reisman |
| 2004/0186887 A1 | 9/2004 | Galli et al. |
| 2004/0186989 A1 | 9/2004 | Clapper |
| 2004/0193684 A1 | 9/2004 | Ben-Yoseph |
| 2004/0193722 A1 | 9/2004 | Donovan |
| 2004/0196315 A1 | 10/2004 | Swearingen et al. |
| 2004/0198351 A1 | 10/2004 | Knotts |
| 2004/0199581 A1 | 10/2004 | Kucharewski et al. |
| 2004/0199582 A1 | 10/2004 | Kucharewski et al. |
| 2004/0201624 A1 | 10/2004 | Crawford |
| 2004/0203766 A1 | 10/2004 | Jenniges et al. |
| 2004/0204068 A1 | 10/2004 | Komaki |
| 2004/0204140 A1 | 10/2004 | Nagata |
| 2004/0205126 A1 | 10/2004 | Ben-Yoseph |
| 2004/0205127 A1 | 10/2004 | Ben-Yoseph |
| 2004/0210639 A1 | 10/2004 | Ben-Yoseph et al. |
| 2004/0210844 A1 | 10/2004 | Pettinati |
| 2004/0215648 A1 | 10/2004 | Marshall |
| 2004/0215721 A1 | 10/2004 | Szeto et al. |
| 2004/0215793 A1 | 10/2004 | Ryan et al. |
| 2004/0219936 A1 | 11/2004 | Kontiainen |
| 2004/0220897 A1 | 11/2004 | Bernhart et al. |
| 2004/0221309 A1 | 11/2004 | Zaner |
| 2004/0231003 A1 | 11/2004 | Cooper et al. |
| 2004/0243844 A1 | 12/2004 | Adkins |
| 2004/0255122 A1 | 12/2004 | Ingerman et al. |
| 2004/0266462 A1 | 12/2004 | Chava et al. |
| 2004/0267604 A1 | 12/2004 | Gross et al. |
| 2005/0004978 A1 | 1/2005 | Reed et al. |
| 2005/0004984 A1 | 1/2005 | Simpson |
| 2005/0004995 A1 | 1/2005 | Stochosky |
| 2005/0009541 A1 | 1/2005 | Ye et al. |
| 2005/0010573 A1 | 1/2005 | Garg |
| 2005/0015432 A1 | 1/2005 | Cohen |
| 2005/0015455 A1 | 1/2005 | Liu |
| 2005/0021750 A1 | 1/2005 | Abrams |
| 2005/0021854 A1 | 1/2005 | Bjorkner |
| 2005/0027382 A1 | 2/2005 | Kirmse et al. |
| 2005/0038856 A1 | 2/2005 | Krishnasamy |
| 2005/0050143 A1 | 3/2005 | Guster et al. |
| 2005/0055306 A1 | 3/2005 | Miller et al. |
| 2005/0055340 A1 | 3/2005 | Dresden |
| 2005/0055416 A1 | 3/2005 | Heikes |
| 2005/0066362 A1 | 3/2005 | Rambo |
| 2005/0071251 A1 | 3/2005 | Linden et al. |
| 2005/0076240 A1 | 4/2005 | Appleman |
| 2005/0076241 A1 | 4/2005 | Appleman |
| 2005/0086305 A1 | 4/2005 | Koch et al. |
| 2005/0091314 A1 | 4/2005 | Blagsvedt et al. |
| 2005/0091318 A1 | 4/2005 | Keohane et al. |
| 2005/0976241 | 4/2005 | Appleman |
| 2005/0096084 A1 | 5/2005 | Pohja et al. |
| 2005/0102202 A1 | 5/2005 | Linden et al. |
| 2005/0108329 A1 | 5/2005 | Weaver et al. |
| 2005/0108341 A1 | 5/2005 | Matthew et al. |
| 2005/0114229 A1 | 5/2005 | Ackley |
| 2005/0114783 A1 | 5/2005 | Szeto |
| 2005/0125559 A1 | 6/2005 | Mutha |
| 2005/0130631 A1 | 6/2005 | Maguire et al. |
| 2005/0130633 A1 | 6/2005 | Hill et al. |
| 2005/0149606 A1 | 7/2005 | Lyle et al. |
| 2005/0160144 A1 | 7/2005 | Bhatia |
| 2005/0171955 A1 | 8/2005 | Hull et al. |
| 2005/0172001 A1 | 8/2005 | Zaner et al. |
| 2005/0177486 A1 | 8/2005 | Yeager |
| 2005/0181878 A1 | 8/2005 | Danieli et al. |
| 2005/0187020 A1 | 8/2005 | Amaitis et al. |
| 2005/0188044 A1 | 8/2005 | Fleming, III |
| 2005/0195802 A1 | 9/2005 | Klein et al. |
| 2005/0197846 A1 | 9/2005 | Pezaris |
| 2005/0198131 A1 | 9/2005 | Appelman et al. |
| 2005/0198164 A1 | 9/2005 | Moore et al. |
| 2005/0198172 A1 | 9/2005 | Appelman et al. |
| 2005/0198173 A1 | 9/2005 | Evans |
| 2005/0198268 A1 | 9/2005 | Chandra |
| 2005/0204063 A1 | 9/2005 | O'Brien |
| 2005/0208957 A1 | 9/2005 | Knotts |
| 2005/0216300 A1 | 9/2005 | Appelman et al. |
| 2005/0223075 A1 | 10/2005 | Swearingen et al. |

(56) References Cited

U.S. PATENT DOCUMENTS

| | | |
|---|---|---|
| 2005/0239550 A1 | 10/2005 | Hardisty et al. |
| 2005/0246420 A1 | 11/2005 | Little |
| 2005/0251515 A1 | 11/2005 | Reed |
| 2005/0289469 A1 | 12/2005 | Chandler et al. |
| 2006/0009243 A1 | 1/2006 | Dahan et al. |
| 2006/0026237 A1 | 2/2006 | Wang et al. |
| 2006/0031080 A1 | 2/2006 | Mallya et al. |
| 2006/0031772 A1 | 2/2006 | Valeski |
| 2006/0036701 A1 | 2/2006 | Bulfer et al. |
| 2006/0047187 A1 | 3/2006 | Goyal et al. |
| 2006/0047747 A1 | 3/2006 | Erickson et al. |
| 2006/0116139 A1 | 6/2006 | Appelman |
| 2006/0117380 A1 | 6/2006 | Tachizawa et al. |
| 2006/0129678 A1 | 6/2006 | Morita |
| 2006/0136584 A1 | 6/2006 | Decker et al. |
| 2006/0149644 A1 | 7/2006 | Sulmar et al. |
| 2006/0154650 A1 | 7/2006 | Sherman et al. |
| 2006/0168204 A1 | 7/2006 | Appelman et al. |
| 2006/0242583 A1 | 10/2006 | MacNaughton et al. |
| 2006/0259344 A1 | 11/2006 | Patel et al. |
| 2006/0259476 A1 | 11/2006 | Kadayam et al. |
| 2006/0271687 A1 | 11/2006 | Alston et al. |
| 2006/0288077 A1 | 12/2006 | Chen et al. |
| 2007/0092072 A1 | 4/2007 | Jacobs |
| 2007/0112966 A1 | 5/2007 | Eftis et al. |
| 2007/0157098 A1 | 7/2007 | Chupin et al. |
| 2007/0185957 A1 | 8/2007 | Mandalia et al. |
| 2007/0250566 A1 | 10/2007 | Appelman |
| 2008/0008106 A1 | 1/2008 | Boberg et al. |
| 2008/0133417 A1 | 6/2008 | Robinson |
| 2008/0255989 A1 | 10/2008 | Altberg et al. |
| 2008/0288604 A1 | 11/2008 | Major et al. |
| 2009/0016499 A1 | 1/2009 | Hullfish |
| 2009/0043844 A1 | 2/2009 | Zimmet et al. |
| 2009/0070306 A1 | 3/2009 | Stroe |
| 2009/0070433 A1 | 3/2009 | Karstens |
| 2009/0299934 A1 | 12/2009 | Horvitz et al. |
| 2011/0167116 A1 | 7/2011 | Kucharewski |
| 2011/0179117 A1 | 7/2011 | Appelman |
| 2011/0282955 A1 | 11/2011 | Appelman |
| 2012/0011110 A1 | 1/2012 | Mehanna |
| 2012/0198012 A1 | 8/2012 | Odell |
| 2012/0233269 A1 | 9/2012 | Ben-Yoseph |
| 2012/0331075 A1 | 12/2012 | Salmi et al. |
| 2013/0013686 A1 | 1/2013 | Kucharewski |
| 2013/0031638 A1 | 1/2013 | Appelman |
| 2013/0132376 A1 | 1/2013 | Mehanna |
| 2013/0066990 A1 | 3/2013 | Ben-Yoseph |
| 2013/0066991 A1 | 3/2013 | Ben-Yoseph |
| 2013/0066992 A1 | 3/2013 | Ben-Yoseph |
| 2013/0067003 A1 | 3/2013 | Heikes |
| 2013/0072239 A1 | 3/2013 | Hullfish |
| 2013/0073627 A1 | 3/2013 | Mehanna |
| 2013/0073653 A1 | 3/2013 | Heikes |
| 2013/0073656 A1 | 3/2013 | Hullfish |
| 2013/0073657 A1 | 3/2013 | Hullfish |
| 2013/0073966 A1 | 3/2013 | Appelman |
| 2013/0073967 A1 | 3/2013 | Appelman |
| 2013/0073968 A1 | 3/2013 | Appelman |
| 2013/0080528 A1 | 3/2013 | Mehanna |
| 2013/0097254 A1 | 4/2013 | Appelman |
| 2013/0097255 A1 | 4/2013 | Appelman |
| 2013/0097256 A1 | 4/2013 | Appelman |
| 2013/0117399 A1 | 5/2013 | Appelman |
| 2013/0124506 A1 | 5/2013 | Mehanna |
| 2013/0124629 A1 | 5/2013 | Appelman |
| 2013/0125138 A1 | 5/2013 | Appelman |
| 2013/0138634 A1 | 5/2013 | Mehanna |
| 2013/0138680 A1 | 5/2013 | Mehanna |
| 2013/0144876 A1 | 6/2013 | Mehanna |
| 2013/0144898 A1 | 6/2013 | Mehanna |
| 2013/0151546 A1 | 6/2013 | Mehanna |
| 2013/0159290 A1 | 6/2013 | Mehanna |
| 2013/0159420 A1 | 6/2013 | Appelman |
| 2013/0159439 A1 | 6/2013 | Appelman |
| 2013/0159440 A1 | 6/2013 | Appelman |
| 2013/0159441 A1 | 6/2013 | Appelman |
| 2013/0159442 A1 | 6/2013 | Appelman |
| 2013/0172026 A1 | 7/2013 | Odell et al. |
| 2013/0173722 A1 | 7/2013 | Kucharewski |
| 2013/0174060 A1 | 7/2013 | Odell |
| 2014/0012935 A1* | 1/2014 | Wu .............. H04L 12/581 709/206 |
| 2014/0337745 A1 | 11/2014 | Odell |
| 2015/0032831 A1 | 1/2015 | Hullfish et al. |
| 2017/0142091 A1* | 5/2017 | Godfrey .............. H04L 63/083 |

FOREIGN PATENT DOCUMENTS

| | | |
|---|---|---|
| CN | 1348296 | 5/2002 |
| CN | 100476805 | 4/2009 |
| DE | 10048653 | 4/2002 |
| EP | 0889660 | 1/1999 |
| EP | 1011243 | 6/2000 |
| EP | 1054329 | 11/2000 |
| EP | 1071295 | 1/2001 |
| EP | 1091532 | 4/2001 |
| EP | 1102443 | 5/2001 |
| EP | 1104961 | 6/2001 |
| EP | 1104964 | 6/2001 |
| EP | 1104965 | 6/2001 |
| EP | 1113619 | 7/2001 |
| EP | 1113620 | 7/2001 |
| EP | 1113631 | 7/2001 |
| EP | 1113640 | 7/2001 |
| EP | 1113659 | 7/2001 |
| EP | 1113677 | 7/2001 |
| EP | 1207655 | 5/2002 |
| EP | 1213874 | 6/2002 |
| EP | 1237384 | 9/2002 |
| EP | 1248484 | 10/2002 |
| EP | 1248486 | 10/2002 |
| EP | 1255414 | 11/2002 |
| EP | 1274222 | 1/2003 |
| EP | 1565845 | 8/2008 |
| GB | 2328835 | 3/1999 |
| GB | 2357932 | 7/2001 |
| GB | 2368747 | 5/2002 |
| JP | 04-86950 | 3/1992 |
| JP | 08-123821 | 5/1996 |
| JP | 09-247334 | 9/1997 |
| JP | 11-161682 | 6/1999 |
| JP | 11-328194 | 11/1999 |
| JP | 2000-148795 | 5/2000 |
| JP | 2000-222424 | 8/2000 |
| JP | 2002-7479 | 1/2002 |
| JP | 2001-109752 | 4/2002 |
| JP | 2002-132832 | 5/2002 |
| JP | 2002-175301 | 6/2002 |
| KR | 20011048800 | 6/2001 |
| KR | 1020010012984 | 9/2002 |
| WO | WO 97/34244 | 9/1997 |
| WO | WO 97/37303 | 10/1997 |
| WO | WO 98/20410 | 5/1998 |
| WO | WO 98/47270 | 10/1998 |
| WO | WO 99/34628 | 7/1999 |
| WO | WO 00/10099 | 2/2000 |
| WO | WO 00/42791 | 7/2000 |
| WO | WO 00/43892 | 7/2000 |
| WO | WO 00/47270 | 8/2000 |
| WO | WO 00/79396 | 12/2000 |
| WO | WO 01/06748 | 1/2001 |
| WO | WO 01/40957 | 6/2001 |
| WO | WO 01/41477 | 6/2001 |
| WO | WO 01/63423 | 8/2001 |
| WO | WO 01/67622 | 9/2001 |
| WO | WO 01/67787 | 9/2001 |
| WO | WO 01/69406 | 9/2001 |
| WO | WO 01/80079 | 10/2001 |
| WO | WO 02/03216 | 1/2002 |
| WO | WO 02/19643 | 3/2002 |
| WO | WO 02/28046 | 4/2002 |
| WO | WO 02/073886 | 9/2002 |
| WO | WO 02/077840 | 10/2002 |

(56) References Cited

FOREIGN PATENT DOCUMENTS

| WO | WO 02/093400 | 11/2002 |
|----|----|----|
| WO | WO 02/093875 | 11/2002 |
| WO | WO 03/021929 | 3/2003 |
| WO | WO 06/026908 | 3/2003 |
| WO | WO 04/046875 | 6/2004 |
| WO | WO 04/046949 | 6/2004 |
| WO | WO 04/046970 | 6/2004 |
| WO | WO 04/088943 | 10/2004 |
| WO | WO 04/111812 | 12/2004 |
| WO | WO 04/111871 | 12/2004 |
| WO | WO 05/10709 | 2/2005 |
| WO | WO 05/054991 | 6/2005 |
| WO | WO 05/057329 | 6/2005 |
| WO | WO 05/086723 | 9/2005 |
| WO | WO 05/089286 | 9/2005 |
| WO | WO 06/66092 | 6/2006 |
| WO | WO 06/068955 | 6/2006 |

OTHER PUBLICATIONS

U.S. Appl. No. 14/322,834, Apr. 29, 2016, Office Action.
U.S. Appl. No. 14/447,902, Jul. 13, 2016, Office Action.
Automated feature of Internet Explorer, www.geocities.com/technofundo/tech/web/ie_autocomplete.html, pp. 1-6, Feb. 18, 2004.
"Approved Database for KnockKnock," http://www.knockmail.com/support/appdatabase.html, pp. 1, as accessed on Dec. 4, 2003.
A. Dornan, "Instant Gratification [instant messaging]", Network Magazine, Aug. 2000, INSPEC p. 9.
A.C.M. Fong et al., "Towards an Open Protocol for Secure Online Presence Notification", Computer Standards & Interfaces, Sep. 2001, INSPEC p. 2.
AE. Milewski et al., "Providing Presence Cues to Telephone Users", Proceedings of CSCW 2000, ACM Conference on Computer Supported Cooperative Work, Jan. 2000, INSPEC p. 3.
America Online Growing Pains, Newsbytes, Mar. 7, 1995.
Armstrong, R., et al., "Web Watcher: a learning apprentice for the world wide web," Feb. 1, 1995,7 pages.
ATMobile Develops Networking-Sensing Instant Messaging, Dec. 8, 1999, Newsbytes, pp. 1-2.
"A Countermeasure to Duplicate—detecting Anti-spam Techniques," Robert J. Hall, AT&T Labs Technical Report 99.9.1, May 1999, Abst. and pp. 1-26.
Adeptra Services Overview; Nov. 7, 2002; adeptra.com ; pp. 1-7.
Adeptra, Features; Nov. 27, 2002; adeptra.com ; pp. 1-2.
America Online Inc., "AOL Instant Messenger", Aug. 29, 2000, Internet: www.aol.com/aim/ (18 pages).
America Online Inc., New AIM 4.7, Sep. 27, 2001, Internet: http://aim.aol.com (7 pages).
"Announce: Implementation of E-mail Spam Proposal," Maurice L. Marvin, news.admin.net-abuse.misc, Aug. 3, 1996, 2 pages.
"A Reputation System for Peer-to-Peer Networks," Gupta et al., Jun. 1-3, 2003, NOSSDAV'03, Monterey, California, pp. 144-152.
"BestCalls.com Announces the BestCalls Technology Index," Business Wire, Jun. 30, 1999, Business Wire, (2 pages).
"Business at Cyberspeed; Brainstorm Becomes Quick Internet Hit," Walker, Jan. 24, 1999, The Washington Post, p. A.01 (4 total pages).
"Better Bayesian Filtering," Paul Graham, Jan. 2003, pp. 1-11, http://www.paulgraham.com/better.html.
B. Raman et al., "Universal Inbox-Providing Extensible Personal Mobility and Service Mobility in an Integrated Communication Network", Proceedings Third IEEE Workshop on Mobile Computing Systems and Applications, Oct. 2000, INSPEC p. 7.
Brown et al., "WWW Plug-Ins Companion," Que Corporation, Oct. 1996, pp. 351-362.
Business Information Corporation, Sep. 1, 1999, Atmobile.com Enters 'IM' World.
Business Wire Atmobile Corporation, AtMobile awarded U.S. Patent Covering Key Elements of its Wireless Instant Messaging System, Sep. 13, 1999.
Boyce, Jim, "Microsoft Office Outlook 2003 Inside Out," Microsoft Press (published Nov. 12, 2003), pp. 252.
Brugali, David, "Mediating the Internet," Annals of Software Engineering, vol. 13, pp. 285-308, Jun. 2002, Kluwer Academic Publishers, The Netherlands.
Bryan Pfaffenberger, Netscape Navigator Gold, AP Professional, Jan. 1997, 4 pages.
Cerulean Studios, "Trillian Pro: No Boundaries," (Overview, New Features, Tech Specs, Corporate, Product Tour—16 pages) 1999-2004; first release Jul. 2000.
Cerulean Studios, "Trillian Pro: Your Freedom to Chat," (Overview, Features, Screenshots, Tech Specs—8 total pages) 1999-2004; first release Jul. 2000.
Chen, Hao et al. "Bringing Order to the Web: Automatically Categorizing Search Results." Proceedings of the SIGCHI conference on human factors in computing systems. ACM Press. pp. 145-152, New York, Jan. 2000.
Chung-Hwa Herman Rao et al.; iMobile: A Proxy-Based Platform for Mobile Services; Network Services Research Center AT&T Labs-Rsearch, Aug. 2001.
Chung-Hwa- Rao, H. Di-Fa Chang, Yi-Bing Lin, "iSMS: an integration platform for short meassage service and IP networks," Network, IEEE, vol. 15, No. 2, pp. 48-55, Mar./Apr. 2001.
"Creating a Single List of Contacts—Google Scholar" available at http://scholar.google.com/scholar?hl=en&lr=&q=creating+a+single+list+list+of+contacts&as...(Mar. 27, 2007), 10 pages.
CommWorks 8250 Personal Communications Management System; Dec. 11, 2002; commworks.com; pp. 1-2.
CommWorks IP Messaging; Dec. 11, 2002; commworks.com; pp. 1-2.
ConNexus to awareness: extending awareness to mobile users, Tang, J.C. and Yankelovich, N. and Begole, J. and Van Kleek M. and Li, F. And Bhalodia J., Proceedings of the SIGCHI conference on Human factors in computing systems, pp. 221-228, Dec. 2001, ACM Press, New York, NY, USA.
"CrushParty.com: Help," retrieved Jun. 12, 2002 from the World Wide Web: http://www.crushparty.com/help.jsp, 3 pages.
CNET Networks Inc., "PopUp Killer", Sep. 13, 2001, Internet: download. cnet.com/downloads/O-10059-100-6932612 shtml, (3 pages).
Convergys Interactive Alerts Reduce Customer Care Costs and Improve Customer Satisfaction; convergys.com ; pp. 1-2, Jan. 22, 2002.
"Digital Artifacts for Remembering and Storytelling: Post History and Social Network Fragments," Viegas et al., retrieved from the World Wide Web: http://we.media.mit.edu/-fviegas/papers/posthistory.snfpdf, (10 pages), Jan. 2004.
Danny Sullivan, "What People Search for," Search Engine Watch, pp. 1-4, http://searchenginewatch.com/facts/searches.html (visited Feb. 13, 2003).
"Degrees of Separation Email Spam Protection", Halfbakery: Degrees of Separation Email Spam Protection, reprinted from http://halfbakery.com/idea/Degrees-20 of -20Separation-20Email-20Spam-20Protecti . . . printed on Mar. 1, 2004 (3 pages).
"Denied Database for KnockKnock," http://www.knockmail.coml support/denydatabase.html, pp. 1, as accessed on Dec. 4, 2003.
"Email Server Control for KnockKnock," http://www.knockmail.com/supporUemailservcont,html, pp. 1-2, as accessed on Dec. 4, 2003.
Ed Bott and Ron Person, UsingWindows 95 with Internet Explorer 4.0, Feb. 17, 1998, Que, Special Edition, (21 pages).
"Finding Others Online: Reputation Systems for Social Online Spaces," Jensen et al., Apr. 25, 2002, CHI, Minneapolis, Minnesota, vol. 4, Issue 1, pp. 447-454.
Global Solutions Directory; Nov. 7, 2002; softwaresibm.com ; pp. 1-5.
Google Zeitgeist—Search patterns, trends, and surprises according to Google, Jan. 2003, pp. 1-2, http://www.google.com/press/zeitgeist.html (visited Feb. 13, 2003).
G. Held, "Instant Messaging Finds its Voice", Network Magazine, May 2001, INSPEC p. 5.

(56) References Cited

OTHER PUBLICATIONS

G. Reif et al.; A Web-based Peer-to-Peer Architecture for Collaborative Nomadic Working; Technical Univesrity of Vienna, Distributed Systems Group, Jun. 20, 2000.
Gross et al., "Computer-Supported Cooperative Work and the Internet," IEEE, Sep. 1996, 00. pp. 425-430.
H. Schulzrinne et al., "The IETF Internet Telephony Architecture and Protocols", IEEE Network, May-Jun. 1999, INSPEC p. 11.
Haim Schneider, Lotus Developer Domain, "Adding a popup menu to your Sametime links", pp. 1-8, Jul. 1, 2003.
Hubbub: a sound enhanced mobile instant messenger that supports awareness and opportunistic interactions, Issacs, E. and Walendowski A.m and Ranganathan, D., Proceedings of the SIGCHI conference on Human Factors in computing systems: Changing our world, changing ourselves, pp. 179-186, Apr. 2002, ACM Press New York, NY, USA.
Hottie or Nottie? Web Site Voters Let You Know WhetherYou Sizzle or Fizzle, Marino, Jul. 11, 2001, Florida Times Union, p. C.1. (2 total pages).
Home-tribe.net, http://washingtondc stribe meUmessage/24434dIb-817b-4580 -aa42 -3bffa15f26a?page=1 , (4 pages), printed from Internet Dec. 13, 2004, message dated Oct. 19, 2003.
http://www.friendster.com, (17 pages), Dec. 2004.
http://www.knockrnail.com/support/newsettings.jpg, as accessed on Dec. 4. 2003.
"Icq.anywhere, Email Features-Email Center-ICQ.com," retrieved Apr. 29, 2004 from the World Wide Web: http://www.icq.com/email/popular-features.html, pp. 1-5.
Ion Adroutsopoulos et al., "Learning to Filter Spam E-Mail: A Comparison of a Naive Bayesian and a Memory-Based Approach", University of Athens, Jun. 2000, pp. 1-12.
Ipipi Frequently Asked Questions; Nov. 6, 2002; ipipi.com ; pp. 1-2.
Ignite Software: Parent Tools Feature Set, "Parent Tools Features," http://www.parent-tools.com/features.htm, Ignite Software, pp. 1-3, as accessed on Dec. 10, 2003.
ICQ 99a, "Welcome to ICQ version 99a", XP-002163918, ICQ Inc., Nov. 1998.
"Instant Messaging is Everyone's Business," Yahoo Business Messenger, Yahoo!, Mar. 2003.
IBM Lotus Software, Sametime Everyplace FAQ Overview Information, pp. 1-3, http://www.lotus.com/products/wireless.nsf/allpublic . . . , (visited Jul. 28, 2003).
IBM Lotus Software, Sametime Everyplace Wireless Collaboration that's Fit for e-Business, pp. 1-6, http://www.lotus.com/products.wireless.nsf/allpublic . . . , (visited Jul. 28, 2003).
IM Means Business IEEE Spectrum, Nov. 2002.
imForwards.com-FAQ's; Oct. 21, 2003.
Index of /tarvizo/oldfiles/elips/tnt-2.4, Jul. 2, 2001, TNT, http://web.mit.edu/tarvizo/oldfiles/elips/tnt-2.4/.
Instant messaging in teen life, Grinter, R.E. and Palen, L., Proceedings of the 2002 ACM conference on Computer supported cooperative work, pp. 21-30, Nov. 2002, ACM Press, New York, NY, USA.
Instant Messaging with Mobile Phones to Support Awareness, Mitsuoka, M. and Watanabe, S. and Kakuta, J. and Okuyama, S., pp. 223-230, Jan. 2001, IEEE.
"Idea for Online Networking Brings Two Entrepreneurs Together," Patents: Idea for Online Networking Brings Two Entrepreneurs Together, reprinted from http://www.nytimes.com/2003/12/01/technology/technology-media-patents-idea-for-online-networking-brings-two-entrepreneurs.htmlOlpatt.html?acbmn1+0 &adxnnlx=107029 ... , printed on Nov. 5, 2004 (2 pages).
"Instant Messaging for Gamers," PC Gamer, May 2004, vol. 11, No. 5, (2 pages).
J. Felix Hampe et al., Mobile Electronic Commerce: Reintermediation in the Payment System, Electronic Commerce: The End of the Beginning 13th International Bled Electronic Commerce Conference Bled, Slovenia, Jun. 19-21, 2000.
J. Dudley, "Telstra targets Net spammers", news.com.au , Dec. 2, 2003.
Jabber, Inc., Jabber Wireless Gateway Overview, May 2001.
"Jabber" http://www.jabber.com/index.cgi?CONTENTID=9, as accessed on Dec. 4, 2003.
Jennifer B. Lee, "From 100 countries, a Google snapshot of what's going on," International Herald Tribune, Nov. 29, 2002, pp. 1-3, http://www.iht.com.
Joanna Glasner, "Social Nets Find Friends in VCs", Nov. 17, 2003, available at http://www.wired.com/culture/lifestyle/news/2003/11/61227?currentPage=a1.
Jonathan B Postel, "Simple Mail Transfer Protocol", RFC788, Information Science Institute, Nov. 1981.
Julian Byrne, "My Spamblock was thrwarting UCE address culling programs", news.admin.net-abuse.e-mail, Jan. 19, 1997.
"Knock Settings ServersTab," http://www.knockmail.com/support/advserverset.html, pp. 1-2, as accessed on Dec. 4, 2003.
Komatsu et al., "Text Input with Dynamic Abbreviation Expansion," IPSJ SIG Notes, vol. 2001, No. 87, Sep. 14, 2008, pp. 133-138, in Japanese with a partial English Translation.
Kirk Scott, Ubique's Virtual Places: Communication and interaction on the World Wide Web, 1 page, http://www.w3.org/collabroation/workshop/proceedings/p2.html, (visted Jul. 28, 2003).
Kyungkoo Jun, et al., "Agent-Based Resource Discovery", IEEE (Feb. 2000), 10 pages.
Laliberte et al., "A Protocol for Scalable Group and Public Annotations," Elsevier, Apr. 1995, pp. 911-918.
Leander Kahney, "Will You Buy a Car From This Man?", Oct. 6, 2003, pp. 1-3, available at http://www.wired.com/techbizlmedia/news/2003/10/60703.
"Learning Spam: Simple Techniques for Freely-Available Software," Bart Massey et ai, Computer Science Dept., Portland, OR USA, Apr. 2003, pp. 1-14.
"Lotus Instant Messaging Everyplace FAQ," retrieved Apr. 29, 2004 from the World Wide Web: http://www.lotus.com/products/product4nsf/wdocs/249c6f083166cd3e85256d7300714407, (3 pages).
Lieberman, H., "Letizia: An Agent that Assists Web Browsing", Aug. 20, 1995, pp. 924-929.
"Listserv Control for KnockKnock," http://www.knockmail com/supporUlistservcont.html, pp. 1, as accessed on Dec. 4, 2003.
Luis Felipe Cabrera et aI., "Herald: Achieving a Global Event NotificationService", Microsoft Research, May 2001.
M. Castelluccio, "E-mail in Real Time", Strategic Finance, Sep. 1999, INSPEC p. 10.
M. Day, S Aggarwal, G Mohr, J. Vincent, RFC 2279 Instant Messaging/Presence Protocol Requirements, Feb. 2000.
M. Meola et al., "Real-Time Reference Service for the Remote User: From the Telephone and Electronic Mail to Internet Chat, Instant Messaging and Collaborative Software", Reference Librarian, Dec. 1999, INSPEC p. 8.
M. Smith et al.; Conversation Trees and Threaded Chats; Collaboration & Multimedia Group, Microsoft Research, Redmond, WA, Feb. 2000.
"Managing your Addresses in Knockmail," http://www.knockmail.com/supporUmanaddresses.html, pp. 1-2, as accessed on Dec. 4, 2003.
McMurray, Susan, "Shield your children from unsuitable Internet content," http://www.microsoft.com/canada/home/internet&security/2.4.8protectwithparentalcontrolshowtosafeguardyourcomputer.asp#, Microsoft Home Magazine, pp. 1-3, as accessed on Dec. 10, 2003.
Mark Handel et al., "TeamPortal: Providing Team Awareness on the Web", Dec. 2000.
McKendrick, Joseph; "Internet Call Centers: New Era in Customer Service", Feb. 2002; VIO, n2, (4 pages).
Microservices: CommWorks Find Me-Follow Me Application; Dec. 11, 2002; commworks.com; pp. 1-2.
Microservices: CommWorks Message Alert System; Dec. 11, 2002; commworks.com; pp. 1-3.
Microservices: CommWorks Message Delivery System; Dec. 11, 2002; commworks.com; pp. 1-2.
Microsoft PressPass; Nov. 7, 2002; microsoft.com ; pp. 1-9.

(56) References Cited

OTHER PUBLICATIONS

Mobile instant messaging through Hubbub, Issacs, E. and Walendowski, A. and Ranganathan, D., Communications of the ACM, vol. 45, No. 9, pp. 68-72, Sep. 2002, ACM Press New York, NY USA.

Midorikawa, et al., "Part 2 Build up a Comfortable Search Environment via Customization by Rules," PC Japan, vol. 7, No. 10, pp. 172-176, in Japanese with a partial English Translation of p. 172, Nov. 2002.

Mozilla, www.mozilla.org/projects/ml/autocomplete, Mar. 13, 2003.

Moore, J. "AOL's Grand Goal; America Online seeks to transform itself into a major Internet player,"Information Week, Jul. 31, 1995, lines 7-23, pp. 38-42.

N. Liew Kwek Sing; AOL ICQ vs. MSN Messenger; Department of Electronic and Computer Science, University of Southampton, Mar. 2003.

Nardi, BA, Whittaker, S. and Bradner, E., Feb. 2000. Interaction and Outeraction: instant messaging in Action. In Proceedings of the 2000 ACM Conference on Computer Supported Cooperative Work (Philadelphia, Pennslyvannia, USA.) CSCW '00. ACM New York, NY, 79-88.

Nextel Announces On-Line Paging Service Provided by Wireless Services—First Wireless Telephone Messaging Service to Offer Delivery Confirmation, Aug. 12, 1998, NY.

Net Alerts Overview; Nov. 7, 2002; microsoft.com ; pp. 1-3.

Neo Mai, Ken Neo. "Buying and selling on the internet; [Computimes, 2* Edition]." New Straits Times. Kuala Lumpur: Jun. 28, 2001. p. 53.

Online! Feb. 1, 2003, pp. 1-2, XP002297111, Webpage of Slipstick Systems: To add addresses automatically to Microsoft Outlook Contacts, http://web.archive.org/web/20030201082058/http://www.slipstick.com/contacts/addauto.htm>, retrieved on Sep.17, 2004 the whole document.

Olsen, Stefanie, "Will instant messaging become instant spamming?,". http://news.com.com/2100-1023 -252765.html?legacy=cnet, Feb. 16, 2001, pp. 1-4.

Ozmosys Enterprise; Nov. 7, 2002; ozmosys.com ; pp. 1-3.

"Pending Database for KnockKnock," http://www.knockmail coml support/penddatabase.html, pp. 1, as accessed on Dec. 4, 2003.

"Preview Pending Emails in KnockMail," http://www.knockmail.com/supporUpreviewemail.html, pp. 1-2, as accessed on Dec. 4, 2003.

"Protect Your Privacy," MSN Features, http://messenger.msn.com/Feature/Privacy.aspx, as accessed on Dec. 2, 2003.

Parviainen et al., "Mobile Instant Messaging", Jul. 3, 2003 IEEE.

Patrice Godefroid et al., "Ensuring Privacy in Presence Awareness Systems: An Automated Verification Approach". Feb. 2000.

Paul Mutton, "PieSpy Social Network Bot-Inferring and Visualizing Social Networks on IRC", jibble.org, http://lister.linux-srv.anlx.net/piespy, © 2001-2004, pp. 1-18, Mar. 18, 2004.

Per E. Pedersen et al.; Using the Theory of Planned Behavior to Explain Teenager's Adoption of Text Messaging Services; Agder University College, Jun. 2002.

Per E. Pedersen; The Adoption of Text Messaging services among Norwegian Teens: Development and Test of an Extended Adoption Model; SNF-Report No. 23/02; Samfunns-Og Naeringslivsforskning As Bergen, Jun. 2002.

Phillips Business Information corporation—Aug. 23, 1999—Instant messaging has emerged as one of the most popular communication mediums in the world.

Prodigy Launches 100 Interest Groups on the World Wide Web; All Sites Have Deep Links to Chat and Newsgroups; Topics Range from "Adventure Travel" and "Astrology" to "Virtual Reality" and "Wrestling", Business Wire, Sep. 27, 1995, 4 Pages.

"Plaxo-Update Your Address Book," Plaxo Contact Networks, reprinted from http://web.archive.org/web/20030218233638/http://www.plaxo.com printed on Nov. 5, 2004 (available on Feb. 18, 2003), (1 page).

"Plaxo", Plaxo, reprinted from http://web.archive.org/web/20041105072256/http://www.plaxo.com/ printed on Nov. 5, 2004 (available on Feb. 14, 2004) (2 pages).

Parent Tools TheUltimate in Monitoring and Controlling AIM "Parent Tools for AIM," http://www.parent-tools.com/screenshots.htm, pp. 1-4, as accessed on Dec. 10, 2003.

"Reputation Systems," Resnick et aI., Dec. 2000, Communications of the ACM, vol. 43, No. 12, pp. 45-48.

"RIM Road: Software: Internet & Network: Webmessenger RIM J2ME/Instant Messaging," retrieved Apr. 29, 2004 from the World Wide Web: http://www.rimrod.com/software/rim//Webmessenger-RIM-J2ME-lnstant-Messaging-20 ... , pp. 1-4.

"Reflections on Friendster, Trust and Intimacy," Danah Boyd, Ubicomp 2003, Workshop Application for the Intimate Ubiquitous Computing Workshop. Seattle, WA, Oct. 12-15, 2003, (4 pages).

R. Movva & W. Lai, "MSN Messenger Service 1.0 Protocol", Aug. 1999, Internet Draft, http://toolsietf. org/id/draft-movva-msn-messenger-protocol-oo.bct, 28 pages.

Reichard, K., "AOL, ICO to Interoperate—But in a Limited Fashion," Oct. 30, 2002, InstantMessagingPlanet, available at www.instantmessagingplanet.com/public/articie.php/1490771.

Ryze home page, www.ryze.com , Dec. 21, 2003, available at http://web.archivesorg/web/20031221010006/http://ryze .com, printed Mar. 16, 2005, 13 pages.

R. Droms, "Dynamic Host Configuration Protocol", Network Working Group, Oct. 1993.

Richard S. Hall, "The Event Desktop: Supporting Event-Enabled Clients on the Web", Freie University, Berlin. Retrieved on May 21, 2013.

Roscheisen et al., "Beyond Browsing: Shared Comments, SOAPs, Trails, and On-line Communities," Elsevier, Apr. 1995, pp. 739-749.

S. Okuyana et al., "New Mobile Service Based on Instant Messaging Technology", Fujitsu, Apr. 2001, INSPEC p. 1.

S. Ortiz, Jr., "Instant Messaging: No Longer Just Chat", Computer, Mar. 2001, INSPEC p. 6.

Schulzrinne, H.; Rosenberg J., "The Session Initiation Protocol: Internet-centric signaling," Communications Magazine, IEEE, vol. 38, No. 10, pp. 134-141, Oct. 2000.

SproWuest Wireless Instant messaging (Nov. 22, 1999) InfoSpace.com, pp. 1-2.

"Six Degrees—New Programs Help Companies 'Mine Workers' Relationships for Key Business Prospects," William M. Bulkeley et aI., Marketplace, The Wall Street Journal, Aug. 4, 2003, (3 pages).

SM Cherry "Talk is Cheap, Text is Cheaper" (IEEE Spectrum May 2003).

"Social Network Fragments: An Interactive Tool for Exploring Digital Social Connections." Danah Boyd, Jeff Potter. Sketch at SIGGRAPH 2003. San Diego, California: ACM, Jul. 27-31, 2003, (1 page).

"Social Networking for Business: Release 0.5," Esther Dyson, Esther Dyson's Monthly Report, vol. 21, No. 10, Nov. 25, 2003, www.edventure.com , (36 pages).

"Support Vector Machines for Spam, Categorization," Harris Drucker et aI., IEEE Transactions on Neural Networks, vol. 10, No. 5, Sep. 1999, pp. 1048-1054, (7 pages).

"Support Vector Machines," Marti Hearst, IEEE Intelligent Systems, Jul./Aug. 1998, pp. 18-28.

"Social Sites Clicking With Investors," Washingtonpost.com: Social Sites Clicking With Investors, reprinted from http://www.washingtonpost.com/ac2/wp-dyn/A32066-2003Nov12?language=printer printed on Nov. 5, 2004, (2 pages).

"Social Social Networks: Deodorant for the Soul?," Esther Dyson, Esther Dyson's Monthly Report, vol. 21, No. 11, Dec. 12, 2003, www.edventure.com, (36 pages).

"Socialware: Multiagent Systems for Supporting Network Communities," Hattori et aI., Mar. 1999, Association for Computing Machinery, Communications of the ACM, vol. 42, Issue 3, (6 pages).

"Spoke Builds on Social Networking Patent Portfolio," Spoke Builds on Social Networking Patent Portfolio, reprinted from http://www.internetnews.com/ent-news/print.php/3073621 printed on Nov. 5, 2004(3 pages).

Solutions Smartdelivery; Nov. 6, 2002; centerpost.com ; pp. 1-2.

(56) References Cited

OTHER PUBLICATIONS

"SurfControl Instant Message Filter," Instant Message Filter, SurfControl pic. Apr. 2003.
"Spammers Target Instant Message Users," http://www.bizreport.com/article.php?art id=5507 Nov. 13, 2003, pp. 1-4.
"SWF Seeks Attractive Head Shot; To Stand Out, Online Daters Pay for Professional Photos; Cropping out the Ex-Wife," Leiber, Nov. 19, 2003, The Wall Street Journal, p. D.1.
"SVM-based Filtering of E-mail Spam with Content-specific Misclassification Costs," Aleksander Kolcz et al., TextDM '2001 (IEEE ICDM-2001 Workshop on Text Mining); San Jose, CA, 2001, pp. 1-14, Nov. 2001.
The Wall Street Journal article "Esniff Ferrets Out Misbehavior by 'Reading' E-Mail, Web Visits," Katherine Lange, interactive.wsj.com, Apr. 27, 2001, Tech Q&A.
The Early Report-The Early Show segment, "Big Brother in the Corner Office," Julie Chen, cbsnews.com/earlyshow/caught/techage/20001228esniff.shtml, Dec. 28, 2000: Tech Age.
"The first Social Software . . . A true Social Adventure," Huminity-Social Networking, Chat Software, Create Personal Free Blogs and My Group . . . , reprinted from http://www.huminity.com/ printed on Nov. 5, 2004 (2 pages).
"The eSniff Product Overview," eSniff: Define Your e-Boundaries, www.esniff.com/productoverview.html, May 15, 2001.
"Text Categorization with Support Vector Machines: Learning with Many Relevant Features," Thorsten Joachims, University of Dortmund, Computer Science Dept., LS-8 Report 23, 1998, (18 paqes), Nov. 27, 1997, revised Apr. 19, 1998.
"Technology Journal-Are You Satisfied? EBay's Battle Against Fraud Rests Primarily on a Simple Concept: Customer Feedback," Wingfield, Sep. 23, 2002, Asian Wall Street Journal, p. T.8, (4 total pages).
"Technology Journal: Changing Chat—Instant Messaging is Taking Off, and for Some Users It's Nuzzling Out the Phone," Nick Wingfield, Asian WSJ, Sep. 2000, (5 pages).
"Trillian Discussion Forums-HOWTO: Import ICQ 2003a Contact List," retrieved Apr. 29, 2004 from the World Wide Web: http://trillian.cc/forums/showthread.php?s+&threadid=36475, pp. 1-2.
"Technical Solutions for Controlling Spam," Shane Hird, Proceedings of AUUG2002, Melbourne, Sep. 4-6, 2002, (17 pages).
Tara Hall, Lotus Developer Domain, "Same Place, Sametime with Chris Price", pp. 1-8, http://www.10.lotus.com/ldd/today.nsf/DisplayForm/ . . . , (Visited Jul. 28, 2003), Sep. 2002.
Teraitech; Nov. 7, 2002; teraitech.com ; 1 page.
Uhara7, "Re. being invisible to all but one person on your list", alt.chat-programs.icq, Feb. 29, 2000.
Upoc Quick Tour; Nov. 6, 2002; upoc.com; pp. 1-9.
Upoc General Help; Nov. 6, 2002; upoc.com; pp. 1-2.
Upoc NYSale; Nov. 6, 2002; upoc.com; pp. 1-2.
Upoc Entertainment Picks; Nov. 6, 2002; upoc.com; pp. 1-3.
Upoc Frequently Asked Questions; Nov. 6, 2002; upoc.com; pp. 1-6.
Upside, About Our Product; upsideweb.com ; pp. 1-5, Nov. 2002.
V, Vittore, "The Next Dial Tone? [instant messaging]", Telephony, Oct. 16, 2000, INSPEC p. 8.
VisiblePath webpages, www.visiblepath.org , Dec. 3, 2003, available at http://web. archive.org/web/20031203132211/http://www.visiblepath.com, printed Mar. 16, 2005, 5 pages.
Walther, M., "Supporting Development of Synchronous Collaboration Tools on the Web with GroCo," Feb. 2-9, 1996, pp. 1-6.
Way-bac machine, handspring treo 270, Jun. 1, 2002.
"Wireless Instant Messaging Solution . . . " Newswire, NY Dec. 8, 1999 Atmobile corp, pp. 1-2.
WebleySystems; CommuniKate Unified Communications Features List; Dec. 11, 2002; webley.com; pp. 1-3.
"Welcome to Huminity World of Connections," Huminity-Home, reprinted from http://web.archive.org/web/20030228131435/www.huminity.com/default.php?intemationa . . . printed on Nov. 5, 2004 (available on Feb. 2, 2003) (1 page).

WebmasterWorld.com Inc., "HTML and Browsers", Mar. 5, 2001, Internet: www.webmaster.com/forum21/637.htm, (2 pages).
www.yahoo.com, Yahoo! Messenger for Text Messaging, Jul. 2002.
Yiva Hard af Segerstad et al.; Awareness of Presence, Instant Messaging and WebWho; Department of Linguistics, Goteborg University; Sweden, Dec. 2000.
Yahoo! Buzz Index, Feb. 13, 2003, 1 page, http://buzz.yahoo.com/overall/.
Yahoo! Buzz Index, Nov. 10, 2002, 1 page.
Yahoo! Messenger, "Messenger Help," (4 total pages) Nov. 2002.
ZeroDegrees home page, www.zerodegrees.com , Jan. 24, 2004, available at http://web.archive.org/web/20040204153037/www.zerodegrees.com/home.htm, printed Mar. 16, 2005, 2 pages.
Zephyr on Athena (AC-34), http://web.mit.edu/olh//Zephyr/Revision.html, 11 pages, Retrieved on May 17, 2013.
European Search Report, European Application No. 03781972.9-2201, dated Feb. 8, 2008, 5 pages.
Notification of Transmittal of the International Search Report and the Written Opinion of the International Searching Authority for International Application No. PCT/US2004/029291; dated Dec. 27, 2005; 9 pages.
English translation of an Office Action issued in corresponding Japanese Application No. 2004-570418 dated Aug. 7, 2008.
English translation of an Office Action issued in corresponding Japanese Application No. 2004-570418 dated Feb. 5, 2009.
International Search Report and Written Opinion dated Feb. 15, 2006 for International Application No. PCT/US05/07204, (10 pages).
International Search Report and Written Opinion issued in International Application No. PCT/US05/45663, dated Apr. 11, 2008.
International Search Report issued in Application Serial No. PCT/US05/08476, dated Oct. 16, 2006, (3 pages).
International Search Report issued in International Application No. EP03731244, dated Aug. 30, 2005, (4 pages).
Supplementary European Search Report issued in European Application No. EP05728303, dated Jan. 9, 2009, (4 pages).
Supplementary European Search Report issued in European Application No. 05857099.51238/1836596, PCT/US2005045663, dated Nov. 7, 2008, (5 pages).
International Search Report, PCT/US03/36656, dated Apr. 22, 2004.
Supplementary European Search Report dated Jun. 7, 2006 for Application No. EP 03811631, 3 pages.
Notification of Transmittal of the International Search Report or the Declaration dated Jun. 23, 2004 for International Application Serial No. PCT/US03/36795.
Office Action issued in Chinese Application No. 200480013443.9, dated Mar. 6, 2009, 20 pages, including English translation.
Office Action dated Apr. 21, 2005 for European Application No. 97946924.4-1238, 6 pages.
Office Action dated May 21, 2008 for European Application No. 97946924.4-1238, 10 pages.
International Search Report and Written Opinion for International Application No. PCT/US05/45630, dated Oct. 23, 2006.
International Search Report dated Jan. 27, 2005 for International Application No. PCT US2004/009422, International Filing dated Mar. 26, 2004.
International Search Report issued in International Application No. PCT/US03/36795 dated Jun. 23, 2004, 9 Pages.
International Search Report dated Dec. 27, 2005 for International Application No. PCT/US2004/29291, filed Sep. 8, 2004.
International Search Report, Application Serial No. PCT/US04/23382, dated Feb. 1, 2007, 12 pages.
International Search Report of PCT/US03/36654 dated Aug. 17, 2004.
International Standard, Information technology—telecommunications and information exchange between systems—private integrated services network-specifications, functional model and information flows—Short message service, ISO/IEC21989, Jul. 1, 2002.
European Office Communication issued in Application No. EP 97946924.4-1238 dated Apr. 5, 2007, 7 pages.
European Oral Proceedings issued in Application No. EP 97946924.4-1238 dated Feb. 6, 2007, 9 pages.

(56) References Cited

OTHER PUBLICATIONS

European Oral Proceedings issued in Application No. EP 97946924.4-1238 dated Oct. 7, 2007, 8 pages.
European Office Action, Application Serial No. 03 811 631.5-2201, dated Oct. 4, 2006, 4 pages.
European Search Report, Application No. EP 03811631, dated Jun. 23, 2006, 5 pages.
Office Action from the Canadian Intellectual Property Office in corresponding Canadian Application No. 2,506,417, dated Aug. 14, 2007, 3 pages.
Written Opinion dated Jan. 27, 2005 for International Application No. PCT/US2004/009422, International Filing dated Mar. 26, 2004.
Written Opinion dated Dec. 27, 2005 for International Application No. PCT/US2004/29291, filed Sep. 8, 2004.
U.S. Appl. No. 10/146,814, Dec. 11, 2006, Office Action.
U.S. Appl. No. 10/146,814, Jul. 2, 2007, Office Action.
U.S. Appl. No. 10/184,002, Jan. 9, 2007, Office Action.
U.S. Appl. No. 10/334,056, Nov. 29, 2004, Office Action.
U.S. Appl. No. 10/334,056, Jul. 6, 2005, Office Action.
U.S. Appl. No. 10/334,056, Oct. 31, 2005, Office Action.
U.S. Appl. No. 10/334,056, May 10, 2006, Office Action.
U.S. Appl. No. 10/334,056, May 21, 2007, Office Action.
U.S. Appl. No. 10/334,056, Nov. 5, 2007, Office Action.
U.S. Appl. No. 10/334,056, May 12, 2008, Office Action.
U.S. Appl. No. 10/334,056, Oct. 30, 2008, Office Action.
U.S. Appl. No. 10/633,636, Oct. 11, 2006, Office Action.
U.S. Appl. No. 10/651,303, Feb. 9, 2007, Office Action.
U.S. Appl. No. 10/651,303, Apr. 28, 2008, Office Action.
U.S. Appl. No. 10/651,303, Oct. 8, 2008, Office Action.
U.S. Appl. No. 10/651,303, May 1, 2009, Office Action.
U.S. Appl. No. 10/651,303, Nov. 27, 2009, Office Action.
U.S. Appl. No. 10/651,303, Mar. 11, 2011, Notice of Allowance.
U.S. Appl. No. 10/715,206, Sep. 27, 2007, Office Action.
U.S. Appl. No. 10/715,206, Jul. 25, 2008, Notice of Allowance.
U.S. Appl. No. 10/715,206, Jan. 27, 2009, Office Action.
U.S. Appl. No. 10/715,206, Aug. 13, 2009, Notice of Allowance.
U.S. Appl. No. 10/715,210, Sep. 27, 2007, Office Action.
U.S. Appl. No. 10/715,210, Apr. 14, 2008, Office Action.
U.S. Appl. No. 10/715,210, May 13, 2009, Office Action.
U.S. Appl. No. 10/715,210, Mar. 29, 2010, Notice of Allowance.
U.S. Appl. No. 10/715,211 Jan. 8, 2008, Office Action.
U.S. Appl. No. 10/715,211, Jul. 11, 2008, Office Action.
U.S. Appl. No. 10/715,211, Nov. 28, 2008, Office Action.
U.S. Appl. No. 10/715,211, Jun. 24, 2009, Office Action.
U.S. Appl. No. 10/715,211, Oct. 2, 2009, Notice of Allowance.
U.S. Appl. No. 10/715,211, Feb. 3, 2010, Office Action.
U.S. Appl. No. 10/715,211, Jul. 14, 2010, Office Action.
U.S. Appl. No. 10/715,211, Oct. 25, 2010, Notice of Allowance.
U.S. Appl. No. 10/715,213, Apr. 26, 2007, Office Action.
U.S. Appl. No. 10/715,213, Oct. 22, 2007, Office Action.
U.S. Appl. No. 10/715,213, Aug. 7, 2008, Office Action.
U.S. Appl. No. 10/715,213, Feb. 5, 2009, Office Action.
U.S. Appl. No. 10/715,213, Aug. 6, 2009, Office Action.
U.S. Appl. No. 10/715,213, Jul. 18, 2013, Office Action.
U.S. Appl. No. 10/715,213, Dec. 6, 2013, Notice of Allowance.
U.S. Appl. No. 10/715,214, Apr. 20, 2007, Office Action.
U.S. Appl. No. 10/715,214, Oct. 9, 2007, Office Action.
U.S. Appl. No. 10/715,215, Mar. 23, 2007, Office Action.
U.S. Appl. No. 10/715,215, Aug. 20, 2007, Office Action.
U.S. Appl. No. 10/715,215, Nov. 20, 2010, Notice of Allowance.
U.S. Appl. No. 10/715,216, Feb. 12, 2007, Office Action.
U.S. Appl. No. 10/715,216, Jan. 11, 2008, Office Action.
U.S. Appl. No. 10/715,216, Aug. 18, 2009, Office Action.
U.S. Appl. No. 10/723,040, Mar. 14, 2006, Office Action.
U.S. Appl. No. 10/723,040, Jun. 26, 2006, Office Action.
U.S. Appl. No. 10/723,040, Jan. 4, 2007, Office Action.
U.S. Appl. No. 10/723,040, Jun. 4, 2007, Office Action.
U.S. Appl. No. 10/723,040, Oct. 25, 2007, Office Action.
U.S. Appl. No. 10/723,040, May 21, 2008, Notice of Allowance.
U.S. Appl. No. 10/746,230, Mar. 17, 2009, Office Action.
U.S. Appl. No. 10/746,232, Mar. 18, 2009, Office Action.
U.S. Appl. No. 10/747,263, Mar. 5, 2008, Office Action.
U.S. Appl. No. 10/747,263, Sep. 5, 2008, Office Action.
U.S. Appl. No. 10/747,263, Feb. 11, 2009, Notice of Allowance.
U.S. Appl. No. 10/747,263, Jun. 2, 2009, Notice of Allowance.
U.S. Appl. No. 10/747,651, Mar. 5, 2008, Office Action.
U.S. Appl. No. 10/747,651, Feb. 20, 2009, Office Action.
U.S. Appl. No. 10/747,676, Sep. 21, 2007, Office Action.
U.S. Appl. No. 10/747,676, Mar. 31, 2008, Office Action.
U.S. Appl. No. 10/747,678, Sep. 14, 2007, Office Action.
U.S. Appl. No. 10/747,678, Mar. 27, 2008, Office Action.
U.S. Appl. No. 10/747,678, Jun. 12, 2008, Office Action.
U.S. Appl. No. 10/747,678, Dec. 15, 2008, Office Action.
U.S. Appl. No. 10/747,678, Jun. 5, 2009, Notice of Allowance.
U.S. Appl. No. 10/747,678, Jun. 19, 2009, Notice of Allowance.
U.S. Appl. No. 10/747,682, Oct. 11, 2007, Office Action.
U.S. Appl. No. 10/747,682, Apr. 7, 2008, Office Action.
U.S. Appl. No. 10/747,682, Aug. 19, 2008, Office Action.
U.S. Appl. No. 10/747,682, Mar. 18, 2009, Office Action.
U.S. Appl. No. 10/747,682, Nov. 2, 2009, Office Action.
U.S. Appl. No. 10/747,682, Jun. 11, 2010, Office Action.
U.S. Appl. No. 10/747,682, Dec. 2, 2010, Office Action.
U.S. Appl. No. 10/747,682, Oct. 5, 2011, Notice of Allowance.
U.S. Appl. No. 10/825,617, Jun. 24, 2008, Office Action.
U.S. Appl. No. 10/825,617, Mar. 9, 2009, Notice of Allowance.
U.S. Appl. No. 10/825,617, Oct. 9, 2009, Notice of Allowance.
U.S. Appl. No. 10/895,421, Jan. 9, 2007, Office Action.
U.S. Appl. No. 10/895,421, Jun. 27, 2007, Office Action.
U.S. Appl. No. 10/895,421, Apr. 16, 2008, Office Action.
U.S. Appl. No. 10/895,421, Nov. 19, 2008, Notice of Allowance.
U.S. Appl. No. 10/895,421, Apr. 17, 2009, Notice of Allowance.
U.S. Appl. No. 10/974,969, Mar. 17, 2008, Office Action.
U.S. Appl. No. 10/974,969, Mar. 6, 2009, Office Action.
U.S. Appl. No. 10/974,969, Sep. 8, 2009, Notice of Allowance.
U.S. Appl. No. 10/981,460, Aug. 20, 2008, Office Action.
U.S. Appl. No. 11/015,423, Mar. 2, 2009, Office Action.
U.S. Appl. No. 11/015,424, Mar. 19, 2008, Office Action.
U.S. Appl. No. 11/015,424, May 1, 2009, Office Action.
U.S. Appl. No. 11/015,476, Mar. 2, 2009, Office Action.
U.S. Appl. No. 11/017,204, Dec. 12, 2007, Office Action.
U.S. Appl. No. 11/017,204, Jun. 23, 2008, Office Action.
U.S. Appl. No. 11/023,652, Aug. 30, 2010, Office Action.
U.S. Appl. No. 11/023,652, May 12, 2011, Office Action.
U.S. Appl. No. 11/023,652, Dec. 8, 2011, Office Action.
U.S. Appl. No. 11/023,652, Sep. 24, 2012, Office Action.
U.S. Appl. No. 11/023,652, Oct. 25, 2013, Office Action.
U.S. Appl. No. 11/023,652, Apr. 29, 2014, Office Action.
U.S. Appl. No. 11/079,522, Oct. 16, 2008, Office Action.
U.S. Appl. No. 11/079,522, Apr. 3, 2009, Office Action.
U.S. Appl. No. 11/237,718, Apr. 2, 2009, Office Action.
U.S. Appl. No. 11/408,166, Mar. 18, 2009, Office Action.
U.S. Appl. No. 11/408,166, Oct. 7, 2009, Office Action.
U.S. Appl. No. 11/408,166, Sep. 2, 2010, Office Action.
U.S. Appl. No. 11/408,166, Apr. 13, 2011, Office Action.
U.S. Appl. No. 11/408,166, Oct. 17, 2011, Office Action.
U.S. Appl. No. 11/464,816, Apr. 21, 2009, Office Action.
U.S. Appl. No. 11/574,831, Sep. 18, 2009, Office Action.
U.S. Appl. No. 11/574,831, May 16, 2010, Office Action.
U.S. Appl. No. 11/574,831, Sep. 9, 2010, Office Action.
U.S. Appl. No. 11/574,831, Apr. 15, 2011, Office Action.
U.S. Appl. No. 11/574,831, Oct. 13, 2011, Notice of Allowance.
U.S. Appl. No. 12/236,255, Apr. 2, 2010, Office Action.
U.S. Appl. No. 12/236,255, Sep. 17, 2010, Office Action.
U.S. Appl. No. 12/236,255, Feb. 3, 2011, Office Action.
U.S. Appl. No. 12/548,338, Nov. 9, 2010, Office Action.
U.S. Appl. No. 12/548,338, May 19, 2011, Office Action.
U.S. Appl. No. 12/548,338, Dec. 9, 2011, Notice of Allowance.
U.S. Appl. No. 12/626,099, Sep. 17, 2010, Office Action.
U.S. Appl. No. 12/626,099, Mar. 30, 2011, Notice of Allowance.
U.S. Appl. No. 12/689,699, Feb. 28, 2011, Office Action.
U.S. Appl. No. 12/689,699, Apr. 23, 2012, Office Action.
U.S. Appl. No. 12/689,699, Oct. 9, 2012, Notice of Allowance.
U.S. Appl. No. 12/689,699, Mar. 11, 2013, Office Action.

(56) References Cited

OTHER PUBLICATIONS

U.S. Appl. No. 12/689,699, Jun. 18, 2013, Notice of Allowance.
U.S. Appl. No. 13/023,256, Jun. 21, 2011, Office Action.
U.S. Appl. No. 13/023,256, Nov. 28, 2011, Office Action.
U.S. Appl. No. 13/023,256, Apr. 16, 2012, Office Action.
U.S. Appl. No. 13/023,256, Sep. 28, 2012, Office Action.
U.S. Appl. No. 13/023,256, Jun. 21, 2013, Office Action.
U.S. Appl. No. 13/023,256, Nov. 7, 2013, Office Action.
U.S. Appl. No. 13/048,312, Nov. 22, 2011, Office Action.
U.S. Appl. No. 13/048,312, Mar. 13, 2012, Notice of Allowance.
U.S. Appl. No. 13/184,414, Aug. 17, 2012, Notice of Allowance.
U.S. Appl. No. 13/184,414, Nov. 28, 2012, Notice of Allowance.
U.S. Appl. No. 13/184,414, Jan. 29, 2013, Notice of Allowance.
U.S. Appl. No. 13/189,972, Apr. 21, 2014, Office Action.
U.S. Appl. No. 13/189,972, Oct. 29, 2013, Office Action.
U.S. Appl. No. 13/189,972, Jul. 24, 2013, Office Action.
U.S. Appl. No. 13/189,972, Dec. 21, 2012, Office Action.
U.S. Appl. No. 13/189,972, Aug. 22, 2012, Notice of Allowance.
U.S. Appl. No. 13/189,972, May 7, 2012, Office Action.
U.S. Appl. No. 13/189,972, Jan. 5, 2012, Office Action.
U.S. Appl. No. 13/189,972, Sep. 2, 2011, Office Action.
U.S. Appl. No. 13/372,371, May 9, 2013, Office Action.
U.S. Appl. No. 13/372,371, Nov. 29, 2013, Office Action.
U.S. Appl. No. 13/372,371, Mar. 26, 2014, Office Action.
U.S. Appl. No. 13/442,226, Apr. 14, 2014, Office Action.
U.S. Appl. No. 13/507,429, Oct. 25, 2013, Office Action.
U.S. Appl. No. 13/507,429, Mar. 28, 2014, Office Action.
U.S. Appl. No. 13/614,640, Oct. 2, 2013, Office Action.
U.S. Appl. No. 13/614,640, Jan. 31, 2014, Office Action.
U.S. Appl. No. 13/614,640, Jun. 11, 2014, Notice of Allowance.
U.S. Appl. No. 13/614,781, Jun. 4, 2013, Office Action.
U.S. Appl. No. 13/614,781, Sep. 12, 2013, Office Action.
U.S. Appl. No. 13/614,781, Dec. 26, 2013, Office Action.
U.S. Appl. No. 13/614,781, Apr. 2, 2014, Office Action.
U.S. Appl. No. 13/617,270, Sep. 12, 2013, Office Action.
U.S. Appl. No. 13/617,270, Apr. 10, 2014, Office Action.
U.S. Appl. No. 13/617,330, Sep. 12, 2013, Office Action.
U.S. Appl. No. 13/617,330, Apr. 8, 2014, Office Action.
U.S. Appl. No. 13/617,350, Mar. 27, 2014, Office Action.
U.S. Appl. No. 13/619,009, Mar. 7, 2013, Office Action.
U.S. Appl. No. 13/619,009, Sep. 19, 2013, Office Action.
U.S. Appl. No. 13/619,009, Mar. 12, 2014, Notice of Allowance.
U.S. Appl. No. 13/619,009, Apr. 11, 2014, Notice of Allowance.
U.S. Appl. No. 13/619,036, Mar. 26, 2013, Office Action.
U.S. Appl. No. 13/619,036, Sep. 16, 2013, Office Action.
U.S. Appl. No. 13/619,036, Mar. 21, 2014, Office Action.
U.S. Appl. No. 13/619,054, Mar. 26, 2013, Office Action.
U.S. Appl. No. 13/619,054, Oct. 10, 2013, Office Action.
U.S. Appl. No. 13/619,054, Apr. 7, 2014, Office Action.
U.S. Appl. No. 13/620,851, Feb. 8, 2013, Office Action.
U.S. Appl. No. 13/620,851, Nov. 29, 2013, Office Action.
U.S. Appl. No. 13/620,851, Apr. 8, 2014, Office Action.
U.S. Appl. No. 13/620,853, Feb. 13, 2013, Office Action.
U.S. Appl. No. 13/620,853, Jan. 9, 2014, Office Action.
U.S. Appl. No. 13/620,856, Feb. 13, 2013, Office Action.
U.S. Appl. No. 13/620,856, Jan. 9, 2014, Office Action.
U.S. Appl. No. 13/361,141, Mar. 19, 2013, Office Action.
U.S. Appl. No. 13/361,141, Aug. 15, 2013, Office Action.
U.S. Appl. No. 13/361,141, Jan. 17, 2014, Office Action.
U.S. Appl. No. 13/729,318, Sep. 18, 2013, Office Action.
U.S. Appl. No. 13/729,318, Feb. 5, 2014, Office Action.
U.S. Appl. No. 13/731,124, Dec. 6, 2013, Office Action.
U.S. Appl. No. 13/755,990, Oct. 2, 2013, Office Action.
U.S. Appl. No. 13/755,990, Jan. 29, 2014, Office Action.
U.S. Appl. No. 13/755,990, May 16, 2014, Notice of Allowance.
U.S. Appl. No. 13/766,775, Sep. 19, 2013, Office Action.
U.S. Appl. No. 13/766,775, Mar. 24, 2014, Office Action.
U.S. Appl. No. 13/766,781, Nov. 27, 2013, Office Action.
U.S. Appl. No. 13/766,781 May 6, 2014, Office Action.
U.S. Appl. No. 13/766,785, Nov. 29, 2013, Office Action.
U.S. Appl. No. 13/766,785, May 14, 2014, Office Action.
U.S. Appl. No. 13/766,786, Nov. 27, 2013, Office Action.
U.S. Appl. No. 13/766,786, May 8, 2014, Office Action.
U.S. Appl. No. 13/766,779, Oct. 15, 2013, Office Action.
U.S. Appl. No. 13/766,779, Apr. 11, 2014, Office Action.
U.S. Appl. No. 13/619,036, Oct. 26, 2015, Office Action.
U.S. Appl. No. 13/620,839, Dec. 23, 2015, Notice of Allowance.
U.S. Appl. No. 13/620,853, Oct. 30, 2015, Office Action.
U.S. Appl. No. 13/619,036, May 15, 2015, Office Action.
U.S. Appl. No. 13/620,856, Jun. 17, 2015, Office Action.
U.S. Appl. No. 13/620,851, Nov. 25, 2016, Office Action.
U.S. Appl. No. 13/620,853, Oct. 5, 2016, Office Action.
U.S. Appl. No. 14/447,895, Oct. 3, 2016, Office Action.
U.S. Appl. No. 12/236,255, Mar. 30, 2016, Office Action.
U.S. Appl. No. 13/442,226, Jan. 29, 2016, Notice of Allowance.
U.S. Appl. No. 13/620,851, Jan. 21, 2016, Office Action.
U.S. Appl. No. 14/448,533, filed Jul. 31, 2014, Hullfish.
U.S. Appl. No. 11/023,652, Nov. 21, 2014, Notice of Allowance.
U.S. Appl. No. 13/619,036, Sep. 29, 2014, Office Action.
U.S. Appl. No. 13/619,054, Oct. 20, 2014, Office Action.
U.S. Appl. No. 13/620,851, Sep. 26, 2014, Office Action.
U.S. Appl. No. 13/442,226, Apr. 8, 2015, Office Action.
U.S. Appl. No. 13/619,036, Mar. 23, 2015, Notice of Allowance.
U.S. Appl. No. 13/619,054, Mar. 30, 2015, Notice of Allowance.
U.S. Appl. No. 13/620,853, Feb. 4, 2015, Office Action.
U.S. Appl. No. 13/620,856, Dec. 24, 2014, Office Action.
U.S. Appl. No. 13/620,839, Mar. 2, 2015, Office Action.
U.S. Appl. No. 10/715,213, filed Nov. 18, 2003, Schlegel.
U.S. Appl. No. 10/974,969, filed Oct. 28, 2004, Wick.
U.S. Appl. No. 11/023,652, filed Dec. 29, 2004, Odell.
U.S. Appl. No. 13/361,141, filed Jan. 30, 2012, Appelman et al.
U.S. Appl. No. 14/447,895, filed Jul. 31, 2014, Odell.
U.S. Appl. No. 14/447,902, filed Jul. 31, 2014, Odell.
B. Raman et al., "Universal Inbox—Providing Extensible Personal Mobility and Service Mobility in an Integrated Communication Network", Proceedings Third IEEE Workshop on Mobile Computing Systems and Applications, Oct. 2000, INSPEC p. 7.
"Creating a Single List of Contacts—Google Scholar" available at http://scholar.google.com/scholar?hl=en&lr= &q=creating+a+single+list+list+of+contacts&as . . . (Mar. 27, 2007), 10 pages.
"CrushParty.com: Help," retrieved Jun. 12, 2002 from the World Wide Web: http//www.crushparty.com/help.jsp, 3 pages.
"Digital Artifacts for Remembering and Storytelling: Post History and Social Network Fragments," Viegas et al., retrieved from the World Wide Web: http://we.media.mit.edu/-fviegas/papers/posthistory.snfpdf, (10 pages), Jan. 2004.
Danny Sullivan, "What People Search for," Search Engine Watch, pp. 1-4, http://searchenginewatch.com/facts/searches.html (visted Feb. 13, 2003).
"Finding Others Online: Reputation Systems for Social Online Spaces," Jensen et al., Apr. 20-25, 2002, CHI, Minneapolis, Minnesota, vol. 4, Issue 1, pp. 447-454.
H. Schulzrinne et al., "The IETF Internet Telephony Architecture and Protocols", IEEE Network, May-Jun. 1999, INSPEC p. 11.
Home-tribe.net, http://washingtondc stribe meUmessage/24434dlb-817b-4580 -aa42 -3bffal5 f26a?page=1 , (4 pages), printed from Internet Dec. 13, 2004, message dated Oct. 19, 2003.
http://www.frierldster.com , (17 pages), Dec. 2004.
"Icq.anywhere, Email Features—Email Center—ICQ.com," retrieved Apr. 29, 2004 from the World Wide Web: http://www.icq.com/email/popular-features.html, pp. 1-5.
"Idea for Online Networking Brings Two Entrepreneurs Together," Patents: Idea for Online Networking Brings Two Entrepreneurs Together, reprinted from http://www.nytimes.com/2003/12/01/technology/technology-media-patents-idea-for-online-networking-brings-two-entrepreneurs.htmlOlpatt.html?acbmn1+0 &adxnnlx=107029 . . . , printed on Nov. 5, 2004 (2 pages).
Joanna Glasner, "Social Nets Find Friends in VCs", Nov. 17, 2003, available at http://www.wired.com/culture/lifestyle/news/2003/11/61227?currentPage=al.
Luis Felipe Cabrera et al., "Herald: Achieving a Global Event NotificationService", Microsoft Research, May 2001.

(56) References Cited

OTHER PUBLICATIONS

Online! Feb. 1, 2003, pp. 1-2, XP002297111, Webpage of Slipstick Systems: To add addresses automatically to Microsoft Outlook Contacts, http://web.archive.org/web/20030201082058/http://www.slipstick.com/contacts/addauto.htm>, retrieved on Sep. 17, 2004 the whole document.
Olsen, Stefanie, "Will instant messaging become instant spamming?,". http://news.com.com/2100-1023-252765.html?legacy=cnet, Feb. 16, 2001, pp. 1-4.
"Plaxo", Plaxo, reprinted from http://web.archive.org/web/20041105072256/http://www.plaxo.com/printed on Nov. 5, 2004 (available on Feb. 14, 2004) (2 pages).
"Reputation Systems," Resnick et al., Dec. 2000, Communications of the ACM, vol. 43, No. 12, pp. 45-48.
"RIM Road: Software: Internet & Network: Webmessenger RIM J2ME/Instant Messaging," retrieved Apr. 29, 2004 from the World Wide Web: http://www.rimrod.com/software/rim//Webmessenger-RIM-J2ME-Instant -Messaging-20 . . . , pp. 1-4.
R. Movva & W. Lai, "MSN Messenger Service 1.0 Protocol", Aug. 1999, Internet Draft, http://toolsietf.org/id/draft-movva-msn-messenger-protocol-oo.bct, 28 pages.
"Six Degrees—New Programs Help Companies 'Mine Workers' Relationships for Key Business Prospects," William M. Bulkeley et al., Marketplace, The Wall Street Journal, Aug. 4, 2003, (3 pages).
"Support Vector Machines for Spam, Categorization," Harris Drucker et al., IEEE Transactions on Neural Networks, vol. 10, No. 5, Sep. 1999, pp. 1048-1054, (7 pages).
"Socialware: Multiagent Systems for Supporting Network Communities," Hattori et al., Mar. 1999, Association for Computing Machinery, Communications of the ACM, vol. 42, Issue 3, (6 pages).
"The eSniff Product Overview," eSniff: Define Your e-Boundaries, www.esniff.com/product overview.html, May 15, 2001.
"Technology Journal—Are You Satisfied? EBay's Battle Against Fraud Rests Primarily on a Simple Concept: Customer Feedback," Wingfield, Sep. 23, 2002, Asian Wall Street Journal, p. T.8, (4 total pages).
Tara Hall, Lotus Developer Domain, "Same Place, Sametime with Chris Price", pp. 1-8, http://www.10.lotus.com/ldd/today.nsf/DisplayForm/ . . . , (Visited Jul. 28, 2003), Sep. 2002.

VisiblePath webpages, www.visiblepath.org , Dec. 3, 2003, available at http://web.archive.org/web/20031203132211/http://www.visiblepath.com, printed Mar. 16, 2005, 5 pages.
Supplementary European Search Report issued in European Application No. 05857099.5-1238/1836596, PCT/US2005045663, dated Nov. 7, 2008, (5 pages).
International Search Report dated Jan. 27, 2005 for International Application No. PCT US2004/009422, International Filing Date Mar. 26, 2004.
International Standard, Information technology—telecommunications and information exchange between systems—private integrated services network—specifications, functional model and information flows—Short message service, ISO/IEC21989, Jul. 1, 2002.
European Oral Proceedings issued in Application No. EP 97946924.4-1238 mailed Feb 6, 2007, 9 pages.
European Oral Proceedings issued in Application No. EP 97946924.4-1238 mailed Oct. 7, 2007, 8 pages.
Written Opinion dated Jan. 27, 2005 for International Application No. PCT/US2004/009422, International Filing Date Mar. 26, 2004.
U.S. Appl. No. 10/715,211, Jan. 8, 2008, Office Action.
U.S. Appl. No. 10/715,213, Apr. 26. 2007, Office Action.
U.S. Appl. No. 10/715,216, Jan. 11, 2008 Office Action.
U.S. Appl. No. 10/825,617, Sep. 10, 2009, Notice of Allowance.
U.S. Appl. No. 13/372,371, Jul. 1, 2014, Notice of Allowance.
U.S. Appl. No. 13/620,862, Jul. 24, 2014, Office Action.
U.S. Appl. No. 13/620,863, Aug. 1, 2014, Office Action.
U.S. Appl. No. 13/620,865, Aug. 6, 2014, Office Action.
U.S. Appl. No. 13/731,124, Jun. 30, 2014, Office Action.
U.S. Appl. No. 13/766,781, May 6, 2014, Office Action.
U.S. Appl. No. 13/620,853, Mar. 28, 2017, Office Action.
U.S. Appl. No. 14/322,911, Jan. 11, 2017, Office Action.
U.S. Appl. No. 14/447,902, Mar. 29, 2017, Office Action.
U.S. Appl. No. 14/448,533, Jan. 11, 2017, Office Action.
U.S. Appl. No. 14/447,895, May 10, 2017, Office Action.
U.S. Appl. No. 14/447,895, Nov. 3, 2017, Office Action.
U.S. Appl. No. 14/447,902, Sep. 29, 2017, Notice of Allowance.
U.S. Appl. No. 14/448,533, Jul. 7, 2017, Office Action.
U.S. Appl. No. 13/620,839, dated Sep. 11, 2015, Office Action.
U.S. Appl. No. 13/620,851, dated Jul. 28, 2015, Office Action.
U.S. Appl. No. 14/448,533, dated Feb. 22, 2018, Office Action.

\* cited by examiner

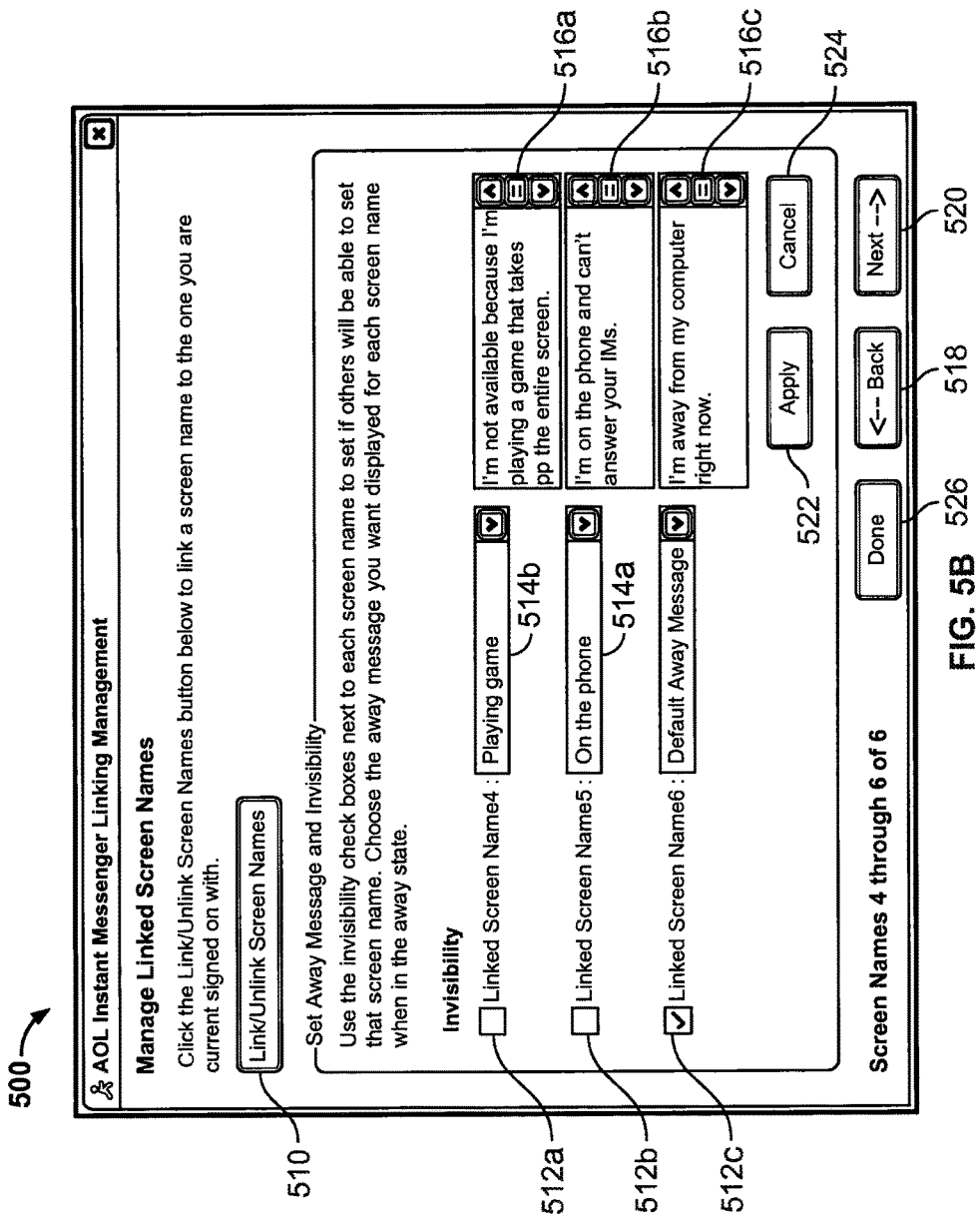

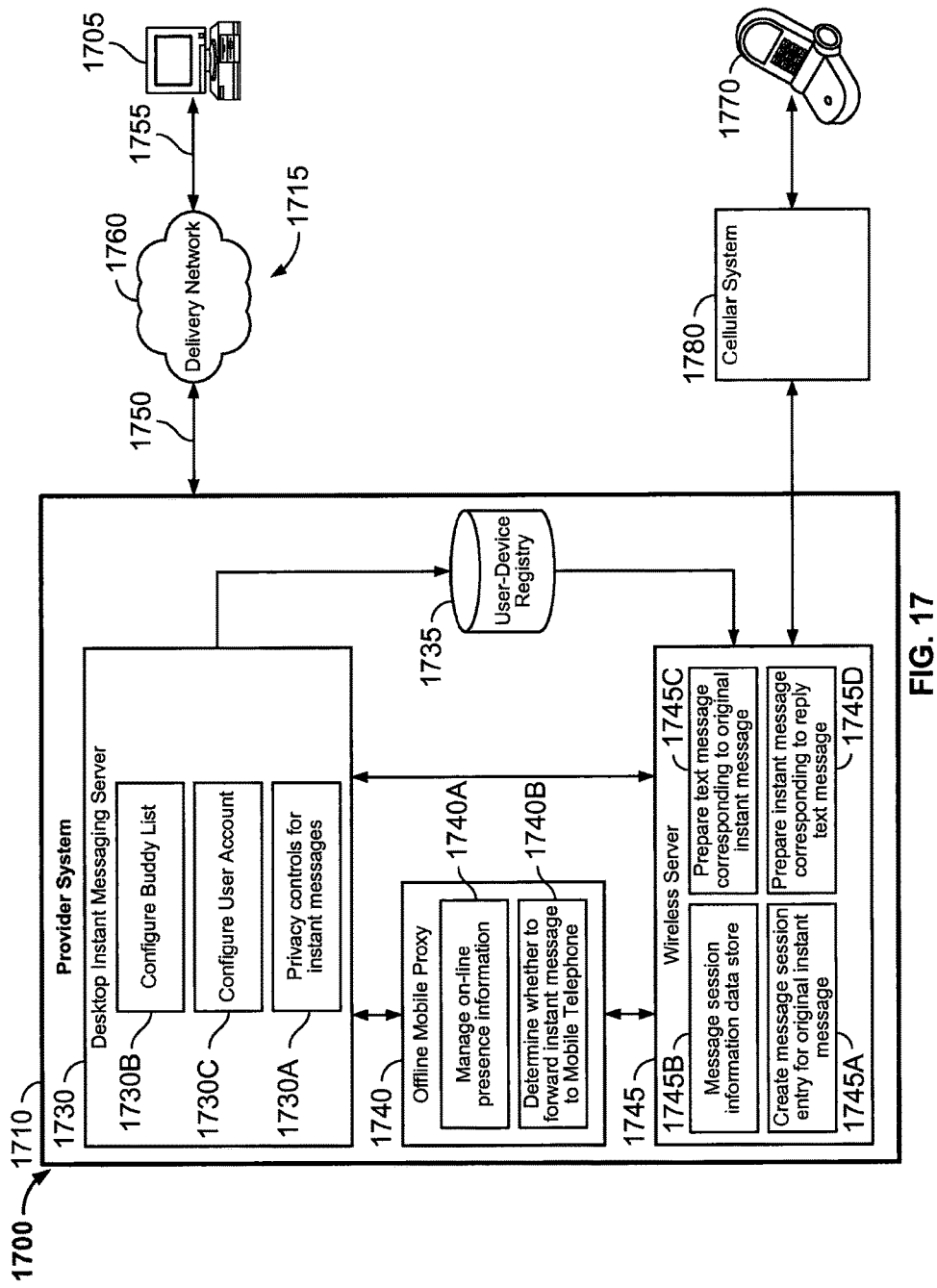

MANAGING ELECTRONIC MESSAGES SENT TO REPLY TELEPHONE NUMBERS

CROSS REFERENCE TO RELATED APPLICATIONS

This application is a continuation of U.S. application Ser. No. 14/322,834, filed Jul. 2, 2014, which is a continuation of U.S. application Ser. No. 13/442,226, filed Apr. 9, 2012, which is a continuation of U.S. application Ser. No. 12/548,338, filed Aug. 26, 2009 and now U.S. Pat. No. 8,156,193, which is a continuation of U.S. application Ser. No. 10/895,421, filed Jul. 21, 2004 and now U.S. Pat. No. 7,590,696, which claims the benefit of U.S. Provisional Application No. 60/488,376, filed Jul. 21, 2003, and claims the benefit of U.S. Provisional Application No. 60/488,749, filed Jul. 22, 2003, is a continuation-in-part of U.S. application Ser. No. 10/723,040, filed Nov. 26, 2003 and now U.S. Pat. No. 7,428,580, and is a continuation-in-part of U.S. application Ser. No. 10/715,213, filed Nov. 18, 2003 and now U.S. Pat. No. 8,701,014, which claims the benefit of U.S. Provisional Application No. 60/426,806, filed Nov. 18, 2002, and claims the benefit of U.S. Provisional Application No. 60/427,566, filed Nov. 20, 2002, and claims the benefit of U.S. Provisional Application No. 60/456,963, filed Mar. 25, 2003. Each of the aforementioned patent(s) and application(s) is hereby incorporated by reference in its entirety.

TECHNICAL FIELD

This description relates to communicating using an instant messaging system.

BACKGROUND

Users of an instant messaging service can communicate virtually in real time with other instant messaging users. Users may manually create a buddy list of user names of other users of the instant messaging service, and may establish instant messaging sessions with those other members using the buddy list.

Many people have multiple instant messaging accounts that they use for different identities or personalities. Conventionally, people only appeared online with one account at a time, unless multiple instant messaging clients were run. Therefore, only the buddy list corresponding to the account that was used to sign into the instant messaging system was shown. Similarly, messages could only be sent to and from the account that was used to sign in.

DESCRIPTION OF DRAWINGS

FIG. 5B is an illustration of an exemplary interface for managing multiple linked accounts.

FIG. 17 is a block diagram of a communications system.

Like reference symbols in the various drawings may indicate like elements.

DETAILED DESCRIPTION

Figure 1:
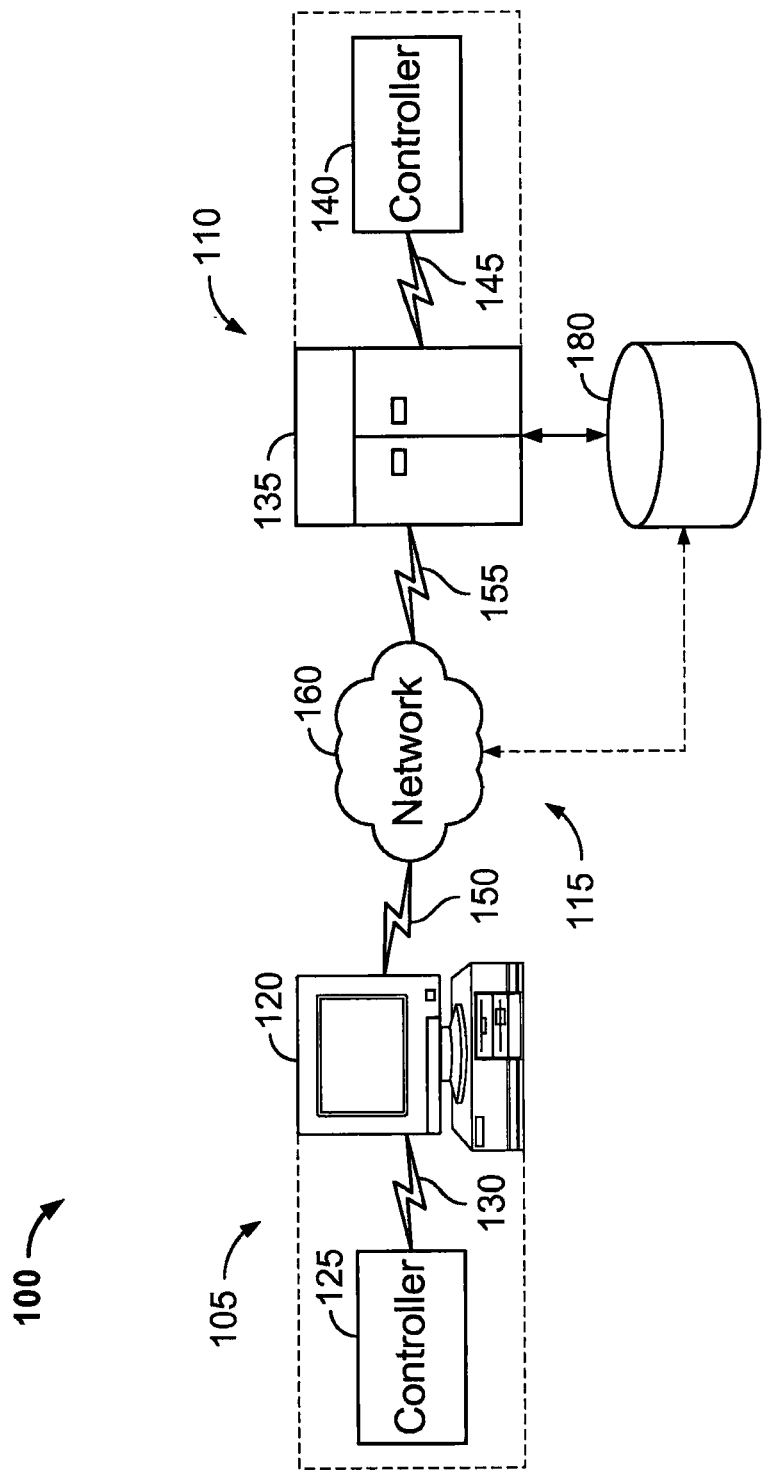
FIG. 1 is a block diagram of a communications system.

A buddy list is a user-definable list of other co-users (i.e., buddies) of an online or network communications systems that enables the user to perceive presence information and changes for the co-users in a unique graphical user interface (GUI) and to track changes to presence status for the co-users in substantially real-time automatically, where presence indicates the status of the co-user with respect to the online or network communications system. The buddy list also provides the user with a mechanism to initiate communications (e.g., instant messages (IMs), electronic mail (e-mail), chat, and other communications) with the co-users. A user may create separate buddy lists of co-users, either with intersecting or disjoint lists of users, and label these buddy lists according to the user's preferences or otherwise.

Each user account may have one or more buddy lists. When a user logs on to a system, the user's set of buddy lists is presented to a buddy list system. The buddy list system attempts to match co-users currently logged into the system with the entries on the user's buddy list. Any matches are displayed to the user. As co-users logon and logoff, a user's buddy list is updated to reflect these changes. An indication also may be added to show that a co-user just logged on or logged off the system.

In one exemplary implementation, a user may identify a mobile telephone number to be added to the user's buddy list. The mobile telephone number also may be assigned a surrogate identifier or alias (e.g., a name) to be displayed on the user's buddy list to help the user identify the identity associated with the mobile telephone number. A user may address an instant message to the mobile telephone number added to the buddy list in lieu of addressing an instant message to a screen name.

In another exemplary implementation, a user may link multiple accounts that are held by the user for use in a communications system, such as an instant messaging system. Each of the multiple accounts held by the same user may be identified by a different unique identifier (e.g., a screen name, a number, a user identity, or other alphanumeric string). By logging into one of the linked accounts, the linked accounts all may appear to be logged into the communications system simultaneously. The user can send and receive communications from each linked account all while appearing to other users as the particular identity that the user is known to by others. As a result, the user appears to be online more often and has the potential to receive more communications.

A primary account is chosen by the user to sign in to the communications system. After the primary account is authenticated, a single GUI shows a buddy list, or a list containing the users of the communications system with which communications regularly occur, for the primary account and each of the linked accounts. Thus, by signing onto a single account, the user's other linked accounts also may be started. The GUI may separate the buddy lists for the multiple linked accounts. In one implementation to be described with respect to FIGS. 4A and 4B, only the buddy lists for one of the linked accounts is shown at a time with the buddy lists from other accounts hidden or minimized. In another implementation to be described with respect to FIG. 4C, more than one of the buddy lists from the linked accounts may be simultaneously displayed to the user. The user may make modifications to the buddy list when it is displayed. The GUI also contain an element for accessing a control panel through which the accounts to be linked can be specified. The control panel allows the user to add an account to be linked by enabling the entry of authentication information for the account to be linked.

After authentication, communications to and from the account to be linked may occur. A communication interface enables the specification of a linked account from which the communications are sent to a recipient of the communications. If the communications with the recipient from the selected linked account are allowed to occur, the communications are sent. Also, communications directed to any of the linked accounts may be received and made perceivable to the user. When a message is received, the account to which the message was sent is determined, and the response to the message is configured to automatically send from that account. Notifications of the status of users listed on the buddy lists for the linked accounts are also presented. The notifications specify the account whose buddy list contains the user whose status merited notification.

Figure 2:
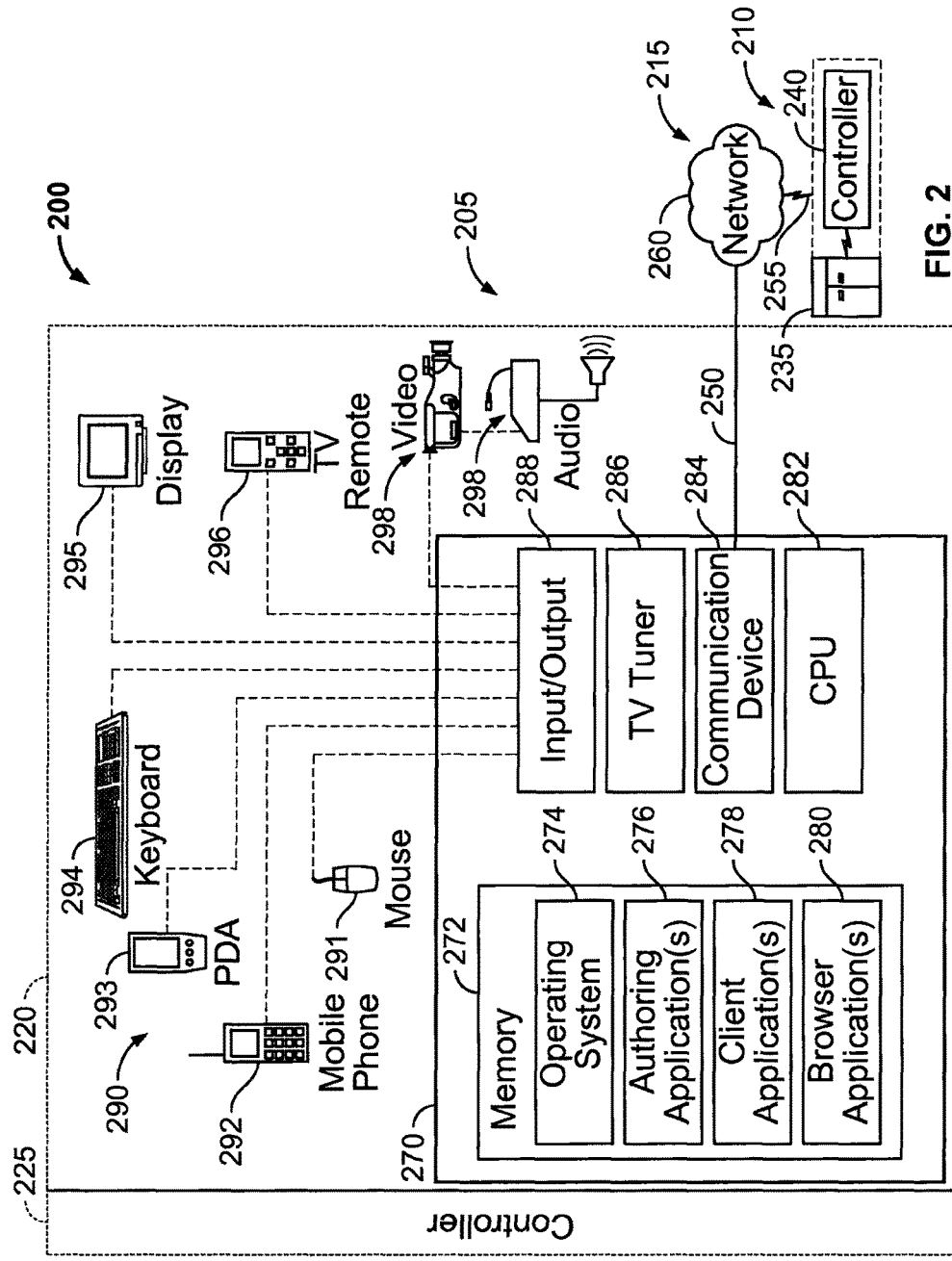
FIGS. 2 and 3 are expansions of the block diagram of FIG. 1.
Figure 3:
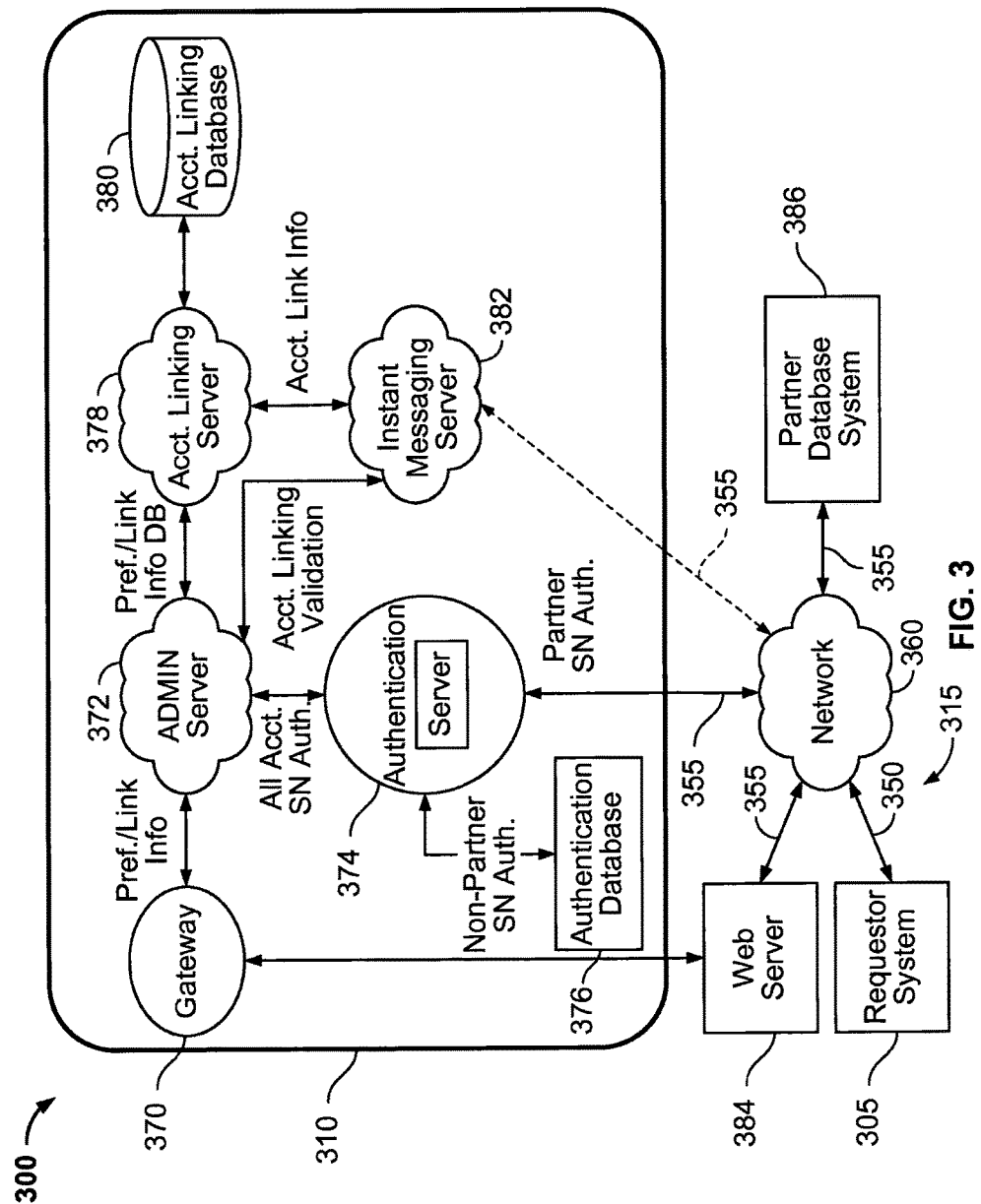

For illustrative purposes, FIGS. 1-3 show an example of a communications system for implementing techniques for transferring electronic data. For brevity, several elements in the figures described below are represented as monolithic entities. However, as would be understood by one skilled in the art, these elements each may include numerous interconnected computers and components designed to perform a set of specified operations and/or may be dedicated to a particular geographical region.

Referring to FIG. 1, a communications system 100 is capable of delivering and exchanging data between a requestor system 105 and a provider system 110 through a communications link 115. The requestor system 105 may include a client system and the provider system 110 may include a host system. The requestor system 105 typically includes one or more requestor devices 120 and/or requestor controllers 125, and the provider system 110 typically includes one or more provider devices 135 and/or provider controllers 140. For example, the requestor system 105 or the provider system 110 may include one or more general-purpose computers (e.g., personal computers), one or more special-purpose computers (e.g., devices specifically programmed to communicate with each other and/or the requestor system 105 or the provider system 110), or a combination of one or more general-purpose computers and one or more special-purpose computers. The requestor system 105 and the provider system 110 may be arranged to operate within or in concert with one or more other systems, such as, for example, one or more Local Area Networks ("LANs") and/or one or more Wide Area Networks ("WANs").

The provider system 110 may include a communication interface such as an electronic mail gateway. For instance, the provider system 110 may include a dedicated mailing system that is implemented by specialized hardware or executed by a general purpose processor capable of running various applications, such as electronic mailer programs, and capable of employing various file transfer protocols, such as the Simple Mail Transfer Protocol ("SMTP"). The communications interface of provider system 110 enables communications between the provider system 110 and other systems through, for example, communications link 115.

The requestor device 120 (or the provider device 135) is generally capable of executing instructions under the command of a requestor controller 125 (or a provider controller 140). The requestor device 120 (or the provider device 135) is connected to the requestor controller 125 (or the provider controller 140) by a wired or wireless data pathway 130 or 145 capable of delivering data.

The requestor device 120, the requestor controller 125, the provider device 135, and the provider controller 140 each typically include one or more hardware components and/or software components. An example of a requestor device 120 or a provider device 135 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions. The requestor device 120 and the provider device 135 may include devices that are capable of peer-to-peer communications.

An example of a requestor controller 125 or a provider controller 140 is a software application loaded on the requestor device 120 or the provider device 135 for commanding and directing communications enabled by the requestor device 120 or the provider device 135. Other examples include a program, a piece of code, an instruction, a device, a computer, a computer system, or a combination thereof, for independently or collectively instructing the requestor device 120 or the provider device 135 to interact and operate as described. The requestor controller 125 and the provider controller 140 may be embodied permanently or temporarily in any type of machine, component, physical or virtual equipment, storage medium, or propagated signal capable of providing instructions to the requestor device 120 or the provider device 135.

The communications link 115 typically includes a delivery network 160 making a direct or indirect communication between the requestor system 105 and the provider system 110, irrespective of physical separation. Examples of a delivery network 160 include the Internet, the World Wide Web, WANs, LANs, analog or digital wired and wireless telephone networks (e.g., PSTN, ISDN, and xDSL), radio, television, cable, satellite, and/or any other delivery mechanism for carrying data. The communications link 115 may include communication pathways 150 and 155 that enable communications through the one or more delivery networks 160 described above. Each of the communication pathways 150 and 155 may include, for example, a wired, wireless, cable or satellite communication pathway.

An electronic information store 180 may be connected to the provider system 110, included as a component of the provider system 110, and/or connected to the delivery network 160. The electronic information store 180 may be a repository for electronic information that may be in an indexed and/or searchable format. For example, in one implementation, the electronic information store 180 may be used to store information related to the relationships between the linked accounts of the communications system 100.

FIG. 2 illustrates a communications system 200 including a requestor system 205 communicating with a provider system 210 through a communications link 215. Requestor system 205 typically includes one or more requestor devices 220 and one or more requestor controllers 225 for controlling the requestor devices 220. Provider system 210 typically includes one or more provider devices 235 and one or more provider controllers 240 for controlling the provider devices 235. The communications link 215 may include communication pathways 250 and 255 that enable communications through the one or more delivery networks 260.

Examples of each element within the communications system of FIG. 2 are broadly described above with respect to FIG. 1. In particular, the provider system 210 and communications link 215 typically have attributes comparable to those described with respect to the provider system 110 and the communications link 115 of FIG. 1. Likewise, the requestor system 205 of FIG. 2 typically has attributes comparable to and illustrates one possible implementation of the requestor system 105 of FIG. 1.

The requestor device 220 typically includes a general-purpose computer 270 having an internal or external storage 272 for storing data and programs such as an operating system 274 (e.g., DOS, Windows™, Windows 95™, Windows 98™, Windows 2000™, Windows Mc™, Windows XP™, Windows NT™, OS/2, or Linux) and one or more application programs. Examples of application programs include authoring applications 276 (e.g., word processing programs, database programs, spreadsheet programs, or graphics programs) capable of generating documents or other electronic content; client applications 278 (e.g., stand alone e-mail client or AOL client, CompuServe client, AIM client, AOL TV client, or ISP client, all of which may include a built-in or embedded e-mail or instant messaging client) capable of communicating with other computer users, accessing various computer resources, and viewing, creating, or otherwise manipulating electronic content; and browser applications 280 (e.g., Netscape's Navigator or Microsoft's Internet Explorer) capable of rendering standard Internet content and also capable of supporting a web-based e-mail client and a web-based instant messaging client.

The general-purpose computer 270 also includes a central processing unit 282 (CPU) for executing instructions in response to commands from the requestor controller 225. In one implementation, the requestor controller 225 includes one or more of the application programs installed on the internal or external storage 272 of the general-purpose computer 270. In another implementation, the requestor controller 225 includes application programs stored in and performed by one or more device(s) external to the general-purpose computer 270.

The general-purpose computer also includes a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV tuner 286 for receiving television programming in the form of broadcast, satellite, and/or cable TV signals. As a result, the requestor device 220 can selectively and/or simultaneously display network content received by communications device 284 and television programming content received by the TV tuner 286.

The general-purpose computer 270 typically includes an input/output interface 288 for wired or wireless connection to various peripheral devices 290. Examples of peripheral devices 290 include, but are not limited to, a mouse 291, a mobile phone 292, a personal digital assistant 293 (PDA), a MP3 player (not shown), a keyboard 294, a display monitor 295 with or without a touch screen input, a TV remote control 296 for receiving information from and rendering information to subscribers, and an audiovisual input device 298.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the requestor device 220. For example, the mobile phone 292 or the PDA 293 may include computing and networking capabilities and function as a requestor device 220 by accessing the delivery network 260 and communicating with the provider system 210. Furthermore, the requestor system 205 may include one, some or all of the components and devices described above.

FIG. 3 illustrates a communications system 300 that includes a requestor system 305 communicating with a provider system 310 through a communications link 315. The communications link 315 may include communications pathways 350 and 355 that enable communications through one or more delivery networks 360. Examples of the elements within the communications system 300 are broadly described above with respect to FIGS. 1 and 2. In particular, the requestor system 305 and the communications link 315 typically have attributes comparable to those described with respect to the requestor system 105 and 205 and the communications links 115 and 215 of FIGS. 1 and 2. Likewise, the provider system 310 of FIG. 3 typically has attributes comparable to and illustrates one possible implementation of the provider system 110 and 210 of FIGS. 1 and 2.

The provider system 310 includes a gateway server 370, an administrative ("admin") server 372, an authentication server 374, an authentication database 376, an account linking server 378, an account linking database 380, and an instant messaging server 382.

The gateway server 370 communicates with the requestor system 305 over the delivery network 360 through a web server 384 regarding account linking and unlinking actions. In one implementation, the gateway server 370 receives account linking and unlinking requests and forwards them to the admin server 372.

The admin server 372 acts as a clearinghouse for the account linking information management and linked account validation functions. The admin server 372 manages the account linking information and profiles in association with each screen name. The admin server 372 is configured to process requests received from the gateway 370 and saves linking information from successful processes in the account linking database 380 through the account linking server 378. Linking information from unsuccessful processes typically is not stored or saved. The admin server 372 typically is configured to communicate a response message to the requestor system 305 through the gateway server 370, web server 384, and delivery network 360.

The authentication server 374 is configured to process and to validate account authentication requests from the admin server 372 against the authentication database 376 and any partner database system 386. Once accounts have been validated, the admin server may be configured to update that information in the account linking database 389 through the account linking server 378. Accounts may be authenticated and validated on different basis including the presence of a correct account name and password. For validated accounts, account attributes may be forwarded from the authentication database 376 through the authentication server 374 for further use, processing, and/or storage by the admin server 372. For accounts that are not maintained by the provider system 310, the authentication server 374 is configured to communicate the authentication requests to an appropriate partner database system 386 for authentication and validation.

The account linking server 378 interacts with the account linking database 380, which stores and maintains user buddy list and account linking information. The account linking server 378 is configured to manage the information flow to and from the account linking database 380. The type of information contained in the account linking database 380 may include, but is not limited to, users settings of account linking information. The account linking information may be organized in different manners. In one exemplary implementation, the account linking information is organized by screen name. In other implementations, the account linking information may be organized by guide, a unique identifier used in the Open Name Space.

Other types of information contained in the account linking database 380 may include a list of alias screen names linked by a particular screen name, linking attributes associated with each screen name (e.g., timestamp for which an alias account whose password was last changed at the time when the link is created and default visibility/presence preferences), and linking profile information (e.g., revalidation information and a linking account order).

The instant messaging server 382 is configured to process communications sent to and received by users of the communications system. The instant messaging server 382 interacts with the account linking database 380 through the account linking server 378 and also interacts with the admin server 372 to request and receive authentication information using the authentication server 374 and the authentication database 376. Once a user of the requester system 305 has been authenticated and the user's different accounts have been linked and the user has been signed-on to the linked accounts, the user may send and receive communications by interacting with the instant messaging server 382 using the delivery network 360.

An account is needed to use the communications systems 100, 200, and 300. Each account typically has at least one associated screen name. The screen name is the identifier of the account that is authenticated by a client of the communications system. Communications sent throughout the communications system are addressed by the screen names of the intended recipient accounts.

When a first account is linked to a second account, the first account may be called an alias of the second account. In one implementation, either account may be used to sign on to the communications system initially and then any other linked accounts may be signed on to the communications system automatically. In one exemplary implementation, the aliases of a primary account are signed on to the communications system when the main account is signed on to the communications system. The aliases can send and receive communications in the same way as the primary account. Through a single client program and a single, common GUI, communications can be sent substantially simultaneously to and from the primary account and the aliases of the primary account.

Preferences for the each of the accounts may be set on an individual account basis or on a global basis by setting the preferences in one account and applying them globally in other linked accounts. In one exemplary implementation, certain preferences, including away messages and privacy settings, may be set by each of the aliases. All other preferences for the alias accounts may be set to be the same as the preferences for the primary account.

Accounts from multiple communications systems may be linked together. For example, accounts from America Online (AOL), America Online Instant Messenger (AIM), and ICQ may be linked together so that communications may be sent over multiple communications systems using only one client program. In addition, accounts from partner domains may be linked. For example, accounts of an online gaming club may communicate using the AIM communications system, and the accounts from the gaming club may be linked to AIM accounts such that communications may be sent and received by gaming club accounts while not signed into the gaming club on a gaming device. Similarly, accounts from a dating service that uses the AIM communications system may be linked to other accounts such that the members of the dating service can communicate with their dating service accounts while not logged in to the dating service. The architecture described in FIG. 3 is one possible implementation of a communications system, and other implementations for sending communications are possible.

Figure 4A:
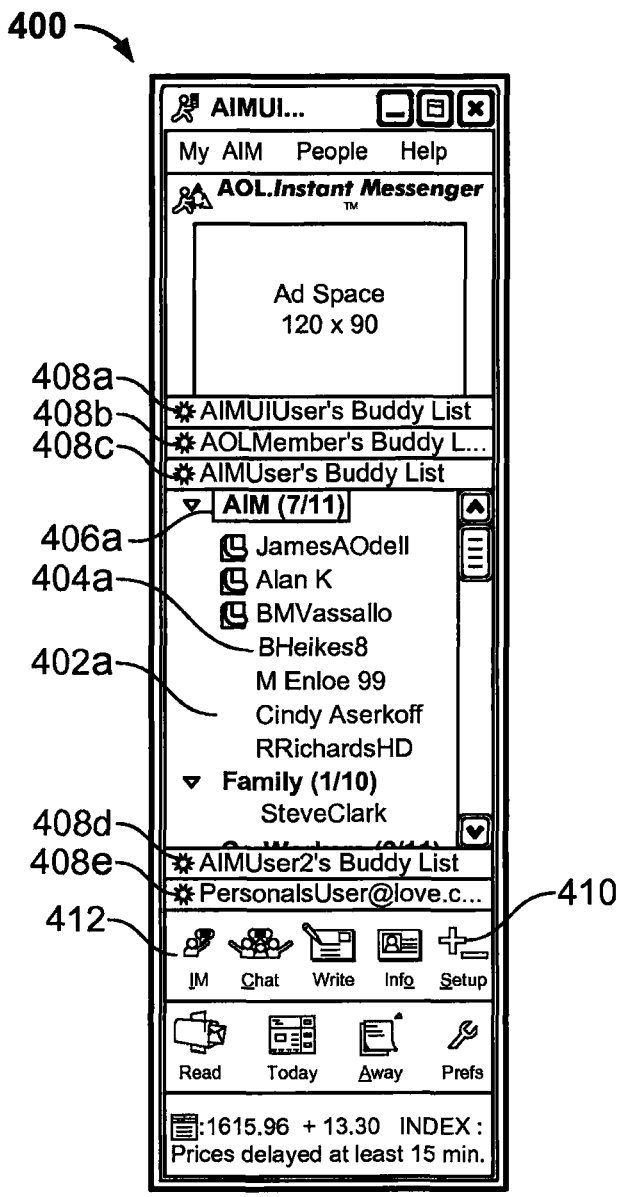
FIGS. 4A-4C, 5A and 11 are illustrations of exemplary interfaces for showing buddy lists for multiple linked instant messaging accounts.

Referring to FIG. 4A, a buddy list interface 400 displays buddy lists for all linked accounts. In one exemplary implementation only one account's buddy lists 402a are shown at a time. The buddy lists 402a includes one or more screen names 404a. For example, the buddy lists 402a include the screen name 404a, BHeikes8. The screen names 404a are used to address communications to and from the specified accounts. The screen names 404a may be separated into one or more groups 406a. The groups 406a are listed with a name, a number of people from the group that are currently logged in to the communications system, and the total number of people in the group. For example, group 406a is named AIM, and seven out of the eleven members of the group are logged in to the communications system.

Figure 4B:
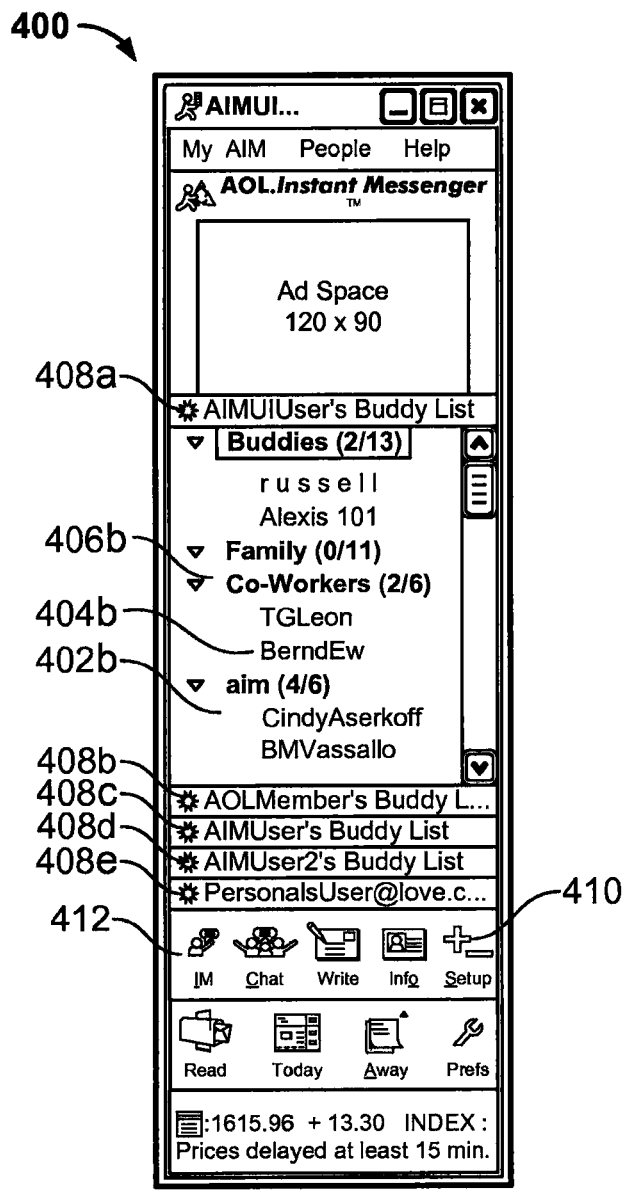

The buddy list interface 400 includes tabs 408a-408e that can be used to access the buddy lists for the various linked accounts. There is one tab 408a-408e for each of the linked accounts. For example, tab 408a is for an account named AIMUIUser, tab 408b is for an account named AOLMember, tab 408c is for an account named AIMUser, tab 408d is for an account named AIMUser2, and tab 408e is for an account named PersonalsUser@love.com, an account from a partner domain. The buddy lists for an account is displayed when the tab for that account is selected. For example, the buddy list 402a is displayed because the tab 408c for the account named AIMUser has been selected. Referring also to FIG. 4B, selecting the tab 408a for the account named AIMUIUser displays the buddy lists 402b from for that account. The buddy lists 402b includes multiple screen names, including screen name 404b for BerndEw, and groups, including group 406b named Co-Workers, which has two out of six members logged in.

A setup button 410 allows for configuration of the currently displayed buddy list. Selecting the setup button 410 enables the addition and deletion of screen names, such as screen names 404a and 404b, and groups, such as groups 406a and 406b, to the buddy list 402 that is currently displayed. In one implementation, adding a screen name to a buddy list of a linked account causes the screen name to be added to the buddy lists of the other linked accounts. After selecting a screen name 404 from the buddy list, selecting an IM button 412 displays an interface for communicating with the account corresponding to the selected screen name. In one implementation, the user may be given an option to add one or more linked accounts.

Figure 4C:
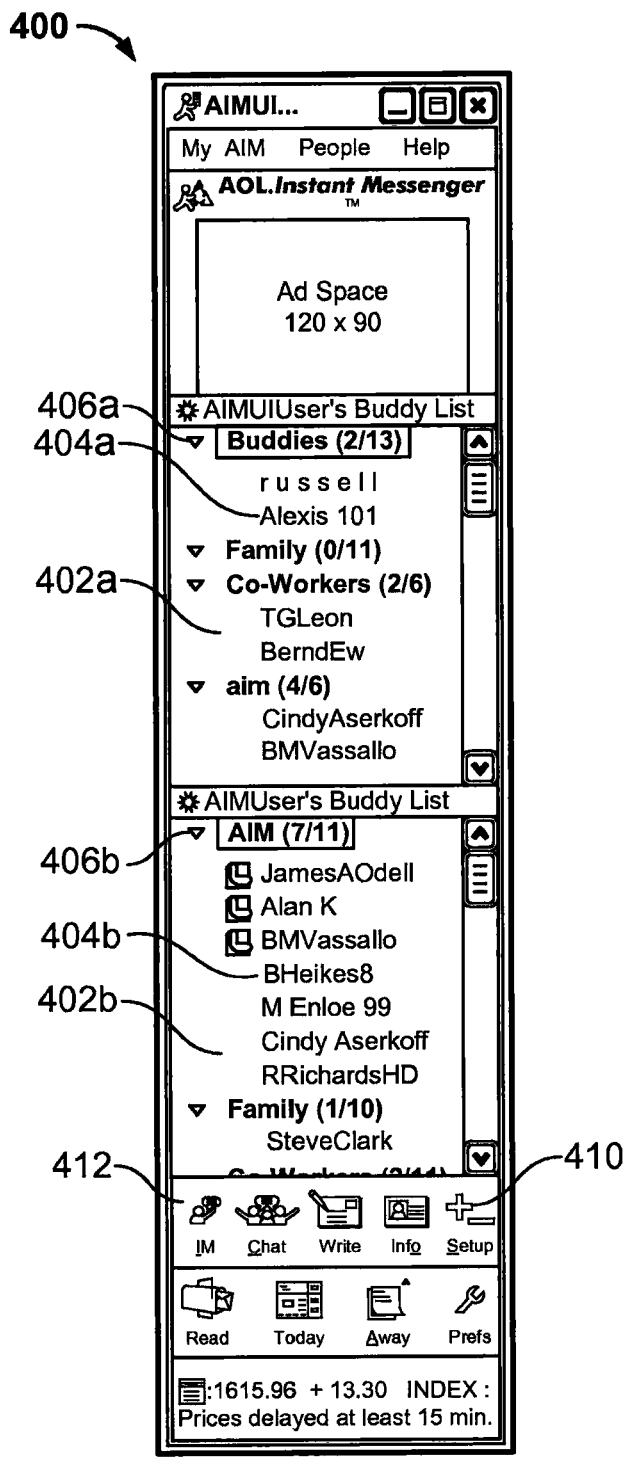

Referring to FIG. 4C, an alternative implementation of the buddy list interface 400 displays buddy lists for all linked accounts simultaneously. The buddy list interface 400 includes a buddy list 402a for an account with a screen name AIMUIUser and a buddy list 402b for an account with a screen name AIMUser. The buddy list 402a for the account with the screen name AIMUIUser is displayed first because that account was used to sign in to the communications system. The buddy lists 402a and 402b include one or more screen names 404a and 404b. For example, the buddy list 402a includes the screen name 404a, Alexis101, and the buddy list 402b includes the screen name 404b, Bheikes8. The buddy lists 402a and 402b also may be separated into one or more groups 406a. The groups 406a are listed with a name, a number of people from the group that are currently logged in to the communications system, and the total number of people in the group. For example, group 406a is named Buddies, and two out of the thirteen members of the group are logged in to the communications system, while group 406b is named AIM, and seven out of the eleven members of the group are logged in to the communications system.

A setup button 410 allows for configuration of the displayed buddy lists. Selecting the setup button 410 enables the addition and deletion of screen names, such as screen names 404a and 404b, and groups, such as groups 406a and 406b, to the buddy lists 402a and 402b that are displayed. In one implementation, adding a screen name to a buddy list of a linked account causes the screen name to be added to the buddy lists of the other linked accounts. After selecting a screen name 404 from one of the displayed buddy lists 402a and 402b, selecting an IM button 412 displays an interface for communicating with the account corresponding to the selected screen name.

Figure 5A:
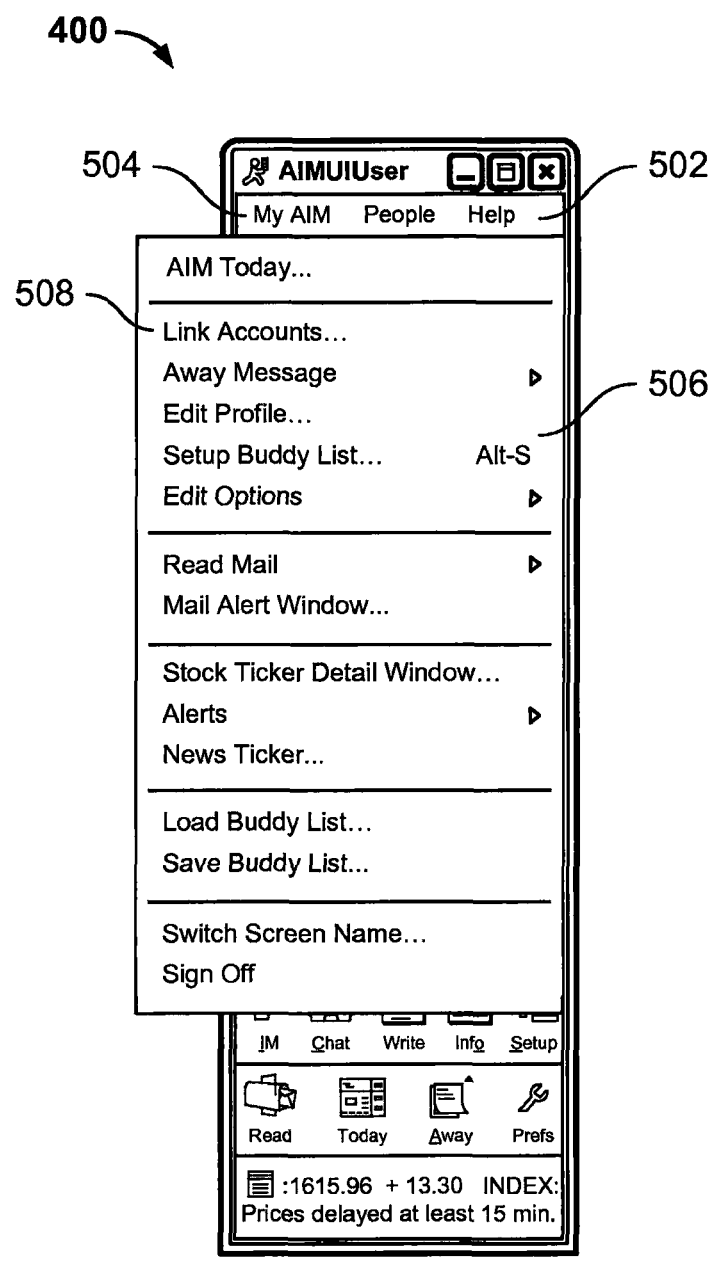

Referring to FIG. 5A, the buddy list interface 400 includes a menu bar 502 that includes an option 504 labeled "My AIM." Selecting the option 504 creates a submenu 506. The submenu 506 includes an account linking option 508, labeled "Link Accounts." Selecting the account linking option 508 displays an account linking control panel 500 from FIG. 5B. The account linking control panel 500 enables the specification of the accounts to be linked as well as various preference settings related to the linked accounts. For example, selecting a linking button 510 enables the specification of the accounts to be linked. For each linked account, multiple preference settings related to account visibility and away message are presented on the account linking control panel 500. Presence information for an invisible account may not be seen by other users of the communications system. Therefore, if a linked account is set to be invisible, then other users of the communications system are unable to see that the account is logged into the system even though the account, and other accounts that are linked to the account, are logged into the system. For example, selecting checkbox 512a will cause the account named LinkedScreenName4 to appear invisible to other users of the communications system. Likewise, selecting checkbox 512b will cause the account named LinkedScreenName5 to appear invisible, and selecting checkbox 514c will cause the account named LinkedScreenName6 to appear invisible.

The account linking control panel 500 also enables the specification of an away message for each of the linked accounts. The away message is displayed when an account is logged into but not actively using the communications system. Each away message has a name for quick reference, as well as text that is displayed to the other users of the communications system. For each linked account, an away message can be chosen and modified using the account linking control panel 500. For example, selection box 514a enables the selection of an away message for the account named LinkedScreenName4. The text of the selected away message appears in a text box 516a, where the text may be modified. Similarly, an away message for the account named LinkedScreenName5 may be selected using the selection box 514b, and the text of the selected away message may be modified in a text box 516b. Finally, an away message for the account named LinkedScreenName6 may be selected using the selection box 514c, and the text of the selected away message may be modified in a text box 516c.

In other implementations, preferences related to outgoing self-expressions, buddy icons, a block list, a warn list, a buddy list, certificates, privacy, and profiles may be set for each linked account suing the account linking control panel 500. In addition, any preference for the screen name used to sign in to the instant messaging system may be set with the account linking control panel 500. Other preferences for each of the linked accounts are determined by the setting of the account used to sign in to the instant messaging system. These preferences include presence, idle time, incoming expression settings, typing indicator, time stamp, and font.

A number of accounts less than the total number of linked accounts may be displayed on the account linking control panel at a time. A back button 518 and a next button 520 enable moving between different subsets of the set of linked accounts such that the preferences for the linked accounts in the various subsets may be specified. Any changes made to the invisibility and away message preferences may be immediately applied to the current session with the communications system using an apply button 522. Similarly, any changes that have been made may be discarded by selecting a cancel button 516524 When all desired changes have been made, the account linking control panel 500 may be closed by selecting a done button 526.

If no accounts have been linked together, then the account linking control panel includes only the linking button 510. The other elements for setting the visibility and away messages for the linked accounts are not presented on the account linking control panel 500.

Figure 6A:
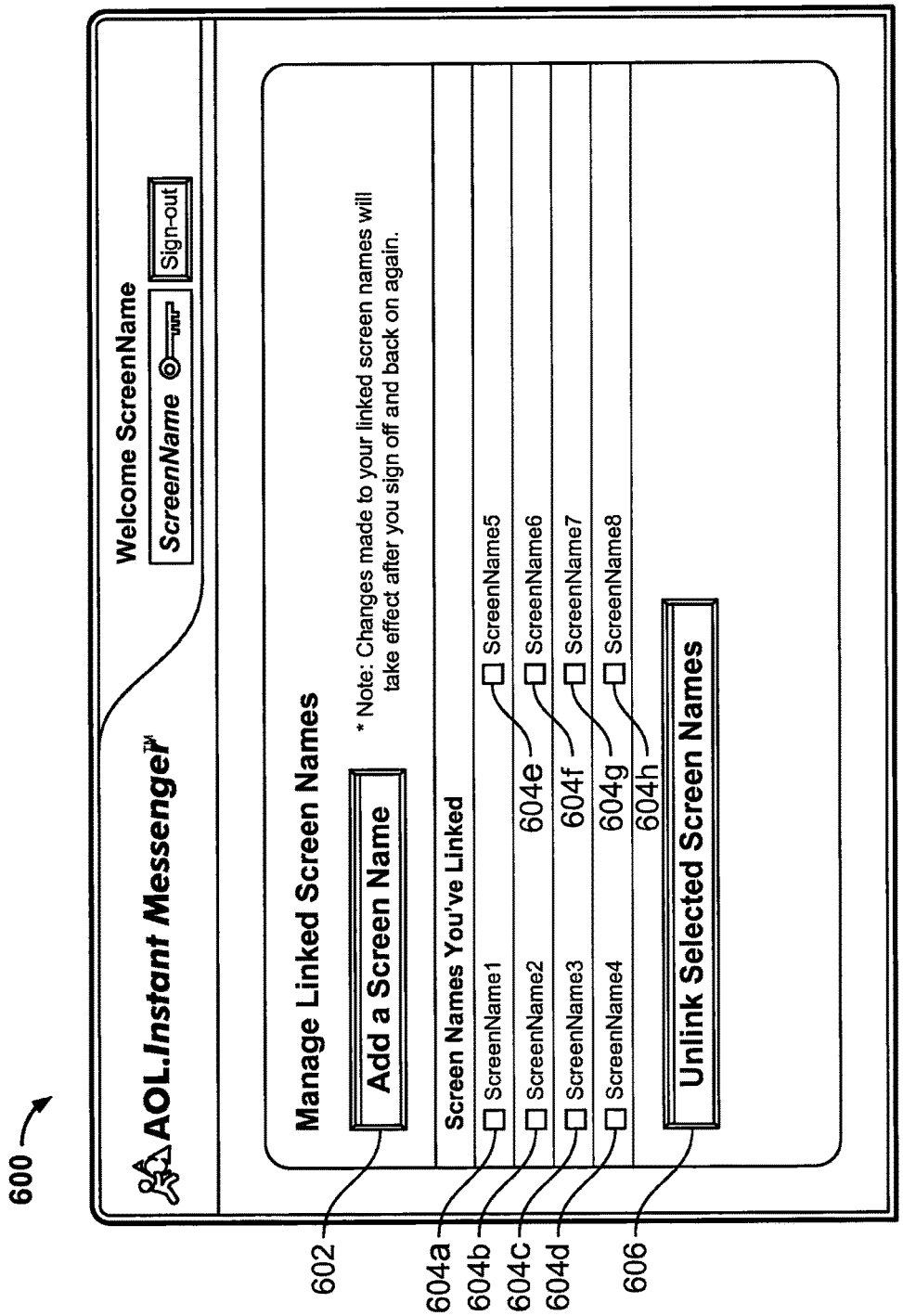
FIGS. 6A-6D are illustrations of an exemplary interface for linking and unlinking accounts.

Referring to FIG. 6A, an account linking interface 600 enables the linking of an account to other linked accounts. The accounts that have been linked together are listed on the account linking interface 600. For example, eight accounts named ScreenName1 through ScreenName8 have been linked using the account linking interface 600. Selecting an add button 602 allows for more accounts to be added to the set of linked accounts.

Next to each account listed in the account linking interface 600 is a checkbox that can be used to select the corresponding account. For example, a checkbox 604a is associated with an account named ScreenName1, a checkbox 604b is associated with an account named ScreenName2, a checkbox 604c is associated with an account named ScreenName3, a checkbox 604d is associated with an account named ScreenName4, a checkbox 604e is associated with an account named ScreenName5, a checkbox 604f is associated with an account named ScreenName6, a checkbox 604g is associated with an account named ScreenName7, and a checkbox 604h is associated with an account named ScreenName8. An unlink button 606 enables the breaking of links from the accounts that have been selected using the checkboxes 604a-604h. For example, selecting the checkbox 604a for the account named ScreenName1 and subsequently selecting the unlink button 606 would break the link between the account named ScreenName1 and the other linked accounts. An optional confirmation may be presented to verify that the selected screen names should be unlinked.

When no accounts have been linked together, only the add button 602 is shown on the account linking interface 600. The list of linked accounts, the checkboxes 604a-604h, and the unlink button 606 are not included in the account linking interface 600.

Figure 6B:
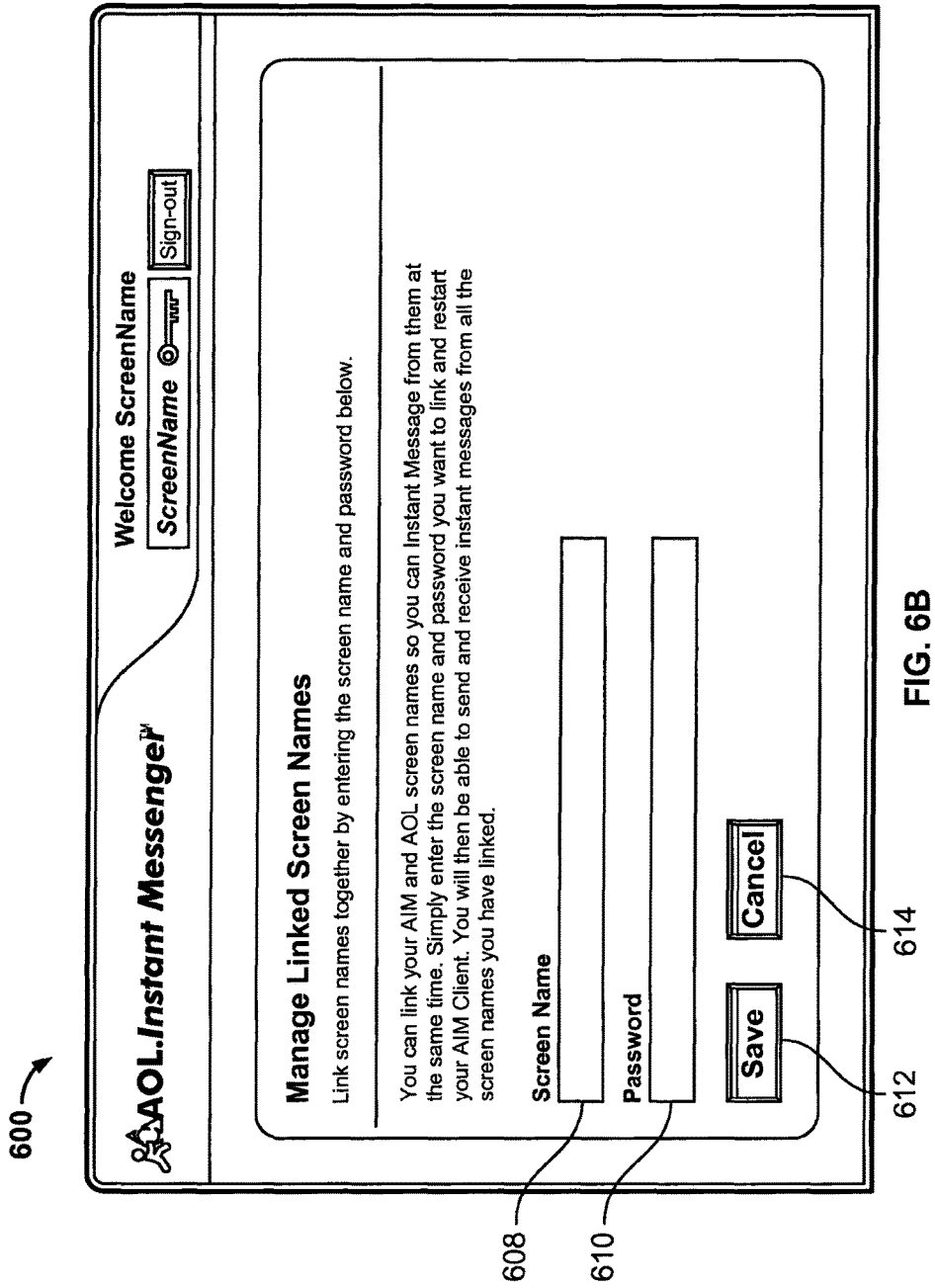

Referring to FIG. 6B, the account linking interface enables the entry of authentication information for an account after the add button 602 has been selected. The screen name of the account to be linked may be entered in a name text field 608, while the password for the account to be linked may be entered in a password text field 610. After the authentication information has been entered in the name text field 608 and the password text field 610, selecting a save button 612 verifies the entered authentication information and creates a link to the other linked accounts. A cancel button 614 may be selected to dismiss the account linking interface 600 without linking any more accounts. After the cancel button 614 is selected, the list of linked accounts shown in FIG. 6A is presented to the user.

In the event that the entered authentication information is incorrect, a notification will be presented, and the authentication information may be entered again. If additional authentication information, such as a SecureID code, is needed to authenticate the account, a means for entering the additional information is presented.

Figure 6C:
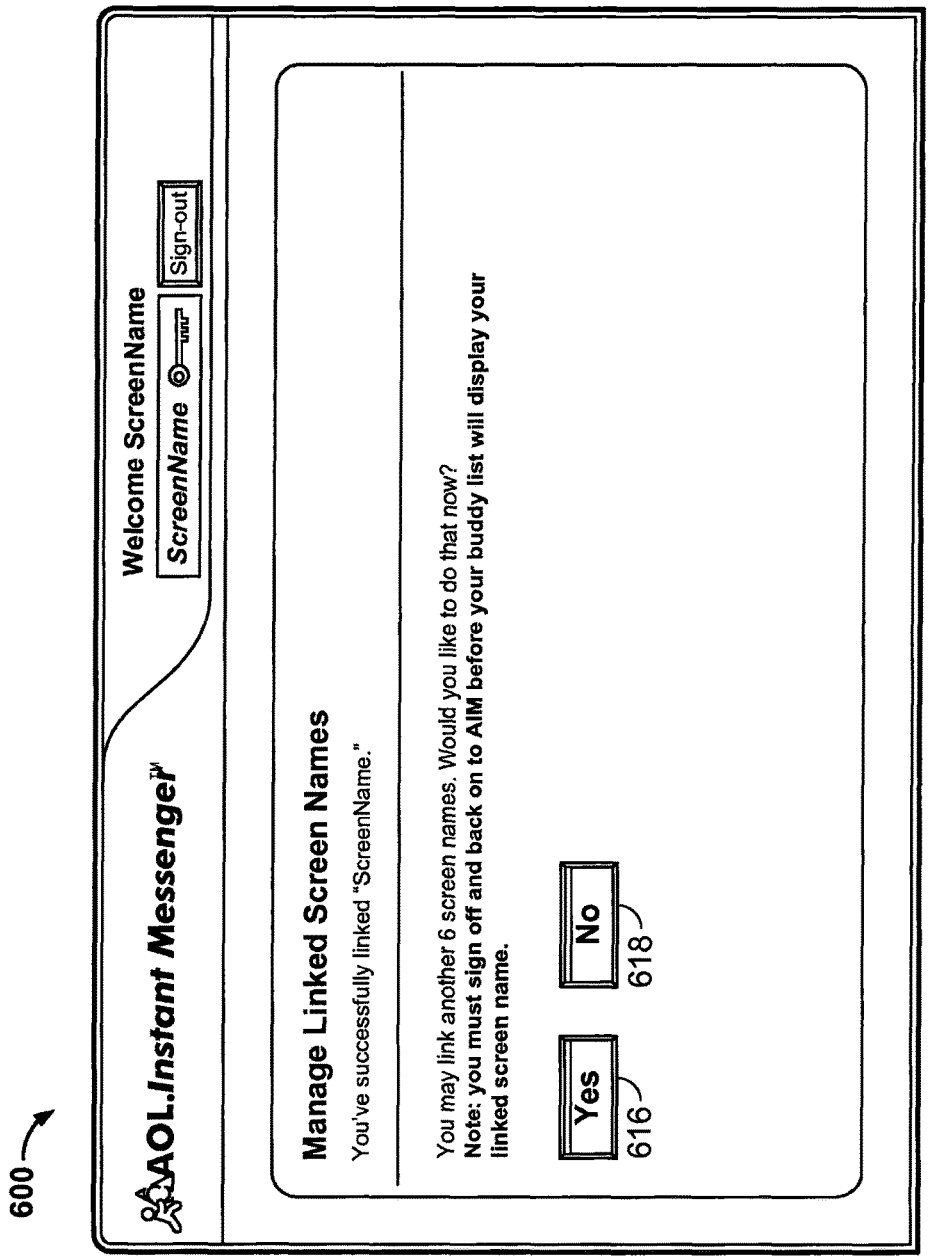

Referring to FIG. 6C, after successful authentication of the account to be linked and creation of a link between the existing linked accounts and the newly linked account, the user is notified of the number of accounts that still may be linked to the existing set of linked accounts, if such a limit exists. A yes button 616 and a no button 618 enable the user to decide if more accounts are to be linked to the set of linked accounts. If the yes button 616 is selected, the name text field 608 and the password text field 610 are presented again to allow the user to enter authentication information for the additional account to be linked. If the no button 618 is selected, the list of linked accounts is displayed. The yes button 616 and the no button 618 are only presented if the limit on the number of linked accounts has not been reached. If the limit has been reached, then the user is presented with a message saying that the limit has been reached and that no more accounts may be linked. A single confirmation button dismisses the message and displays the list of linked accounts when selected.

Figure 6D:
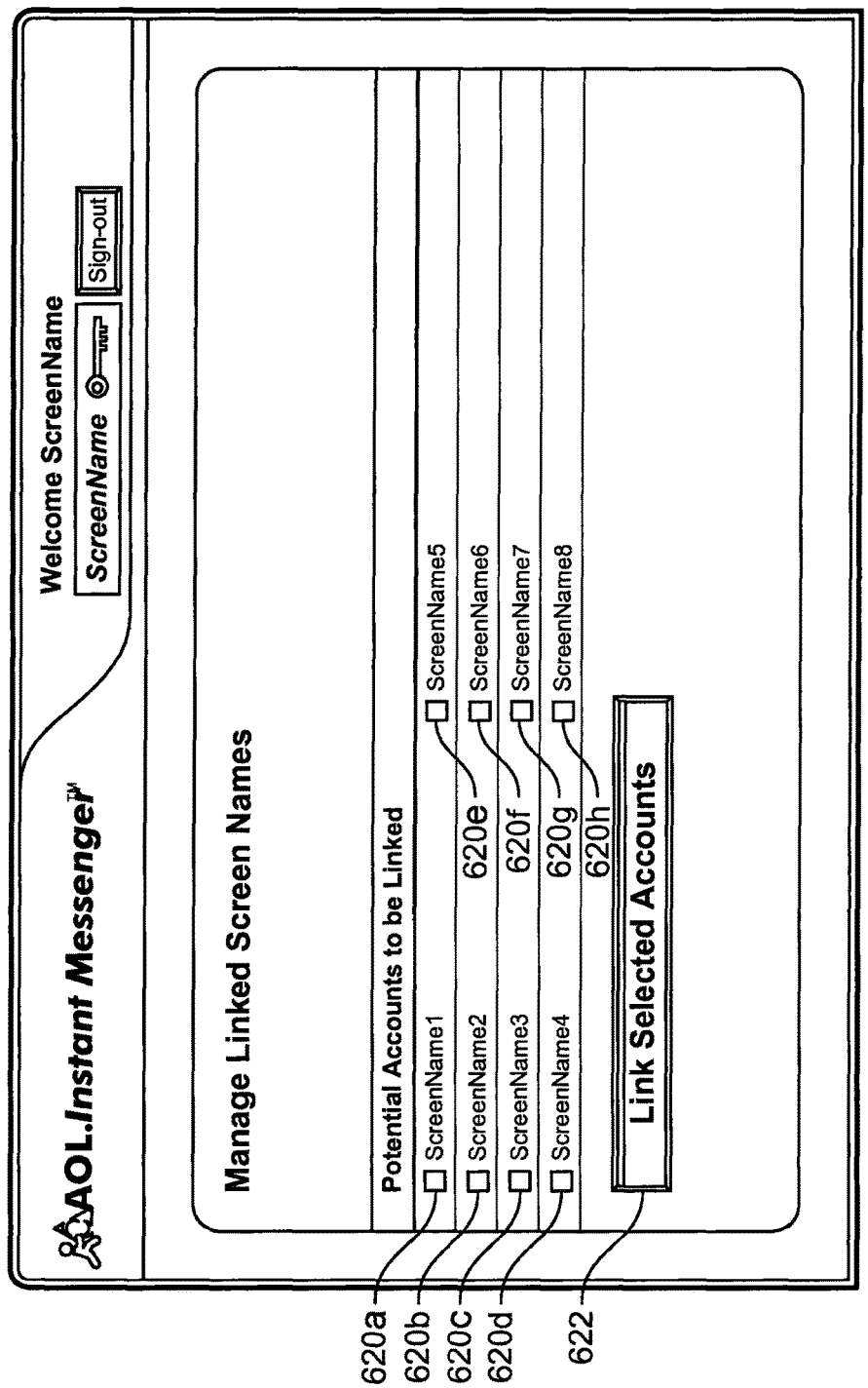
Figure 7:
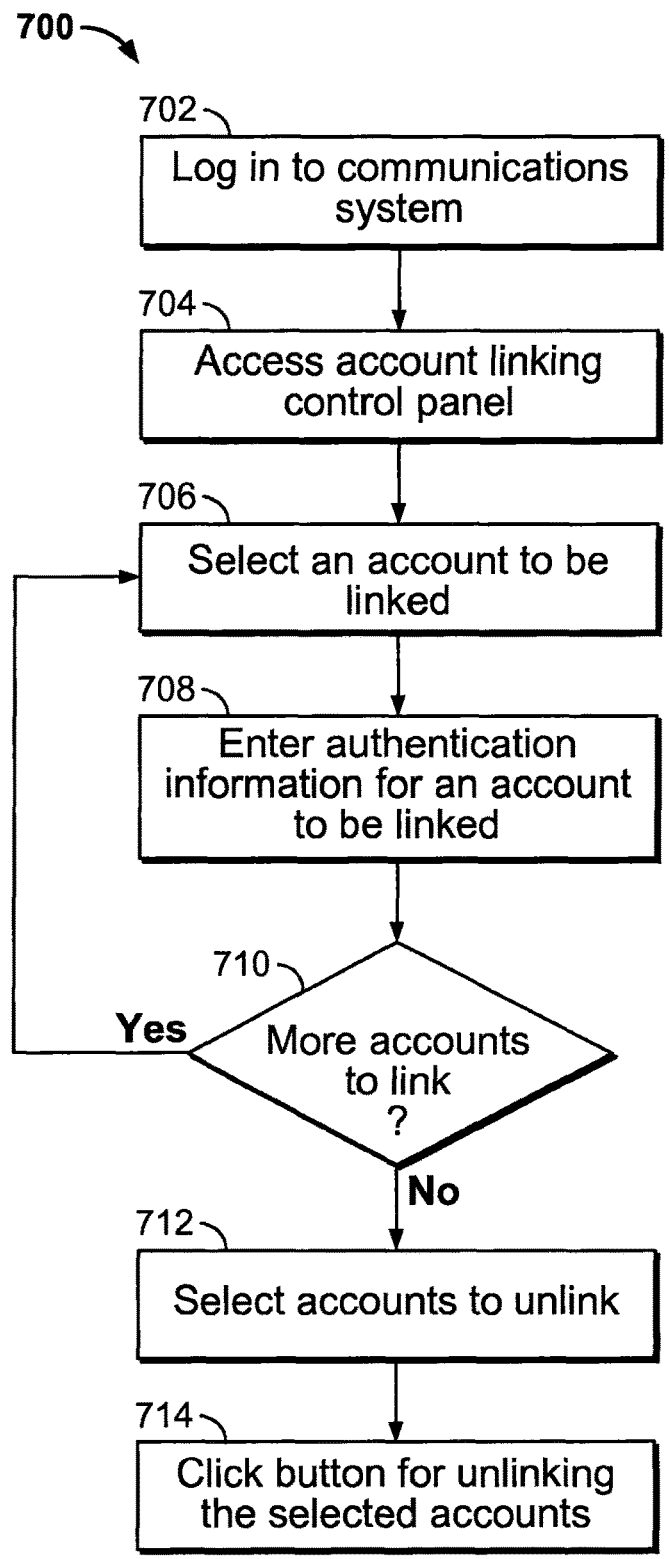
FIG. 7 is a flow chart of an exemplary process for linking accounts.

Referring to FIG. 6D, in one implementation, the account linking interface 600 may suggest a set of accounts to be linked, thus simplifying the account linking process. The accounts may be suggested based on the structure of the accounts for the communications system. For example, a hierarchy may exist where a set of accounts are subordinate to a master account. In such a case, the account linking interface 600 may suggest that the subordinate accounts be linked to the master account. For example, the account linking interface 600 may suggest that eight accounts named ScreenName1 through ScreenName8 be linked together. Next to each account listed in the account linking interface 600 is a checkbox that can be used to select the corresponding account. For example, a checkbox 620a is associated with an account named ScreenName1, a checkbox 620b is associated with an account named ScreenName2, a checkbox 620c is associated with an account named ScreenName3, a checkbox 620d is associated with an account named ScreenName4, a checkbox 620e is associated with an account named ScreenName5, a checkbox 620f is associated with an account named ScreenName6, a checkbox 620g is associated with an account named ScreenName7, and a checkbox 620h is associated with an account named ScreenName8. A link button 622 enables the creation of links between the accounts that have been selected using the checkboxes 620a-620h and the account for which the account linking interface 600 is displayed. For example, selecting the checkbox 604a for the account named ScreenName1 and subsequently selecting the link button 622 would create a link between the account named ScreenName1 and the account for which the account linking interface 600 is displayed. An optional confirmation may be presented to verify that the selected screen names should be linked. Referring to FIG. 7, a process 700 is used to link multiple accounts such that communications may be sent simultaneously from the linked accounts. The process 700 begins when a main account is used to log into a communications system (702). The account linking control panel is accessed so that other accounts may be linked to the main account used to sign in to the communications system (704). The button on the account linking control panel for linking an account is selected (706), and the authentication information for the account to be linked is entered (708). In one implementation, the authentication information for the account to be linked may be known already by the main account. For example, an account hierarchy may exist where authentication information may be known by a master account for all of the accounts subordinate to the master account. The account to be linked may subordinate to the main account, so the authentication information for the account to be linked may be known already by the main account. In such an implementation, the account information for the account to be linked does not need to be entered. If the authentication information is correct, then the account is linked to the accounts that have been previously linked. If more accounts are to be linked (710), the button for linking an account is selected (706), and the authentication information for the account to be linked is entered (708). In this manner, the authentication information is sequentially entered and verified for all of the accounts to be linked.

After all of the accounts to be linked have been entered (710), a list of linked accounts is presented. If any accounts are to be unlinked from the rest of the linked accounts, then they are selected from the list (712). The unlink button is pressed to break the links between the selected accounts and the other accounts that remain linked (714).

Figure 8A:
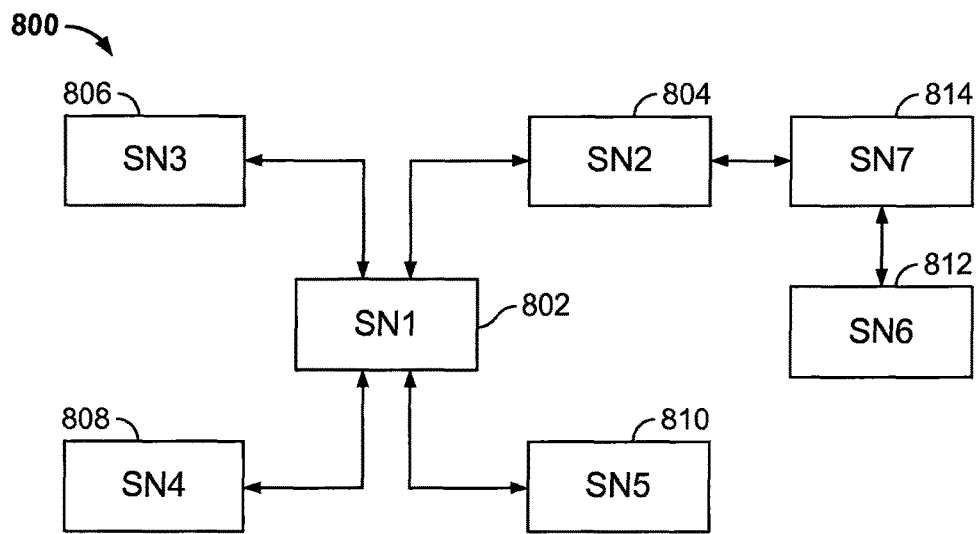
FIGS. 8A and 8B are diagrams of exemplary relationships between linked accounts.
Figure 8B:
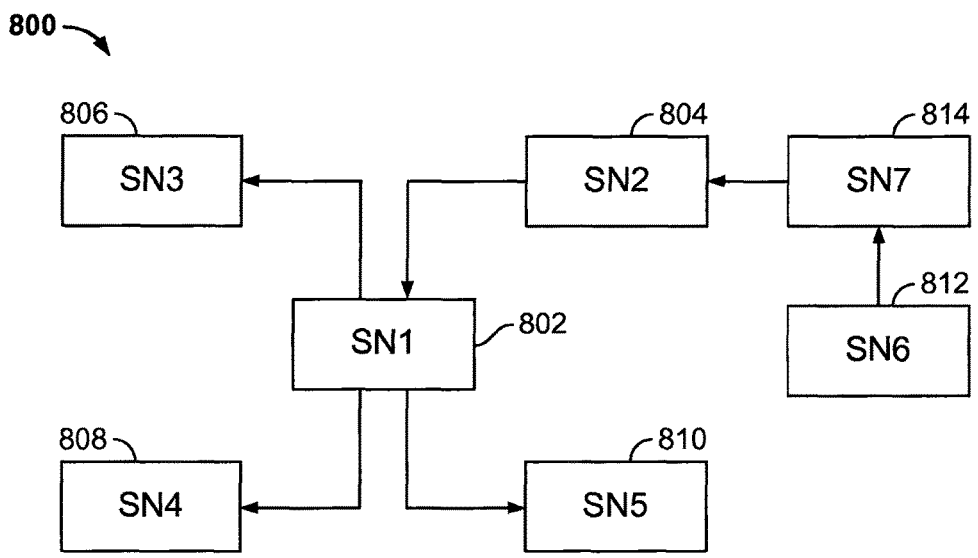

Referring to FIGS. 8A and 8B, seven accounts 802-814 have been linked together using different relationships between pairs of directly linked accounts. The type of relationship used to directly link a pair of accounts determines whether a different pair of accounts may be indirectly linked. For example, a bi-directional link exists between the accounts in FIG. 8A. A bi-directional link is a two-way link such that linking a first account to a second account means that the second account also is linked to the first account. Therefore, two relationships are created with a single link.

Specifically, in FIG. 8A, bi-directional links exist between different accounts, and SN1 is linked to SN2, SN3, SN4, and SN5. Thus, when SN1 is used to sign in to the communications system, SN2, SN3, SN4, and SN5 appear as aliases of SN1. SN2 is linked to SN1 and SN7, which appear as aliases of SN2 when SN2 is used to sign in to the communications system. SN3 is linked to SN1, which appears as an alias of SN3 when SN3 is used to sign in to the communications system. Similarly, SN4 is linked to SN1, which appears as an alias of SN4 when SN4 is used to sign in to the communications system, and SN5 also is linked to SN1, and SN1 appears as an alias of SN5 when SN5 is used to sign in to the communications system. SN6 is linked to SN7, which appears as an alias of SN6 when SN6 is used to sign in to the communications system. Finally, SN7 is linked to SN2 and SN6, which appear as aliases of SN7 when SN7 is used to sign in to the communications system.

In FIG. 8B, one-way linking is used between accounts, so a reflexive relationship does not necessarily exist between two linked accounts. For two accounts to appear linked to one another, each account has to create a link to the other account. Specifically, in the example, SN1 is linked to SN3, SN4, and SN5, which appear as aliases of SN1 when SN1 is used to sign in to the communications system. SN2 is linked to SN1, and SN1 appears as an alias of SN2 when SN2 is used to sign in to the communications system. SN3, SN4, and SN5 are not linked to any other accounts and do not have any aliases. SN6 is linked to SN7, so SN7 appears as an alias of SN6 when SN6 is used to sign in to the communications system. SN7 is linked to SN2, which appears as an alias of SN7 when SN7 is used to sign in to the communications system.

The description provided above with respect to FIGS. 8A and 8B is premised on the accounts 802-814 being linked using a star linking scheme, which dictates that a direct link must exist between two accounts before the accounts are linked. On the other hand, two accounts may appear to be linked even though a direct link between the two accounts does not exist. This linking scheme, called mesh linking, calls two accounts linked if there is an indirect link between the two accounts. For example, in FIG. 8B, SN2 and SN4 may be called linked under a mesh linking scheme because they are indirectly linked through SN1. In general, two accounts may be called linked in a mesh-linking scheme if there exists a path of linked accounts between the two accounts.

Figure 9A:
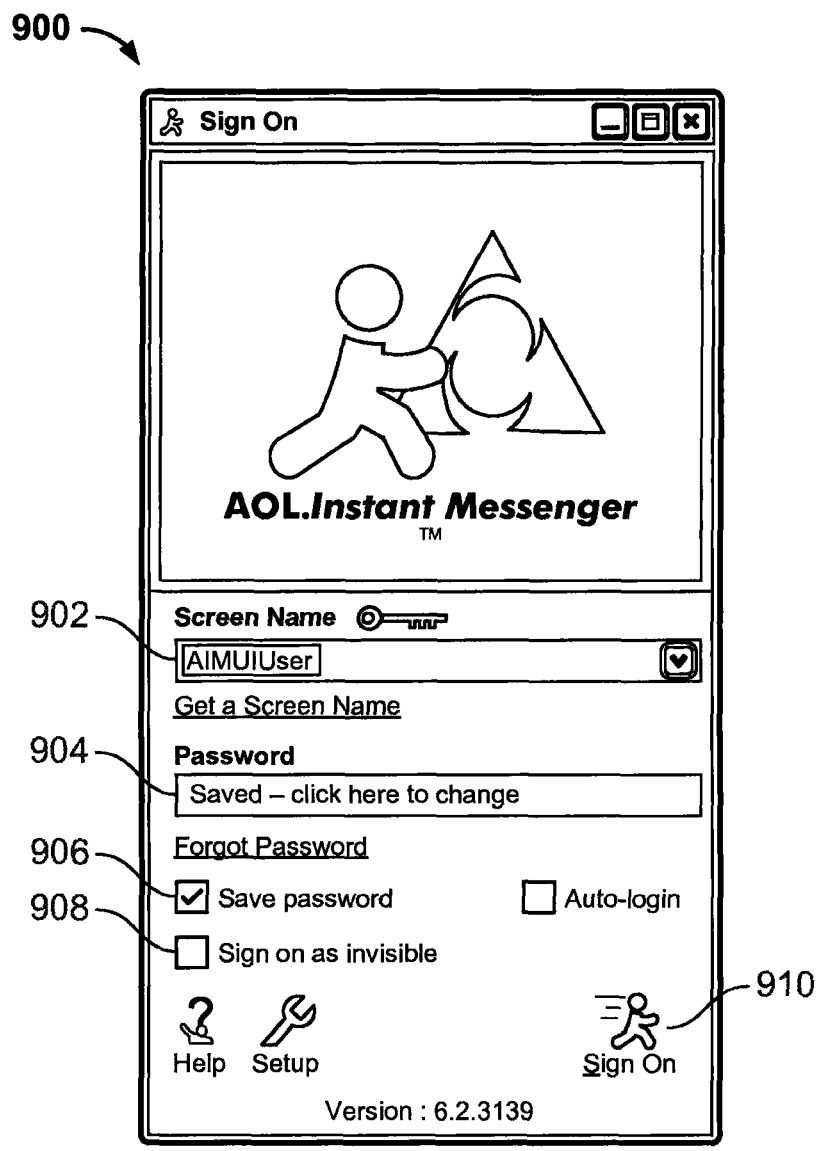
FIGS. 9A and 9B are illustrations of exemplary interfaces for signing into an instant messaging system with a linked account.

Referring to FIG. 9A, a sign in interface 900 allows the user to enter the authentication information needed to log in to the communications system with a primary account. The screen name of the primary account may be selected from a selection box 902. Alternatively or additionally, the screen name of the primary account may be typed in the selection box 902. The password for the primary account may be entered in the text box 904. If the checkbox 906 is selected, then the password for the account listed in the selection box 902 is automatically entered in the text box 904 from memory. Selecting a checkbox 908 will cause the primary account to appear as invisible, which prevents other users of the communications system from detecting the presence of the primary account even though the primary account is logged in to the communications system. After the necessary authentication information has been entered, a sign on button 910 is selected. After selecting the sign on button 910, the authentication information entered on the sign on interface 900 is verified. If additional authentication information, such as a SecureID code, is needed, a means for entering the additional information is presented. If the information is successfully verified, then the buddy list interface 400 is shown for the primary account and all of the linked accounts.

Figure 9B:
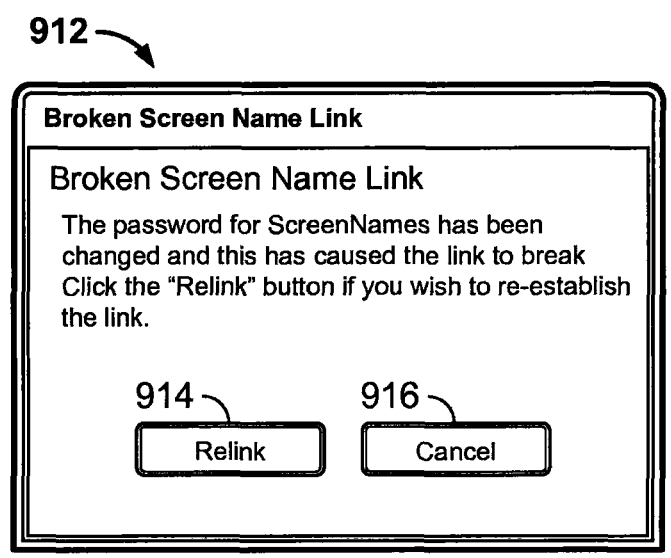

Referring to FIG. 9B, a dialog box 912 may be presented after verification of the authentication information and before the buddy list interface 400 is displayed. The dialog box 912 informs the user that a link to an alias account has been broken because the password for the alias account has changed. The option to relink the alias account to the primary account is given. A relink button 914 is enables the reestablishment of the link. Selecting the relink button 914 displays the account linking interface 600, and the new password for the alias account may be entered. After successful authentication of the new password, the link between the primary account and the alias account is reestablished, and the dialog box 912 is dismissed. In one implementation, the user may be presented with a separate form or a text box within dialog box 912 to enter a new password for revalidation of a broken link.

A cancel button 916 dismisses the dialog box 912 without reestablishing the broken link. The link between the primary account and the alias account remains broken. A dialog box 912 may be presented for each link from the primary account to an alias account that has been broken. After all of the broken links have been reestablished or dismissed, and the buddy list interface 400 is presented.

In another implementation, the link between the primary account and the alias account may be maintained despite a change in the password for the alias account. In such an implementation, the dialog box 912 is not presented, and the link to the alias account does not need to be reestablished.

Links between accounts also may be broken manually. From the perspective of a single user with multiple linked accounts, the user may break any link between the linked accounts regardless of the linked account used to sign in to the communications system and regardless of whether the link is bi-directional. Authentication information for the accounts connected by the link to be broken may be entered in order to authorize the destruction of the link. Similarly, from the perspective of multiple users with multiple linked accounts, a link between an account to which the link extends and an account from which the link extends may be broken by the user corresponding to the account to which the link extends. A notification may be sent to the account from which the link extends, and the permission of the account from which the link extends may be required for destruction of the link.

Figure 10:
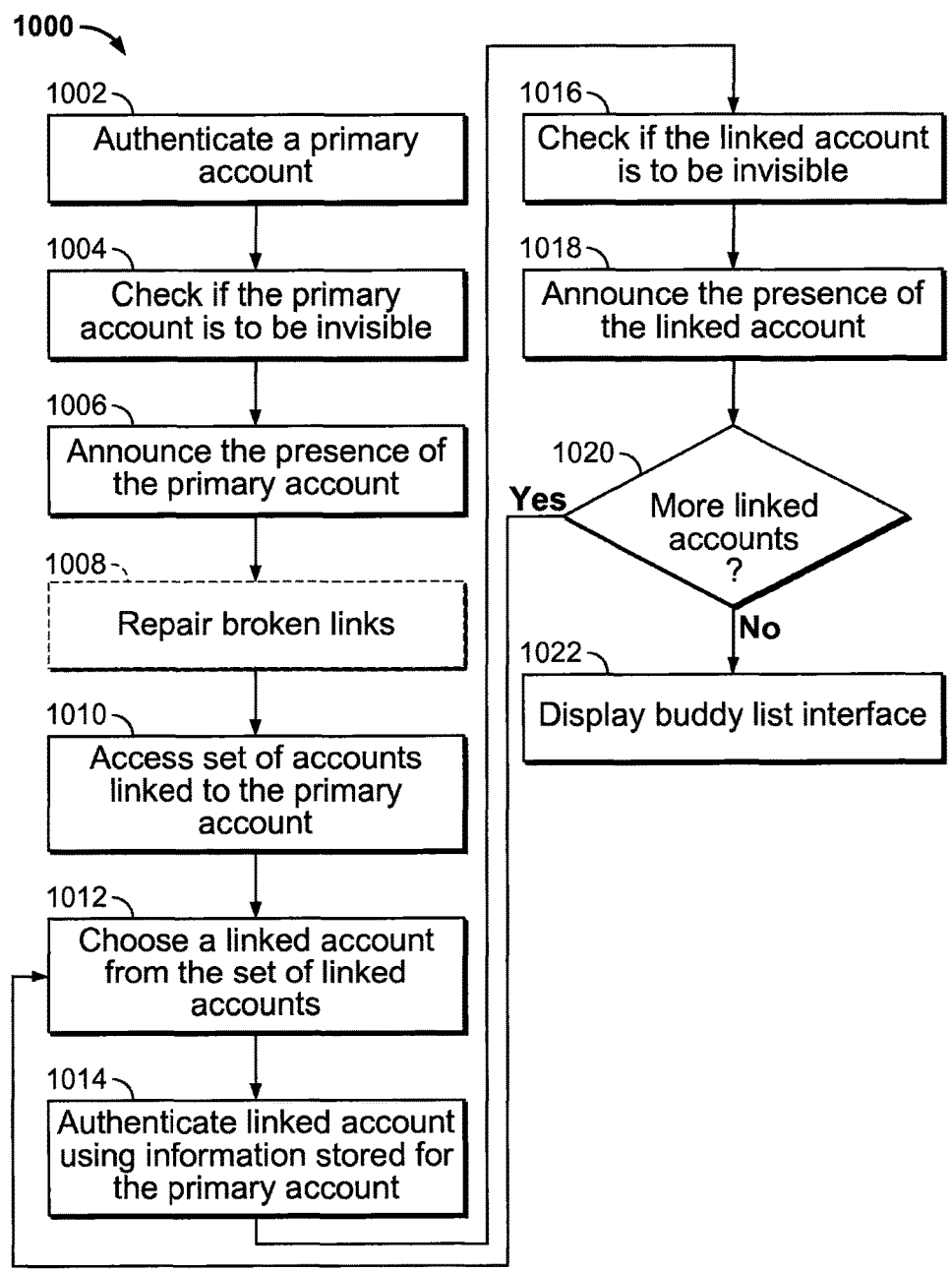
FIG. 10 is a flow chart of an exemplary process for logging into an instant messaging system.

Referring to FIG. 10, a process 1000 is used to sign in to a communications system with multiple linked accounts. The process 1000 begins when authentication information for a primary account for signing in to the communications system is entered and verified (1002). The visibility of the primary account is checked (1004). If the primary account is to be visible, then the presence of the primary account is announced to the other accounts that currently are logged in to the communications system (1006). If broken links from the primary account are detected, then the links may be repaired to reestablish a connection between the primary account and an alias account (1008).

Next, a set of accounts that are linked to the primary account, including those accounts that had a broken link repaired, is accessed (1010). One of the linked accounts from the set of linked accounts is chosen (1012). The chosen linked account is authenticated based on authentication information stored with respect to the primary account (1014). After authentication, the visibility of the linked account is checked (1016). If the linked account is to appear visible, then the presence of the linked account is announced to the other accounts that currently are logged in to the communications system (1018).

A determination is made as to whether more accounts to be linked exist in the set of linked accounts (1020). If more accounts do exist, a linked account is chosen (1012), the linked account is authenticated (1014), the visibility of the linked account is checked (1016), and the presence of the linked account is announced if the linked account is to be visible (1018). In this manner, the accounts that are linked to the primary account are signed in to the communications system sequentially. Once all of the linked accounts have been signed in to the communications system (1020), a buddy list interface displaying the buddy lists for the primary account and the linked accounts is displayed (1022). Communication can then occur using the primary account and the linked accounts.

Figure 11:
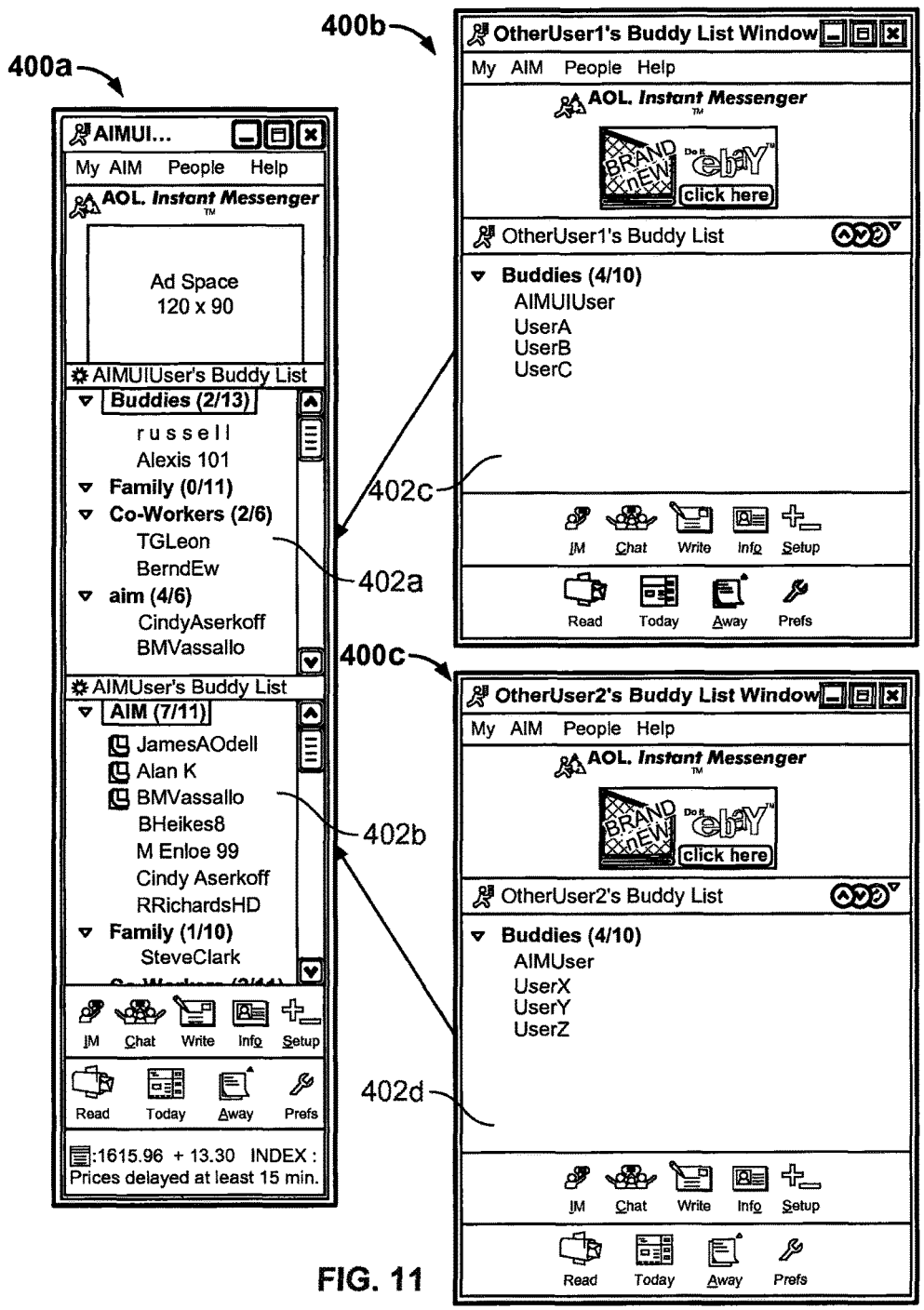

Referring to FIG. 11, a buddy list interface 400*a* has been displayed for a user of a communications system with linked accounts. The user has two linked accounts, one with a screen name of AIMUIUser, and one with a screen name of AIMUser. The buddy list interface 400*a* includes a buddy list 402*a* for the account with screen name AIMUIUser and a buddy list 402*b* for the account with the screen name AIMUser. The buddy list 402*a* is displayed first because the screen name AIMUIUser was used to sign in to the communications system. In addition, two other users, a user with a screen name OtherUser1 and a user with a screen name OtherUser2 are logged in to the communications system, and the corresponding buddy list interfaces 400*b* and 400*c*, respectively, are displayed. OtherUser1 and OtherUser2 do not maintain any linked accounts, so the buddy list interfaces 400*b* and 400*c* each only display a single buddy list 402*c* and 402*d*, respectively. The buddy list 402*c* for OtherUser1 includes the screen name AIMUIUser, which indicates that the account with the screen name AIMUIUser is logged in to the communications system. The buddy list 402*d* for OtherUser2 includes the screen name AIMUser, which indicates that the account with the screen name AIMUser is logged in to the communications system. Even though the account with the screen name AIMUser did not directly log in to the communications system, the account is still shown as logged in because the account is linked to the account with the screen name AIMUIUser, which was used to log in to the communications system.

Figure 12A:
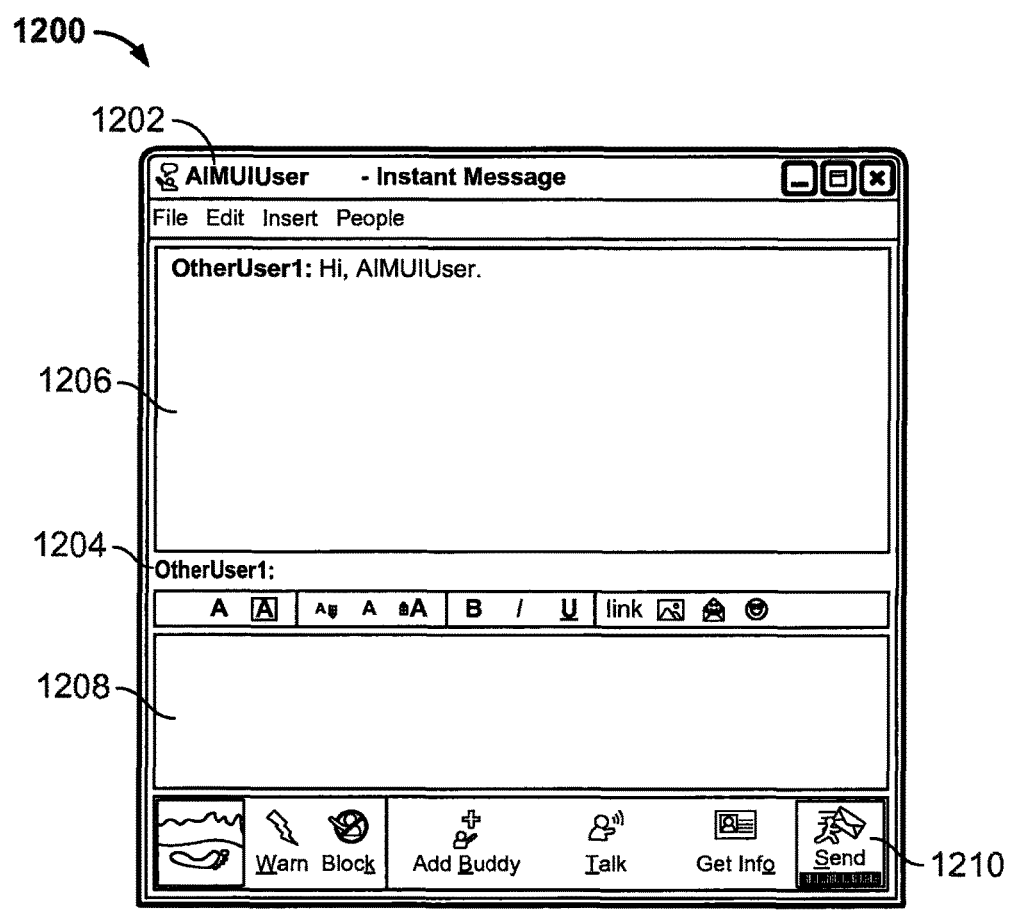
FIGS. 12A-12D and 13A-13C are illustrations of an exemplary interface for sending communications to and from a linked account.

Referring to FIG. 12A, communications may be sent to and from the linked accounts using a communications interface 1200. The communications interface 1200 includes a recipient indicator 1202 that indicates a recipient of the messages sent with the communications interface 1200 and a sender indicator 1204 that indicates a sender of the messages sent with the communications interface 1200. For example, the communications interface 1200 is used to send communications from the screen name OtherUser1 to the screen name AIMUIUser. The communications interface 1200 is seen by the user with the screen name OtherUser1 as the user sends messages to the screen name AIMUIUser. The screen name OtherUser1 may send messages to the screen name AIMUIUser after seeing the screen name AIMUIUser on the buddy list interface 400*b* from FIG. 11. The screen name AIMUIUser appeared on the buddy list interface 400*b* from FIG. 11 because the account with the screen name AIMUIUser logged directly in to the communications system.

A message transcript text box 1206 displays the text of the messages sent between the sender and the recipient. Further messages may be specified in a message text box 1208. Once specified in the message text box 1208, the message may be sent by selecting a send button 1210.

Figure 12B:
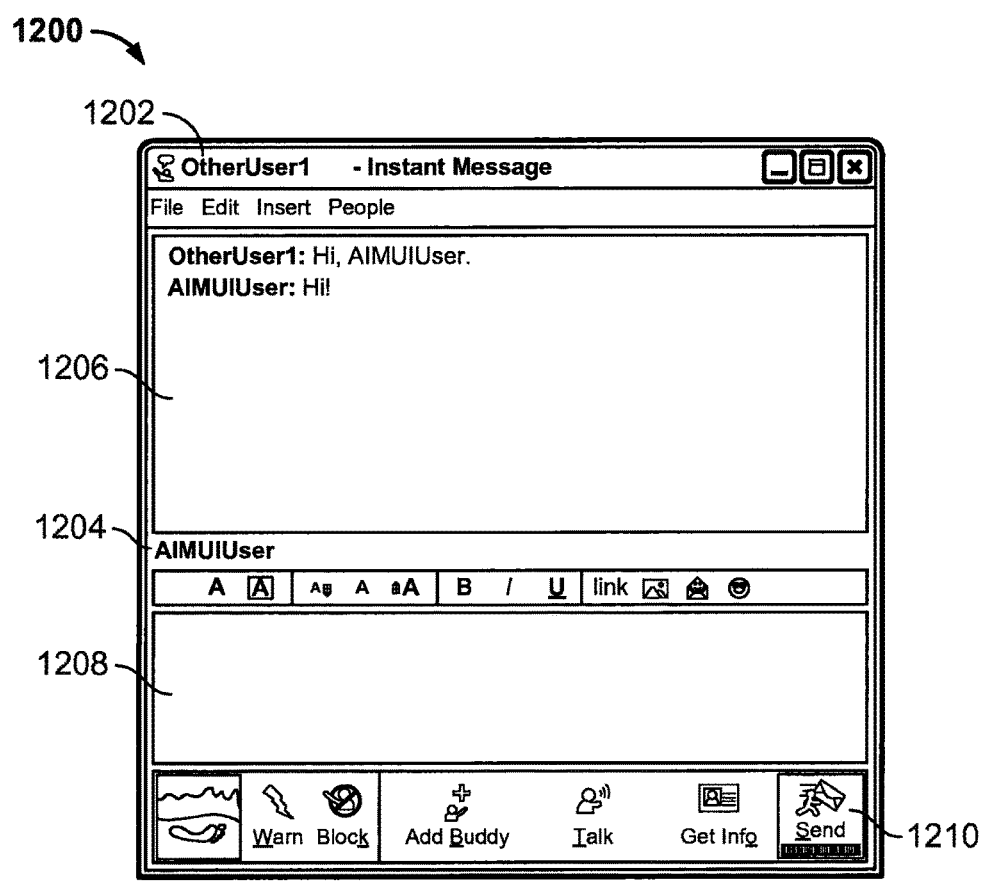

Referring to FIG. 12B, a different communications interface 1200 is displayed for the user with the screen name AIMUIUser after a message is sent from the user with the screen name OtherUser1. The communications interface 1200 is used by the user with the screen name AIMUIUser to send a response to the user with the screen name OtherUser1. The recipient indicator 1202 indicates that the screen name OtherUser1 is the recipient of messages sent with the communications interface 1200. Similarly, the sender indicator 1204 indicates that the screen name AIMUIUser is the sender of messages sent with the communications interface 1200. A message transcript text box 1206 displays the text of the messages sent between the sender and the recipient, including the original message sent from the screen name OtherUser1 to the screen name AIMUIUser. Further messages may be specified in a message text box 1208. Once specified in the message text box 1208, the message may be sent by selecting a send button 1210. Messages may be sent from the account with the screen name AIMUIUser because the account with the screen name AIMUIUser was used to log directly in to the communications system.

Figure 12C:
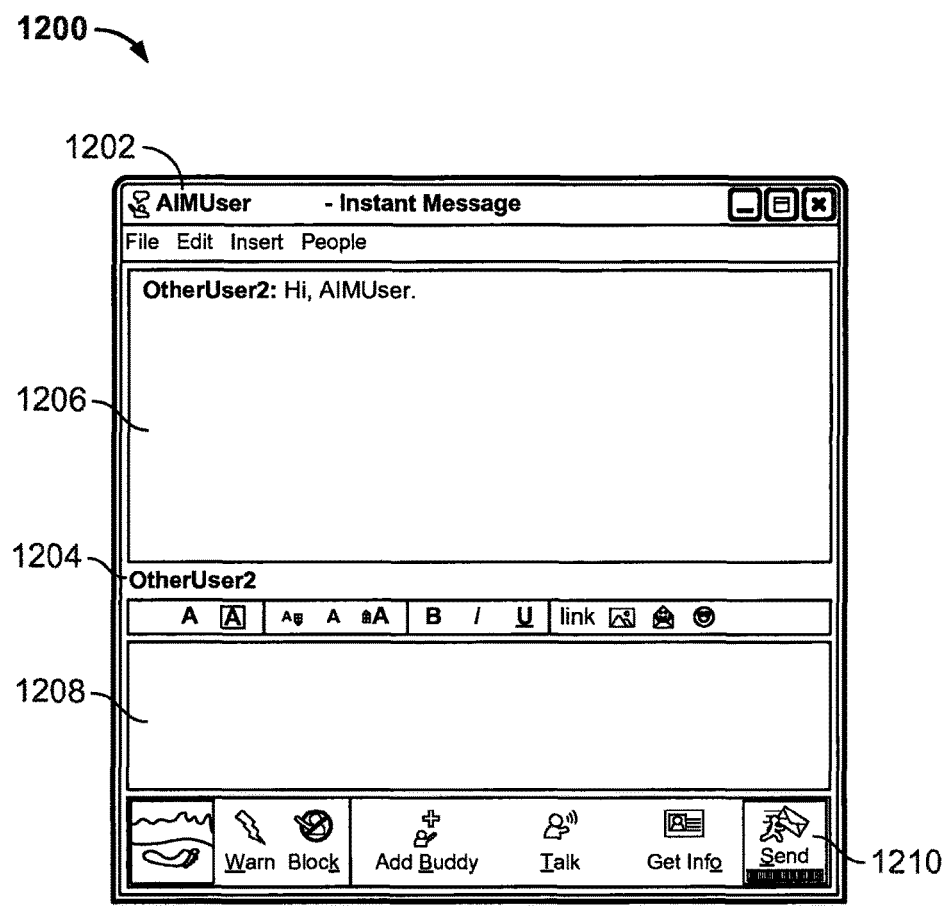

Referring to FIG. 12C, a communications interface 1200 may be displayed for the user with a screen name OtherUser2. The communications interface 1200 is used to send communications from the screen name OtherUser2 to the screen name AIMUser. The communications interface 1200 is seen by the user with the screen name OtherUser2 as the user sends messages to the screen name AIMUser. The screen name OtherUser2 may send messages to the screen name AIMUser after seeing the screen name AIMUser on the buddy list interface 400*c* from FIG. 11. The screen name AIMUser appeared on the buddy list interface 400*c* from FIG. 11 because the account with the screen name AIMUser is linked to the account with the screen name AIMUIUser, which was used to log directly in to the communications system.

A message transcript text box 1206 displays the text of the messages sent between the sender and the recipient. Further messages may be specified in a message text box 1208. Once specified in the message text box 1208, the message may be sent by selecting a send button 1210.

Figure 12D:
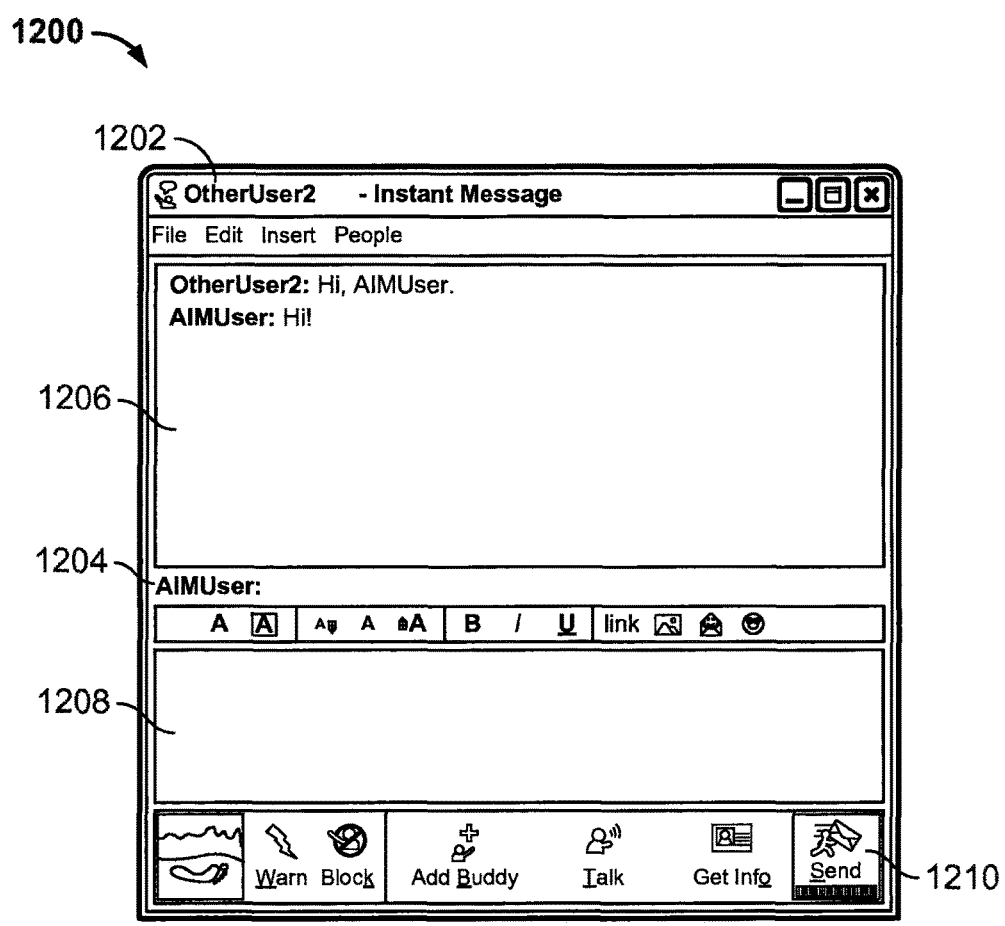

Referring to FIG. 12D, a different communications interface 1200 is displayed for the user with the screen name AIMUser after a message is sent from the user with the screen name OtherUser2. The user with the screen name AIMUser is the same as the user with the screen name AIMUIUser because the corresponding accounts are linked. The communications interface 1200 is used by the user with the screen name AIMUIUser or AIMUser to send a response to the user with the screen name OtherUser2. The recipient indicator 1202 indicates that the screen name OtherUser2 is the recipient of messages sent with the communications interface 1200. Similarly, the sender indicator 1204 indicates that the screen name AIMUser is the sender of messages sent with the communications interface 1200. A message transcript text box 1206 displays the text of the messages sent between the sender and the recipient, including the original message sent from the screen name OtherUser2 to the screen name AIMUser. Further messages may be specified in a message text box 1208. Once specified in the message text box 1208, the message may be sent by selecting a send button 1210. Messages may be sent from the account with the screen name AIMUser because the account with the screen name AIMUser is linked to the account with the screen name AIMUIUser, which was used to log directly in to the communications system. Furthermore, the user with the screen names AIMUIUser and AIMUser may transparently send messages using the communications interface 1200 from two linked accounts simultaneously.

Figure 13A:
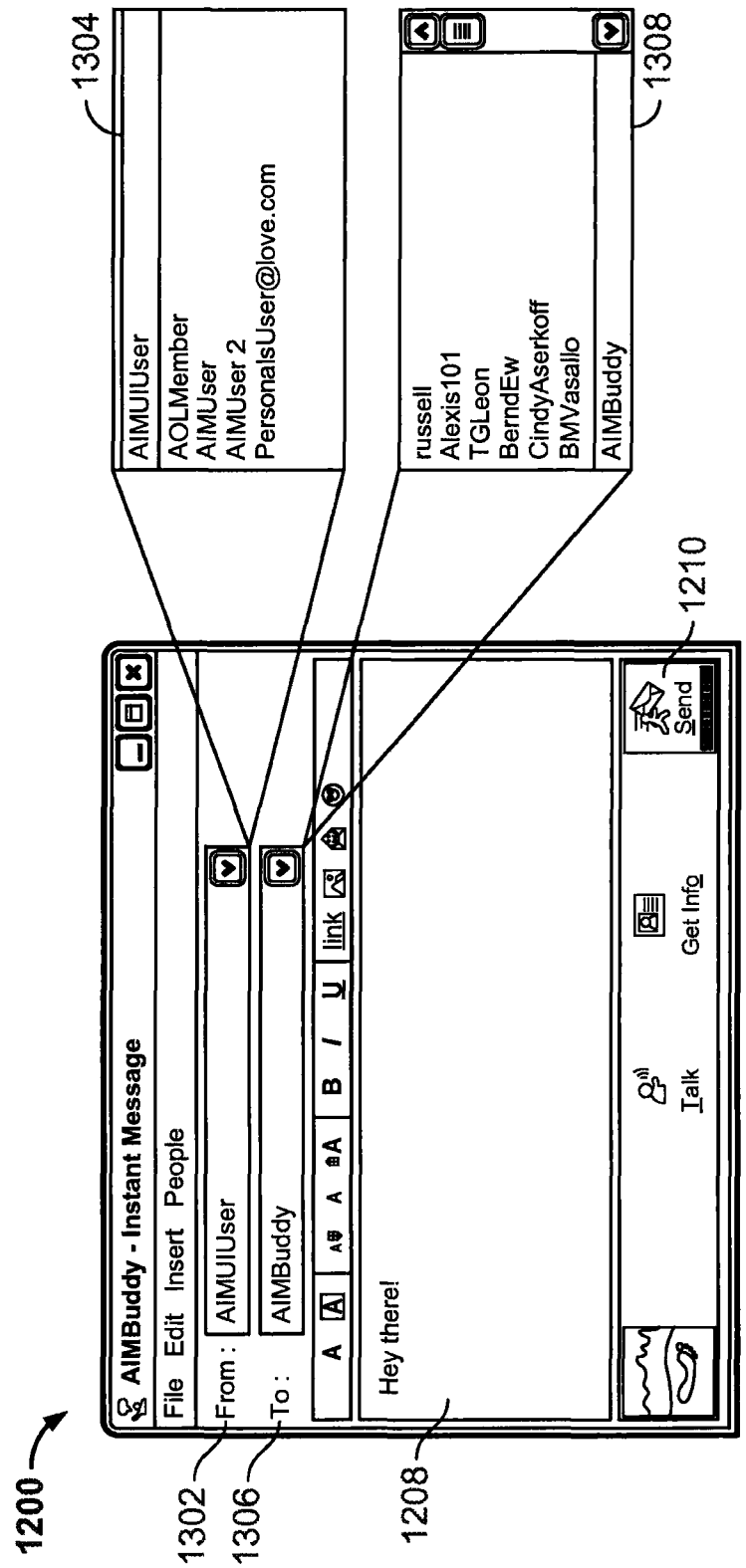

Referring to FIG. 13A, a communication interface 1200 has a different appearance before a first message is sent. The communication interface 1200 includes a sender selection box 1302 in which the account that the communication is sent from is specified. All communications sent using the communication interface 1200 appear to be from the account selected in the sender selection box 1302. For example, the account with the screen name AIMUIUser has been selected as the sender of the communication, and all communications will appear to be from that account. The screen names of all the linked accounts are presented in and may be selected from the sender selection box 1302. An expanded sender selection box 1304 includes the names of all of the linked accounts from which the communication interface 1200 may be sent. The expanded sender selection box 1304 may be displayed below the sender selection box 1302 when the arrow on the right side of the sender selection box 1302 is selected. The expanded sender selection box 1304 also may be displayed below the sender selection box 1302 when attempting to scroll through the selections included in the sender selection box 1304.

The recipient of the communication is specified using the recipient selection box 1306. For example, the account with the screen name AIMBuddy has been selected as the recipient of the communication. The screen names of possible recipient accounts are presented in and may be selected from the recipient selection box 1306. The screen name of the recipient also may be typed in the recipient selection box 1306. An expanded recipient selection box 1308 includes the names of possible recipients of messages sent using the communication interface 1200. The expanded recipient selection box 1308 may be pre-populated with the names included in a buddy list for the sender selected in the sender selection box 1302. The expanded recipient selection box 1308 may be displayed below the recipient selection box 1306 when the arrow on the right side of the recipient selection box 1306 is selected. The expanded recipient selection box 1308 also may be displayed below the recipient selection box 1306 when attempting to scroll through the selections included in the recipient selection box 1306. In one implementation, as the sender is changed in the sender selection box 1302, the names of possible recipients of messages are changed to correspond to the newly selected sender's buddy list.

Alternatively or additionally, a recipient for the message may be chosen from the buddy list interface 400. In this case, the screen name for the recipient may be entered automatically entered in the recipient selection box 1306, and the screen name of the account whose buddy list the recipient was chosen from may be automatically entered in the sender selection box 1302.

The message to be sent is typed into the message text box 1208. After specification of the sender with the sender selection box 1302, the recipient with recipient selection box 1306, and the message in the message text box 1208, a send button 1210 is used to send the message from the sender to the recipient.

Figure 13B:
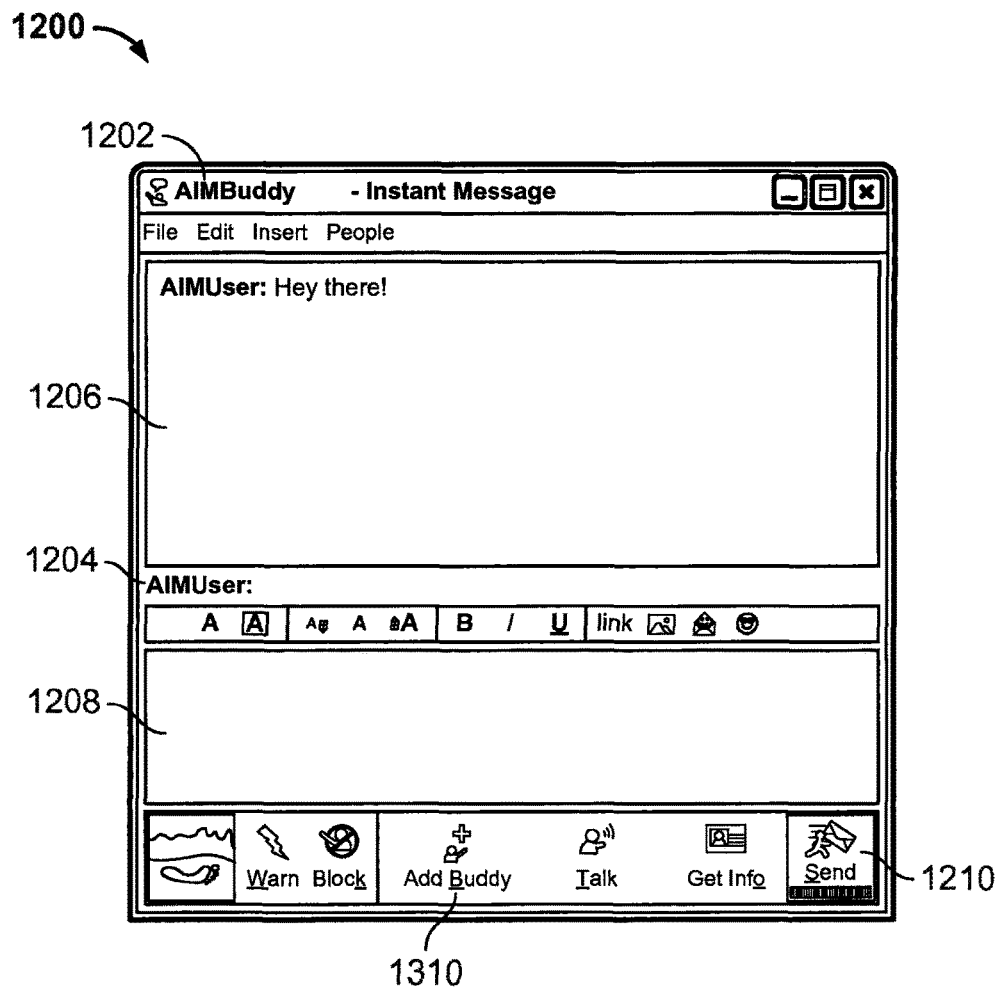

Referring to FIG. 13B, the appearance of the communication interface 1200 changes after the send button 1210 is pressed for the first time. In one exemplary implementation, once the sender and recipient accounts have been specified and one message has been sent from the sender to the recipient, the sender and recipient accounts may not be changed. Therefore, the sender selection box 1302 and the recipient selection box 1304 are removed from the communication interface 1200. A recipient indicator 1202 indicates the recipient chosen in the recipient selection box 1304, and a sender indicator 1204 indicates the recipient chosen in the sender selection box 1302. A transcript text box 1206 replaces the sender selection box 1302 and the recipient selection box 1304. The transcript text box 1206 includes the text of each message that has been sent between the sender and recipient accounts using the communication interface 1200, as well as an indication of whether the sender account or the recipient account sent the message.

A new message to be sent may be entered in the message text box 1208, and the message may be sent to the specified recipient by selecting the send button 1210. In addition, the recipient may be added to the sender's buddy list by selecting an add buddy button 1310.

Figure 13C:
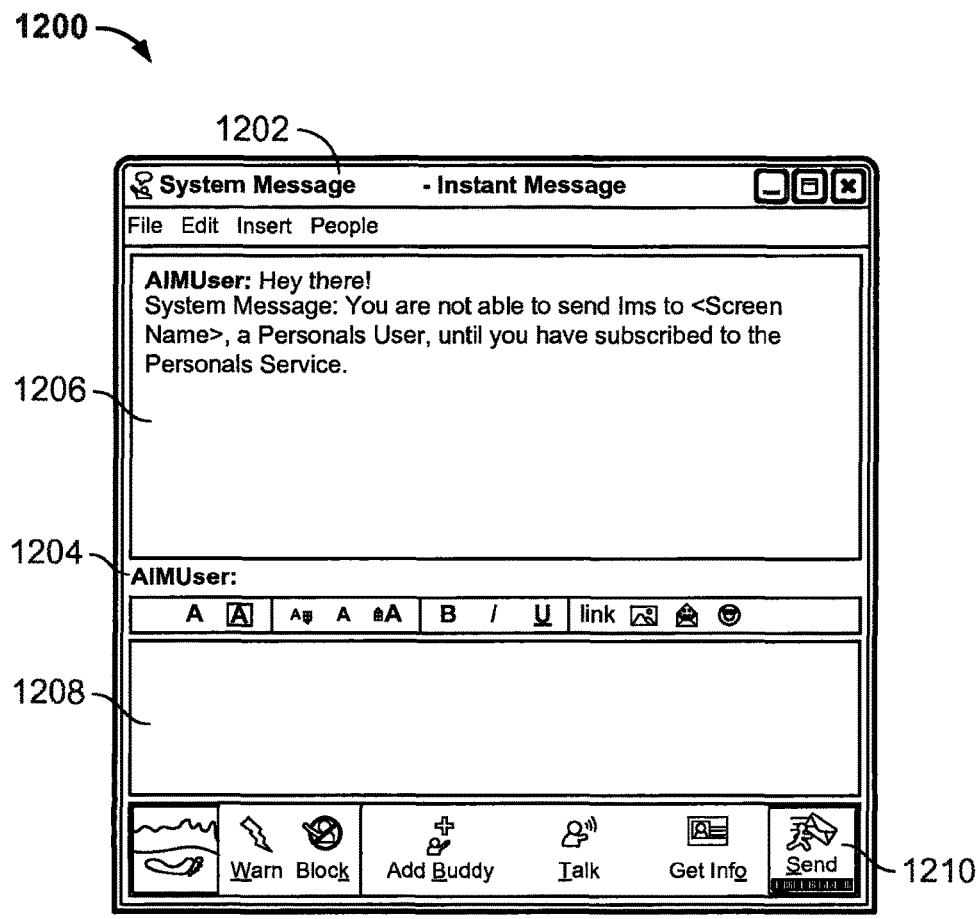

Referring to FIG. 13C, before messages are delivered to the chosen recipient account from a chosen sender account, a determination is made as to whether the sender and recipient accounts are allowed to send messages to each other. If not, then the message that was specified in the message text box 1208 is not delivered to the recipient after the send button 1210 was selected. Instead a message from the communications system appears in the transcript text box 1206 informing the user that communication between the selected sender and recipient accounts may not occur. In addition, the recipient indicator 1202 indicates the communication was intercepted by the communications system, but the sender indicator 1204 still indicates the recipient chosen in the sender selection box 1302.

Communication between two accounts may be denied if the accounts do not belong to the same domain. For example, if the recipient belongs to a gaming club, but the sender does not, then the sender may not be allowed to send messages to the recipient. In general, communication may be denied if the sender does not have permission to send messages to the recipient or if the recipient denies a request to communicate with the sender.

Figure 14A:
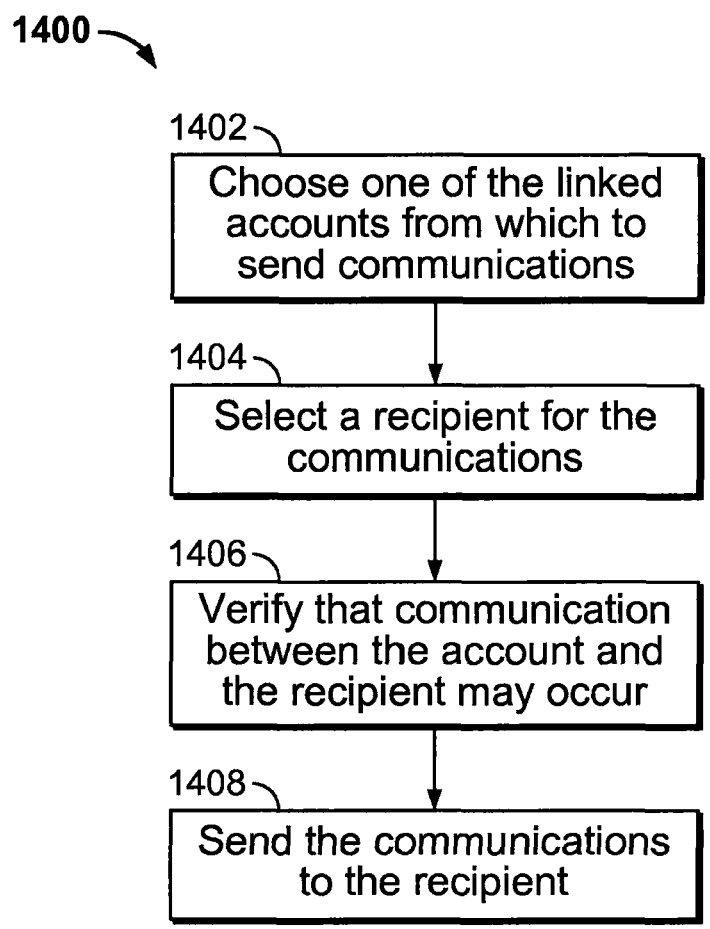
FIGS. 14A and 14B are flow charts of exemplary processes for communicating from a linked account.

Referring to FIG. 14A, a process 1400 is used by a sender to initiate communications with a recipient. The process 1400 begins when the sender chooses one of the accounts linked to the account used to sign in to the communications system to communicate from (1402). Next, the recipient of the communications is chosen (1404). The compatibility of the chosen sender and recipient accounts is checked to verify that communication between the sender and the recipient is allowed to occur (1406). If so, the sender account is free to send communications to the recipient (1408).

Figure 14B:
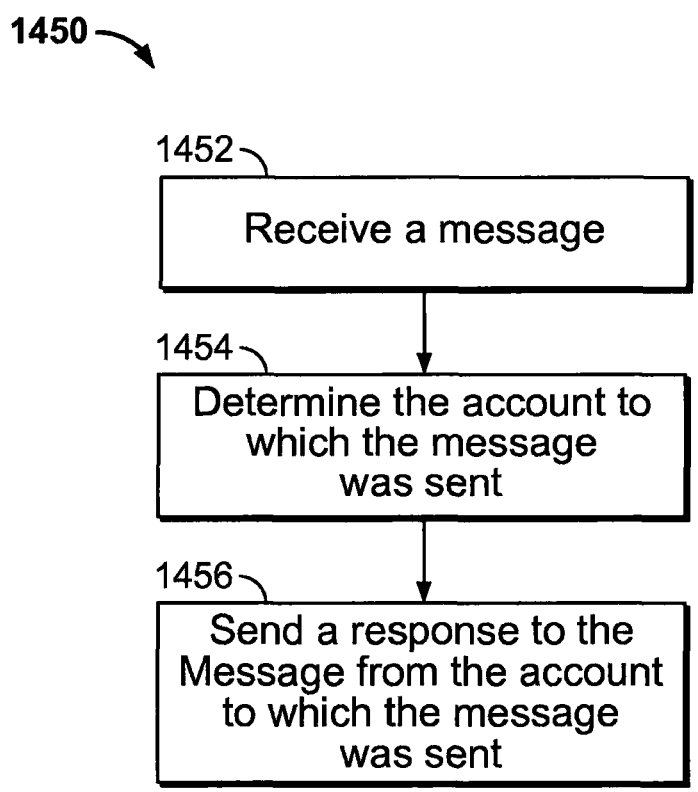

Referring to FIG. 14B, a process 1450 is used to respond to a message received from a user of the communications system. The process 1450 begins when a message is received from a user of the communication system by a client program that is running for multiple linked accounts (1452). The intended recipient of the message is determined (1454). The intended recipient is one of the linked accounts for which the client program is running. A response to the original message is sent from the linked account to which the original message was addressed (1456). The determination of the intended recipient account of the original message is automatic. Should a response to the original message be sent, it will automatically appear to be from the account to which the original message was sent.

Figure 15:
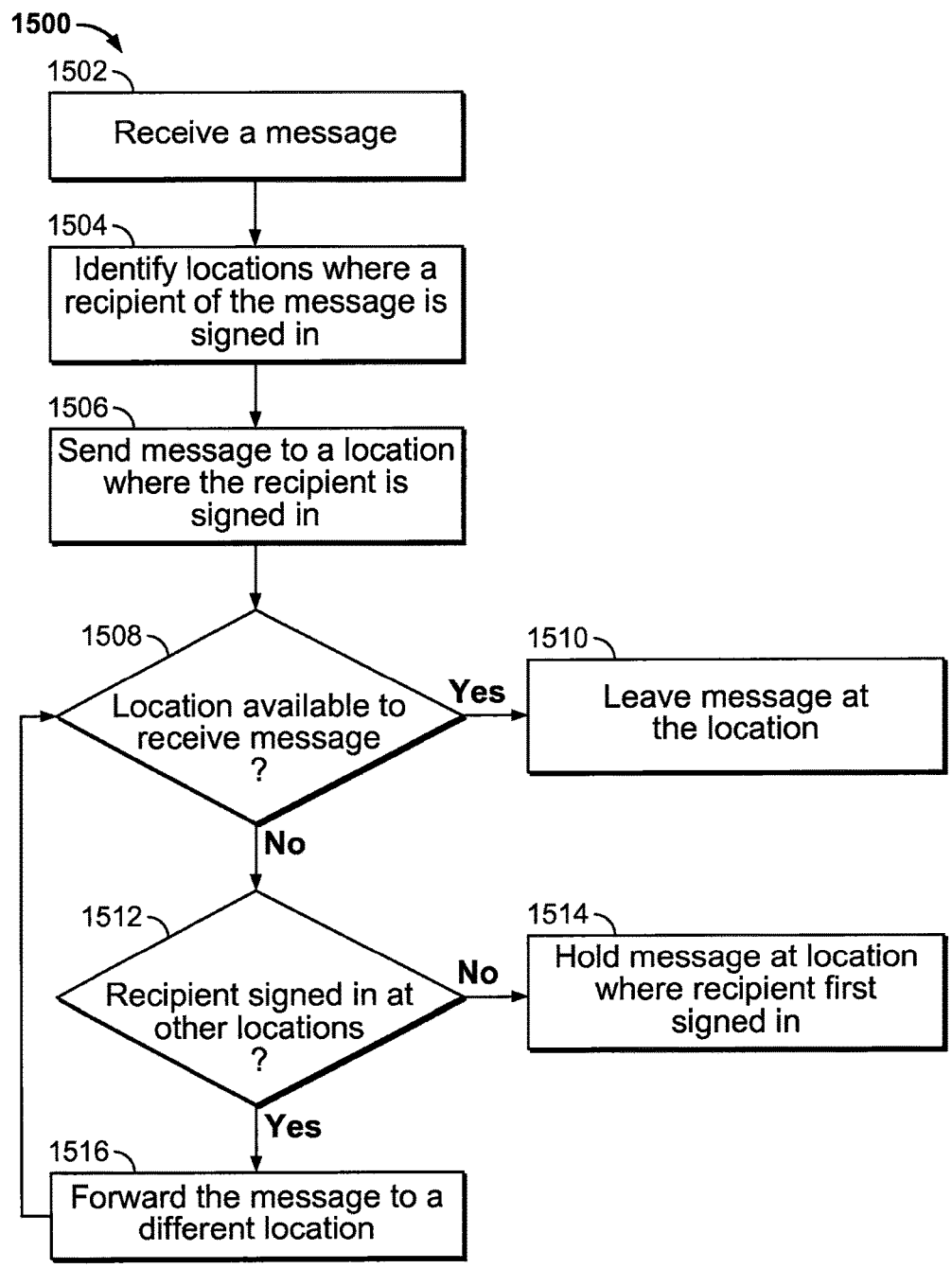
FIG. 15 is a flow chart of an exemplary process for forwarding instant messages to a client.

Referring to FIG. 15, a process 1500 is used to forward messages to locations where recipients are available to receive them. Because accounts may be linked, the same account may be signed in to the communications system at multiple physical locations. A message is sent to every location where a recipient of the message is signed in to the communications system and may be replied to at any of the locations where the recipient account is signed in to the communications system. If an away message is up, the message is forwarded to the next location that does not have an away message up, where the locations are ordered based on the time of sign in. If away messages are up at all locations where the recipient account is signed in, the message is held at the location where the recipient account first signed in to the communications system.

The process 1500 begins when a message is received by the communications system (1502). A set of locations at which a recipient of the message is signed in to the communications system is identified (1504). The locations are the places where the message may be received by the recipient. The message is sent to one of the set of identified locations (1506). A determination is made as to whether the location is available to receive the message (1508). In other words, a determination is made as to whether the location has an away message displayed. If the location is available to receive the message because it does not have an away message displayed, then the message is left at the location (1510). If the location is unable to receive the message because an away message is up, then it is determined if there is another location that may be available to receive the message (1512). If there are no other locations that may receive the message, then the message is held at the location where the recipient first signed in to the communications system (1514). Otherwise, the message is forwarded to the next location in the set of locations, based on the sign in time of the recipient (1516). A determination is made again as to whether the location may receive the message (1512). If so, the message is held at the location (1514). Otherwise it is forwarded to another location if one exists. In this manner a message may be passed between all of the locations where the recipient is signed in to the communications system so that the recipient can receive and respond to the message.

For example, consider again the linking scenario of FIG. 8A. Imagine that SN1 was used to sign in at a first location and that SN2 was used later to sign in at a second location. SN1 is linked to SN2, SN3, SN4, and SN5, so messages for SN1, SN2, SN3, SN4, and SN5 may be received at the first location. SN2 is linked to SN1 and SN7, so messages for SN1, SN2, and SN7 may be received at the second location. If the first location has an away message up and the second location does not have an away message up, then messages sent to SN1 and SN2 are forwarded to the second location. If the second location has an away message up, messages for SN1 and SN2 are forwarded to the first location, while messages for SN7 are held at the second location, the only place where SN7 is signed in. If both locations are have away messages displayed, then the messages for SN1 and SN2 are held at the first location, where SN1 and SN2 first signed in, and messages for SN7 are held at the second location, where SN7 first signed in.

Figure 16A:
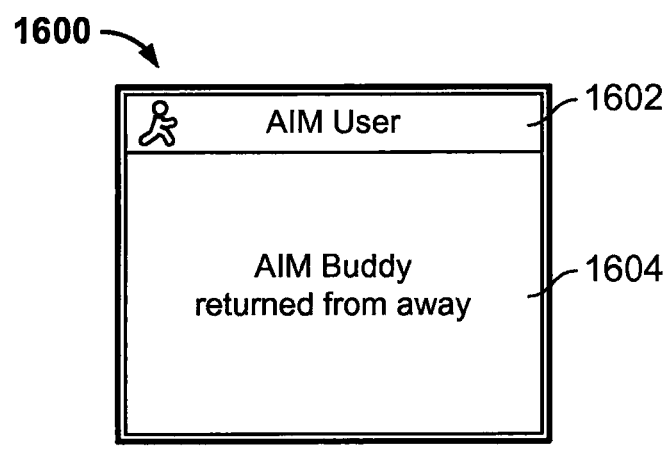
FIG. 16A is an illustration of an exemplary notification that a specified action has been performed by a buddy of one of the linked accounts.

Referring to FIG. 16A, a notification 1600 is presented after one of a specified series of events relating to the accounts listed on the buddy lists of a set of linked accounts. The header 1602 of the notification 1600 contains screen name of the linked account whose buddy list contains the account that triggered the notification. The body 1604 of the notification contains the screen name of the account that triggered the notification as well as a description of the event that triggered the notification.

Figure 16B:
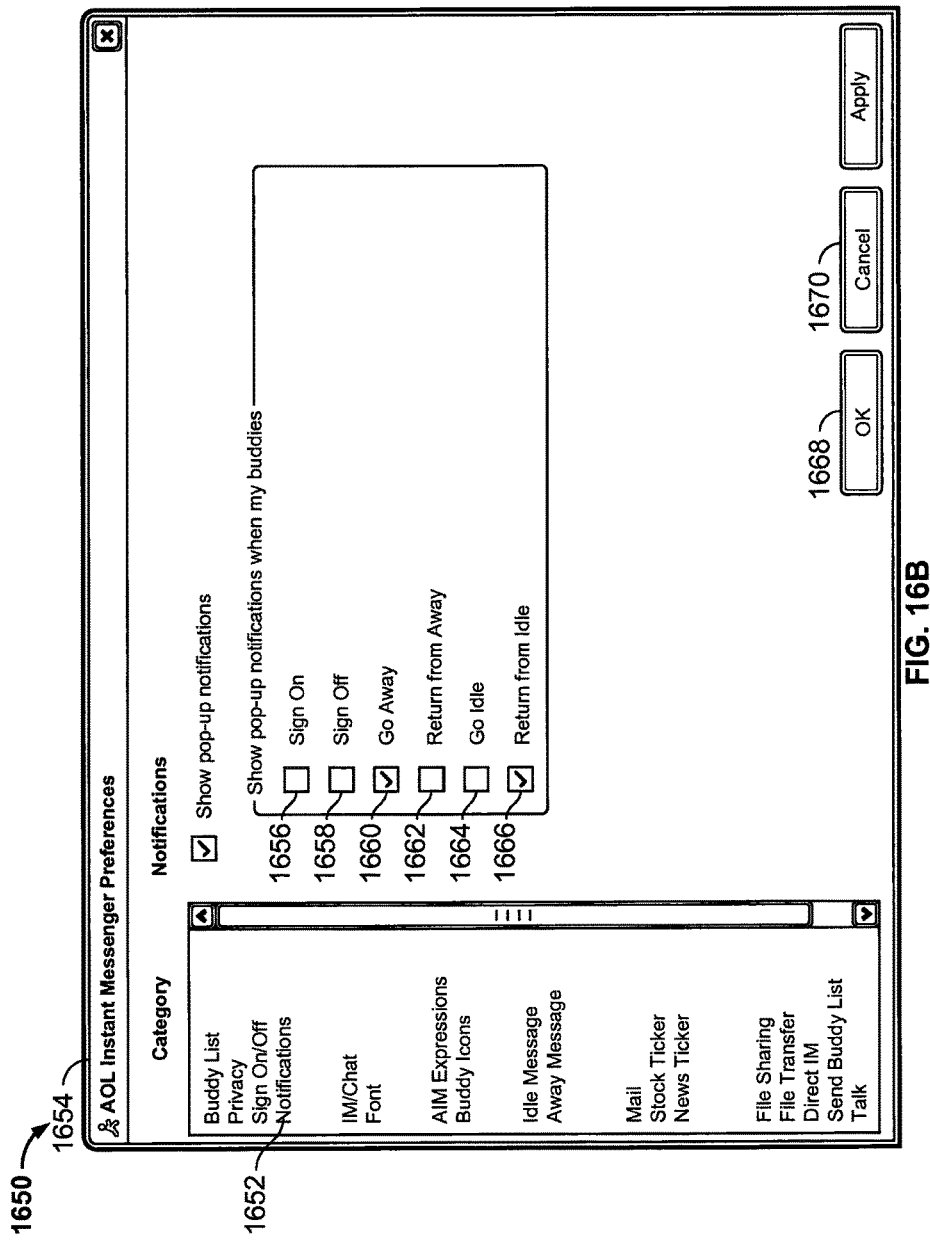
FIG. 16B is an illustration of an exemplary interface for specifying actions.

Certain actions by the accounts listed in the buddy lists for the linked accounts may cause a notification 1600 to appear. The actions include signing on to the communications system, signing off of the communications system, going away from the communications system by putting up an away message, returning from away, going idle by not using the communications system for a specified amount of time, and returning from idle. Which actions cause a notification to appear, if notifications are to appear at all, may be set in the preferences control panel 1650 of FIG. 16B. The section of the preferences control panel 1650 that governs when notifications 1600 are displayed may be accessed by selecting the notifications option 1652 in the list of preference categories. The notifications section of the preferences control panel 1650 includes a checkbox 1654 for selecting whether notifications 1600 should be displayed. Selecting the checkbox 1654 causes notifications 1600 to appear when they are triggered.

A series of options 1656-1666 govern which actions lead to the display of notifications 1600. For example, selecting option 1656 will cause notifications to appear when accounts on the buddy lists for the linked accounts sign on to the communications system. Similarly, selecting option 1658 causes notification to appear when accounts on the buddy lists sign off of the communications system. Option 1660 causes notifications 1600 to appear when accounts go away, and option 1662 causes notifications 1600 to appear when accounts return from away. Finally, option 1664 causes notifications 1600 to appear when accounts go idle, and option 1666 causes notifications 1600 to appear when accounts return from idle.

Any changes made to the preferences control panel 1650, including changes to the notifications settings, may be saved with an accept button 1668. Selecting the accept button 1668 closes the preferences control panel 1650 and applies the changes made to the preferences control panel. On the other hand, a cancel button 1670 may dismiss the preferences control panel 1650 without making any of the changes to the settings that govern when notifications 1600 are shown.

FIG. 17 shows a communications system 1700 that is capable of delivering and exchanging data between a requestor system 1705 and a provider system 1710 through a communications link 1715. The communications link 1715 may include communications pathways 1750 and 1755 that enable communications through one or more delivery networks 1760. The requestor system 1705 and communications link 1715 may have characteristics comparable to and may illustrate one possible implementation of the requestor system 105, 205 and 305 and the communication links 115, 215 and 315 of FIG. 1, 2 or 3. The requestor system 1705 also may be referred to as a client system. Likewise, the provider system 1710 may have characteristics comparable to and illustrates one possible implementation of the provider systems 110, 210 or 310 of FIG. 1, 2 or 3. In general, and in contrast to the depiction of the provider systems 110, 210 or 310, the provider system 1710 includes an offline mobile proxy 1740 and a wireless server 1745 configured to enable communications between the client system 1705 and a mobile telephone device 1770 through the cellular system 1780.

The provider system 1710 includes a desktop instant messaging server 1730 that operates instant messaging server software configured to process communications sent from and received by users of an instant messaging service. In particular, the desktop instant messaging server 1730 is configured to exchange instant messages and communications related to the instant message service between the client system 1705 and the provider system 1710 over the communication link 1715. The desktop instant messaging server 1730 itself may be an implementation of the provider systems 110, 210 or 310 of FIG. 1, 2 or 3. In one implementation, the desktop instant messaging server 1730 does not include an ability to link multiple screen names belonging to a single user account. The desktop instant messaging server 1710 includes privacy control information 1730A that is used to determine whether a message (or a portion thereof) should be provided to an intended recipient. The privacy control information 1730A may be applied to instant messages and/or text messages sent from the wireless server to the mobile telephone device 1770 through the cellular system 1780. For example, the privacy control information 1730A may include rules identified by a user that are applied to receiving instant messages or text messages by an account associated with the user. Undesired words may be entered into privacy control information associated with the user and messages including those words may be blocked or the words deleted from the message, as determined by the user.

The desktop instant messaging server 1710 also includes code segments 1730B that enable a user to configure a buddy list associated with an instant messaging screen name. More particularly, the code segments 1730B enable a user to identify a screen name or other type of instant messaging identifier (such as an ICQ Number or a user account identifier) to be added to the user's buddy list, as described previously with respect to FIGS. 4 and 11. The code segments 1730B also enable a user to identify a mobile telephone number to be added to the user's buddy list. The mobile telephone number also may be assigned a surrogate identifier or alias (e.g., a name) to be displayed on the user's buddy list to help identify the identity associated with the mobile telephone number. An instant message may be addressed to the mobile telephone number in lieu of addressing an instant message to a screen name, as described more fully later.

The desktop instant messaging server 1730 also includes code segments 1730C to enable a user to configure the user's instant messaging account. In particular, the code segments 1730C enable a user to identify a mobile telephone number to be associated with the user's instant messaging user account. The mobile telephone number is stored in association with the user account in the user-device registry 1735. The code segments 1730C also enable a user to optionally request that instant messages be forwarded as text messages to the user's mobile telephone number when the user is offline—that is, not signed in to the instant messaging service.

The offline mobile proxy 1740 represents the online presence and/or availability of a user of the instant messaging system when the user is offline, thus enabling communications to offline users via alternative communication schemes (e.g., SMS text messaging), even if an instant messaging service is configured to restrict messaging to users who reflect online presence. The offline mobile proxy 1740 represents to the desktop instant messaging server 1730 that the user is capable of receiving an instant message when the user is actually offline. Accordingly, when the user is offline, their availability may be perceived by others and messages sent to them may be received using an alternative communications scheme (e.g., SMS text messaging). For instance, an offline user who has registered a mobile device (e.g., a cellular telephone) as available to receive messages while they are otherwise offline remains listed as available for messaging on the buddy lists of users who subscribe to their online presence. Moreover, an instant message intended for an offline user is received by the desktop instant messaging server 1730 and provided to the wireless server 1745, which communicates a text message based on the original instant message to the mobile telephone device 1770 associated with the offline user. The text message is communicated from the wireless server 1745 to the mobile telephone device 1770 thorough the cellular system 1780.

The offline mobile proxy 1740 includes code segments 1740A to manage online presence information. When the desktop instant messaging server 1730 detects that a user has logged off the instant messaging service, the desktop instant messaging server 1730 communicates the status of the user to the offline mobile proxy 1740, which executes code segment 1740A to indicate to the desktop instant messaging server 1730 that the user is online. In one implementation, the offline mobile proxy 1740 also executes code segment 1740A to update, or enable the update of, the screen name associated with a user to show a mobile indicator adjacent to the user's screen name on each of the buddy lists that include the user's screen name. The mobile indicator indicates that the user is available at their mobile device to receive messages inspired through manipulation of the buddy list in the ordinary manner, and also indicates that the user is not logged on to the desktop instant messaging service, as described more fully in FIGS. 18A-18D.

The offline mobile proxy 1740 also includes code segments 1740B that may be executed by the proxy 1740 to determine whether to forward an instant message sent to the mobile telephone device 1770 associated with the intended recipient of the original instant message. In one example, the proxy 1740 executing the code segments 1740B may determine whether a user is associated with a mobile telephone number (such as by accessing user-device registry 1735), and, if so, whether instant messages should be forwarded to the mobile telephone number conditionally based on a user state (e.g., offline) or request, or unconditionally (e.g., mirror to the mobile telephone). Accordingly, the proxy 1740 executing the code segments 1740B may determine to forward the instant message only when the user is offline or it instead may determine to forward the instant message only when the user has configured the user's account to forward instant messages. In yet another example, the proxy 1740 executing the code segments 1740B may determine that an instant message should be forwarded to a mobile device when the instant message is addressed to a mobile telephone number or addressed to a name that is assigned to a mobile telephone number. In any event, when the offline mobile proxy 1740 determines that an instant message is to be forwarded to a mobile device, the instant message is provided to the wireless server 1745.

The wireless server 1745 includes code segments 1745A configured to create message session entries for original instant messages and to store such message session entries in the message session information in a data store 1745B. The message session entry data store 1745B may be transient or persistent storage. The message session information may include a sender screen name, a recipient screen name, a temporary reply telephone number assigned by the wireless server 1745 to facilitate a reply to the text message sent to the mobile telephone device 1770, and a recipient mobile telephone number. The sender screen name and a recipient screen name are obtained from the original instant message received by the wireless server 1745. The temporary reply telephone number is assigned by the wireless server 1745 from a pool of temporary telephone numbers. The temporary reply telephone number may be in the form of a short code—that is, a number of lesser or greater digits than conventional telephone numbers, which nevertheless indicate a destination to the wireless server 1745. When the temporary reply telephone number is such a short code, the cellular system 1780 also may include a process for routing a text message that is sent to one of the short codes assigned by the wireless system 1745 to the provider system 1710. In contrast, the temporary reply telephone number may be a full-length traditional telephone number, or other routing code useful to enable the cellular system 1780 to route the text message to the provider system 1710.

The wireless server 1745 also includes code segments 1745C configured to prepare, based on an original instant message, a text message that is based on the short message service (SMS) protocol, which is particularly useful in sending and receiving short text messages to mobile devices, such as mobile telephones. The code segments 1745C include addressing operations, such as using the user-device register 1735 to identify the mobile telephone number of the recipient identified in the instant message and addressing the text message to the identified mobile telephone number, and using the temporary reply telephone number as the source address in the text message to which replies to the text message are routed in the form of text messages. The process 1745C also may include converting the instant message to a different character set that is used by the text message. For example, an instant message may use an ASCII character set or a Unicode character set, whereas the text message may use a GSM ("Global System for Mobile Communications") character set. In such a case, the process 1745C also converts the instant message from the ASCII or Unicode character set to the GSM character set.

Similarly, the wireless server 1745 also includes code segments 1745D configured to prepare an instant message that corresponds to a reply text message sent from the mobile telephone device 1770 in response to the text message based on the original instant message. The code segments 1745D may include code segments configured to convert the character set of the message from a character set used by the text message service to the character set used by the instant message service. The code segments 1745D also may include addressing operations, which include replacing the destination address of the reply text message with the instant messaging account name of the sender of the original instant message. This may be accomplished by accessing the message session entry created when the original instant message was forwarded as a text message to the mobile telephone device 1770. For example, the message session information may be identified through the use of the temporary reply telephone number assigned as the destination address of the reply text message. In particular, a message session entry may be identified in which the temporary reply telephone number of the entry corresponds to the destination address of the reply text message and the destination telephone number of the entry corresponds to the source address of the reply text message. Using both of the temporary reply telephone number and the destination telephone number collectively to identify the message session entry may be useful to enable the concurrent assignment of the same temporary telephone number for multiple text messages, which, in turn, may help to reduce the number of temporary telephone numbers needed by the wireless server 1745.

The code segments 1745D also are configured to determine a source address to use for the reply instant message. In particular, the code segments 1745D include addressing operations to determine a source address, and thus a sender identifier, to associate with the reply instant message for perception by a recipient of the reply instant message. The source address may be determined based on the recipient indicator identified by the sender in the original message such that the sender is only presented with identity information available to the sender at the time when the original message was sent. The following two examples illustrate. First, if an instant message initially specified a screen name as its destination address, replies to that forwarded instant message similarly specify the screen name as the reply source address, even if they originate from a mobile device as SMS text messages. Second and similarly, if a forwarded instant message initially specified a telephone number as its destination address, replies to that instant message similarly specify the telephone number as the reply source address. In addition or alternatively, the source address to be reflected for a reply message may be determined, at least in part, based on information other than the destination address of the original instant message specified by the reply recipient, which is determined as available to the reply recipient, for example, through an inspection of their address book or buddy list. As such, the actual source of the reply (e.g., mobile telephone number or screen name) may not be hidden from users who otherwise are aware of such information. In fact, it may be advantageous to reveal the actual reply source in addition to the destination address specified by the reply recipient in their original message, so as to reveal information about the reply source while providing the reply recipient some continuity and understanding of the nature of the message as a reply to their original message. For example, the instant message interface may reveal an indication formatted as follows: "<screen name specified by reply recipient in their original message> (mobile telephone number actually used to generate response) <mobile telephone number>:" or "screen name (sent by 555-1212):". The process of determining a source address to use as the displayed sender indication of an instant message display for the reply instant message is described more fully later.

The mobile telephone device 1770 is associated with a mobile telephone number to which telephone calls may be routed over the cellular system 1780. The mobile telephone device 1770 also may be associated with a SMS address that typically is the same as the mobile telephone number associated with the mobile telephone device 1770, though this need not necessarily be so. The mobile telephone device 1770 is capable of receiving, displaying, processing, and sending text messages over the cellular system 1780.

The cellular system 1780 may include a cellular network that is capable of transmitting and receiving digital or analog signals using cellular technologies, including Advanced Mobile Telephone System (AMPS), Narrowband Advanced Mobile Telephone Service (NAMPS), Frequency Shift Keying (FSK), Frequency Division Multiple Access (FDMA), Time Division Multiple Access (TDMA), and Code Division Multiple Access (CDMA), or any standard, such as Global System for Mobile Communications (GSM) or Cellular Digital Packet Data (CDPD). Alternatively, the cellular system 1780 may be any type of telephone network capable of transmitting text messages to any type of telephone or mobile device.

In general, the communications system 1700A may be used to send an instant message sent from the client system 1705 to the provider system 1710, which transforms the instant message to a corresponding text message that is routed over the cellular system 1780 to the mobile telephone device 1770. The original instant message may be addressed to mobile telephone number of the mobile telephone device 1770, or the original instant message may be addressed to a screen name and forwarded to the mobile telephone device 1770 based on an association, in the user-device registry 1735, between the screen name and the mobile device, and detection of offline status by the mobile device user. Also, the original instant message may be addressed to a screen name that is linked to another screen name, which, in turn, is associated with the mobile telephone number of the mobile telephone device 1770.

The user of the mobile telephone device 1770 may reply, or respond, to the received text message. The reply text message is sent over the cellular system 1780 to the provider system 1710. The provider system 1710 transforms the reply text message to a reply instant message that is presented to the sender of the original instant message. The sender indication displayed for the reply instant message is the same as the recipient indication selected by the sender for the original instant message. Thus, the only addressing or account information revealed to the sender of the original instant message is the information available to the sender of the original instant message. In some cases, the source of a reply message, such as the reply text message or the reply instant message, is disguised, hidden or obfuscated so that the addressing or account information unknown to the sender is not revealed to the sender.

Figure 18A:
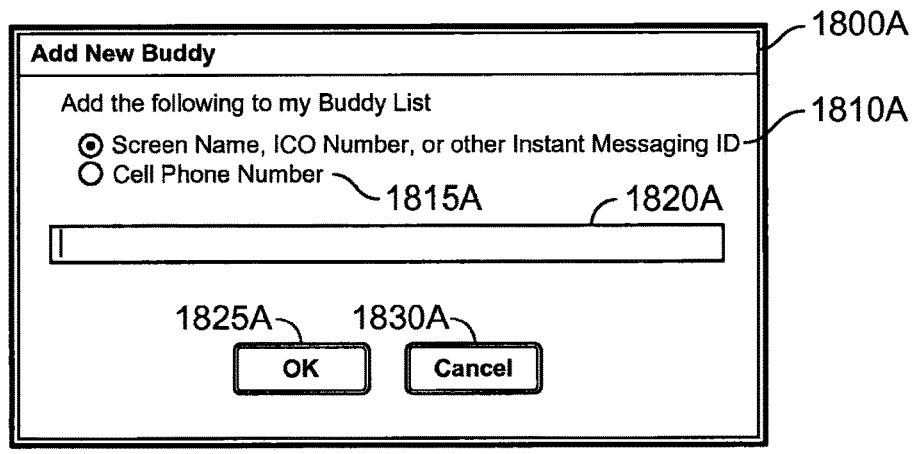
FIGS. 18A-18D are illustrations of exemplary interfaces for managing and showing buddy lists for mobile telephone identities.
Figure 18B:
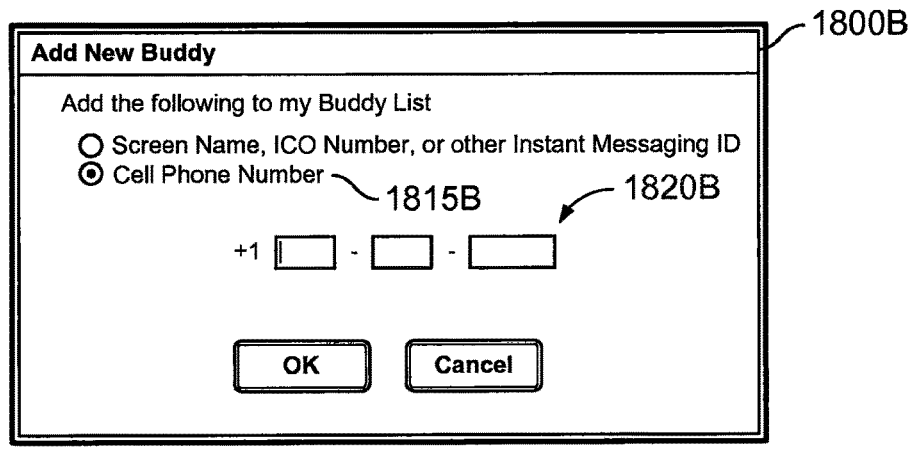
Figure 18C:
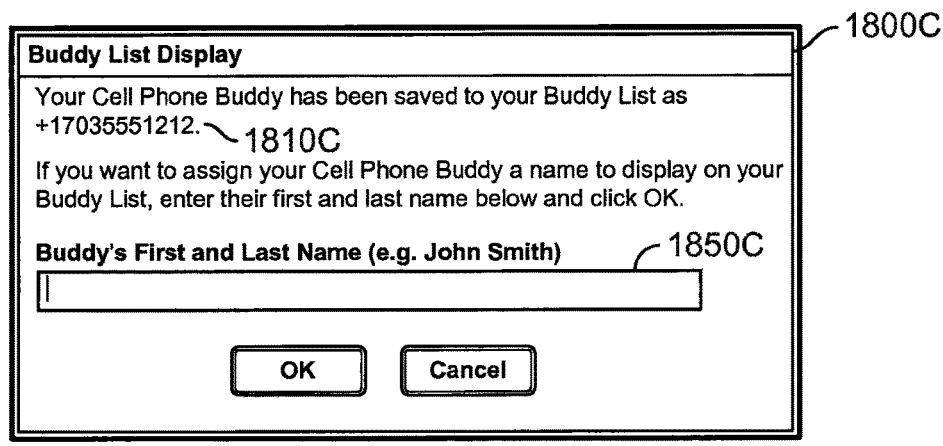

Referring to FIGS. 18A-18C, interfaces 1800A-1800C are displayed for configuring a buddy list associated with user of a communications system. The interfaces 1800A-1800C may be displayed, for example, when a process to add a new buddy to a buddy list is initiated by a user and executed by a processor. More particularly, FIG. 18A displays an interface 1800A for adding a new entity as a buddy on a user's buddy list. The interface 1800A includes an option 1810A to add an entity identified by a screen name, an ICQ number or some other type of instant messaging identifier, and an option 1810B to add an entity identified by a mobile telephone number to the buddy list associated with the user. An entity identified by a instant message identifier may be referred to as an instant message entity or a potential message recipient. An entity identified by a mobile telephone number may be referred to as a mobile telephone entity, a mobile telephone buddy, a cell phone buddy, or a potential message recipient. Each of the options 1810A and 1810B is selectable by the user using selection indications associated with the option 1810A or 1810B, respectively, to identify the type of entity (e.g., a mobile telephone entity or an instant messaging entity) to be added as a buddy to the buddy list. When the user selects to save the entry and thus add an instant messaging entity to the user's buddy list, the interface 1800A includes an entry portion 1820A to which the user may identify the instant messaging identifier of the entity. The interface 1800A also includes a control 1825A to add the entity entered in the entry portion 1820A to the user's buddy list and to close the interface 1800A. The interface 1800A also includes a control 1830B to cancel and thus close the interface 1825A without adding an entity to the buddy list.

FIG. 18B displays an interface 1800B for adding a new entity identified by a mobile telephone number as a buddy. As shown, when the user selects to add a cell phone number to the user's buddy list by selecting the cell phone number option 1815B, the interface 1800A includes an entry portion 1820B to which the user may enter the cell phone number to be added to the user's buddy list. The entry portion 1820B is partitioned into separate sections that correspond to parts of a telephone number, though the entry portion 1820B need not necessarily be partitioned. In some implementations, the same entry portion may be used to enter an instant message entity and a mobile telephone number entity.

FIG. 18C displays an interface 1800C that presents a message 1810C to the user, indicating that the mobile telephone number has been saved as a buddy on the user's buddy list. The interface 1800C also presents an name entry portion 1850C configured to accept user input of text to be assigned as a name to be displayed in the buddy list for the mobile telephone number entered in interface 1800B. It is important to note that the name displayed for the mobile telephone number is not linked to or otherwise associated with a screen name for a user. Thus, the entry of a mobile telephone number on a user's buddy list may help to enable an instant message user to send an instant message to an entity that is not otherwise configured to use instant messaging services wherein the processor is further configured to use instant messaging services other than those used by the sending instant message user, which may or may not be compatible/integrated with the instant message services used by the sending instant message user. Moreover, entry of this mobile information enables instant message communications with users whose screen names are unknown to the sender, even if they subscribe to a common and/or compatible/integrated instant message service.

Figure 18D:
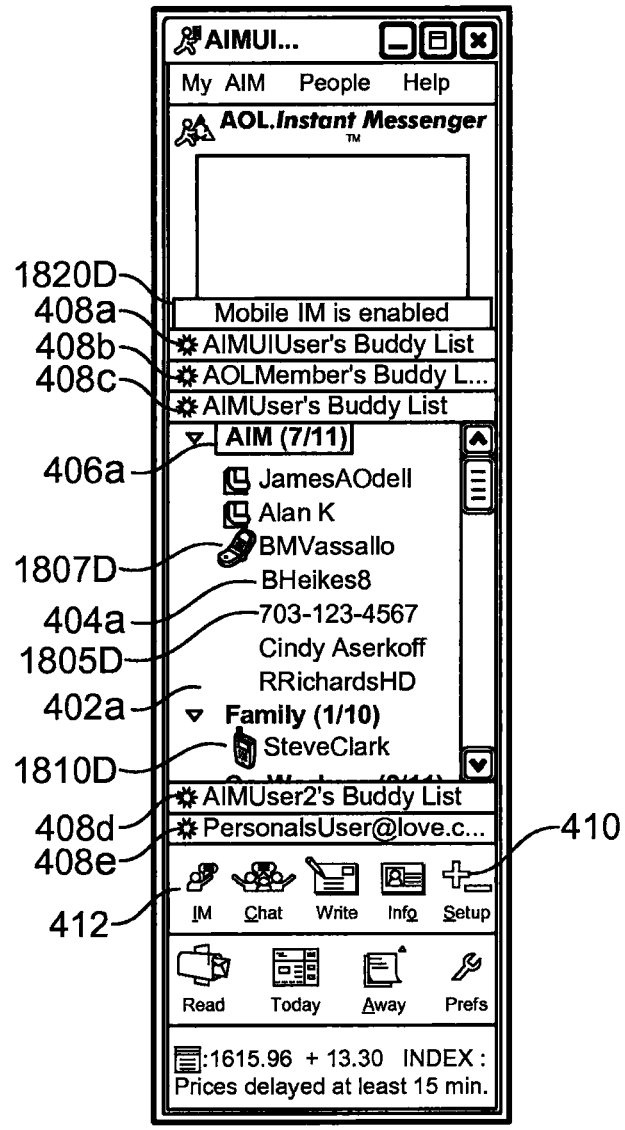

Referring to FIG. 18D, a buddy list interface 1800D is displayed for a user of a communication system capable of sending instant messages to a mobile telephone number that is not associated with a user of the instant messaging service. The buddy list interface 1800D may be an implementation of the buddy list interface 400a of FIG. 4 or 11. The buddy list interface 1800D includes a buddy list 402a for an entity having screen name AIMUIUser. The buddy list 402a includes a mobile telephone entity 1805D for which the mobile telephone number is displayed as the entity identifier. The buddy list 402a also includes a mobile indicator 1807D that reflects a mobile telephone number as the only known means for contacting the entity associated with the name (here, BMVassallo) adjacent to the mobile indicator 1807D. Thus, BMVassallo is an alias for a mobile telephone number that is not associated with an instant message account or screen name.

The buddy list 402a also includes a mobile indicator 1810D. The buddy list 402a also includes an indicator 1810D adjacent to an instant message entity listed on the buddy list 402a positioned to reflect that the user account for Steve Clark is configured to send instant messages sent by the Steve Clark entity to a mobile telephone number associated with the instant message account of the Steve Clark because the Steve Clark entity is offline.

In one implementation, the indicator 1820D shows that the user account for the AIMUIUser is configured to send instant messages sent by the AIMUIUser entity to a mobile telephone number associated with the instant message account of the AIMUIUser when the AIMUIUser entity is offline. In particular, the indicator 1810D indicates that "Mobile IM is enabled" for the AIMUIUser entity. This may be useful to remind the user that the user's account is configured to forward instant messages to a mobile telephone when the user is offline. In another implementation, the indicator 1820D may be used to reflect whether an instant message account for an entity included in the buddy list 402a is configured to send instant message sent to the entity to a mobile telephone number associated with the instant message account for the buddy. Thus, the indicator 1820D may be used to reflect the instant message mobile forwarding capability associated with a buddy when the buddy is selected on the buddy list 402a. In this other implementation, the indicator 1820D would not appear in the interface 1800D when a buddy is selected on the buddy list 402a who has not enabled a mobile forwarding capability for the selected buddy's instant message account.

Figure 19:
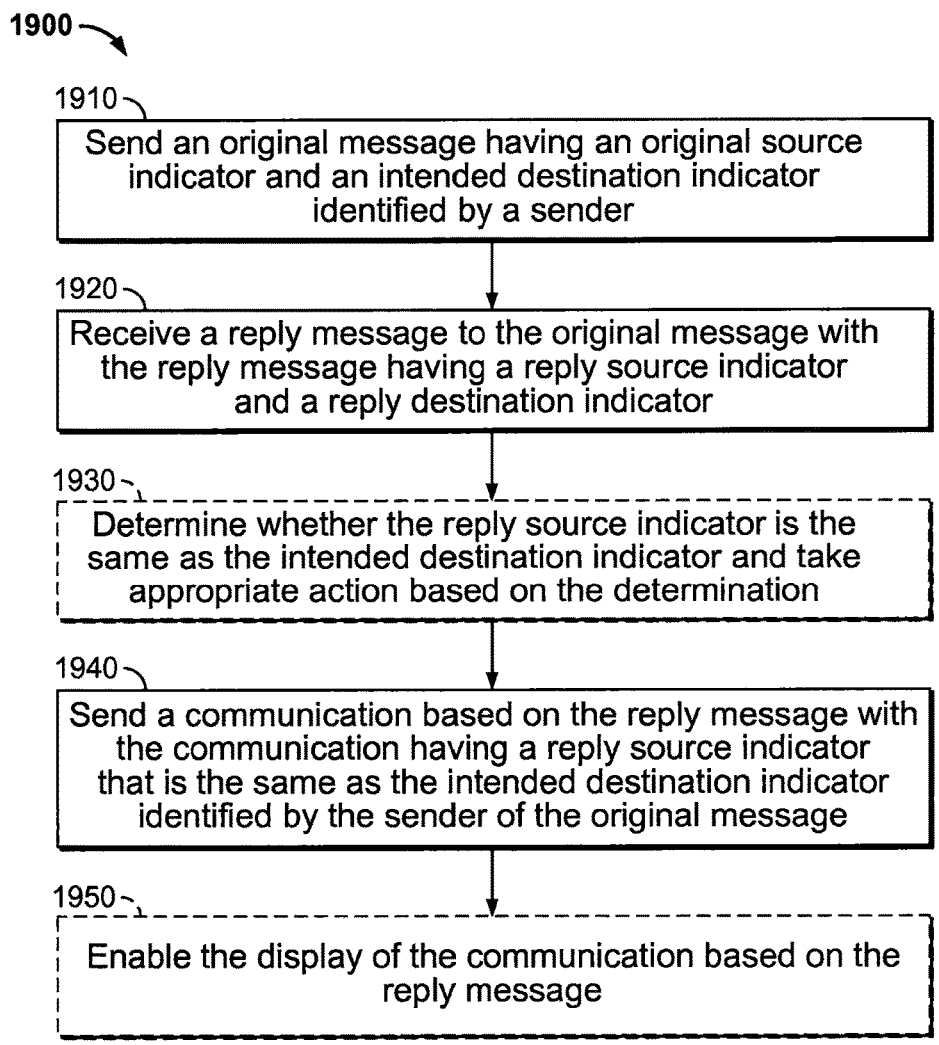
FIGS. 19 and 21A-21D are diagrams for processes for communicating between a client system and a mobile telephone.

FIG. 19 illustrates a process 1900 for communicating between two electronic devices, such as a client system of an instant messaging service and a mobile telephone device capable of receiving, processing, displaying and transmitting text-messages. The process 1900 may be performed, for example, by a processor on the provider system 1710 of FIG. 17.

The process 1900 begins when a user creates an original message that includes an source indicator and an intended destination indicator and the original message is received by the provider system (step 1910). The user, who may be referred to as a sender, may do so using an instant messaging application to identify a buddy from within their buddy list as the intended destination indicator. Accordingly, the intended destination indicator may be, for example, a screen name or a mobile telephone number of an entity listed on the sender's buddy list. Alternatively, the original message may be a text message created by the sender using an mobile telephone device configured for text messaging, as described later.

Subsequently, the provider system receives a reply message from the intended recipient of the original message (step 1920). The reply message includes a reply source indicator that indicates an address from which the reply was sent and a reply destination indicator that indicates an address to which the reply is destined. For example, the reply message may be a text message sent by the mobile telephone device to which the original message was delivered.

The provider system optionally determines whether the reply source indicator of the reply message is the same as the intended destination indicator and takes appropriate action based on that determination (step 1930). To do so, for example, the provider system may access a message session entry that corresponds to the communication and compare the reply source indicator with the destination indicator of the original message received (step 1910). When the reply source indicator is different from the destination indicator, the provider system may replace the reply source indicator in the reply message with the destination indicator of the original message; otherwise, the provider system need not necessarily take any action.

The provider system sends a communication based on the reply message with the communication having a reply source indicator that is the same as the intended destination indicator identified by the sender of the original message (step 1940). For example, the provider system may create an instant message based on a text message sent by from the mobile telephone device. The instant message is sent to the destination indicated in the received reply message or a destination that corresponds to the destination indicated in the received reply message, as described later with respect to FIGS. 21-23.

In some implementations, the provider system may replace the reply source indicator with the destination indicator of the original message without first determining whether such action is needed as described previously with respect to step 1930. However, when the reply source indicator is the same as the destination indicator, the provider system may be replacing the reply source indicator unnecessarily. In some instances, it may be more efficient for the provider system to do so in lieu of determining whether such action is necessary.

The provider system optionally enables the display of the communication based on the reply message (step 1950). This may be accomplished, for example, by the provider system sending an instant message to the client system for display by the instant messaging application on the client system.

Figure 20:
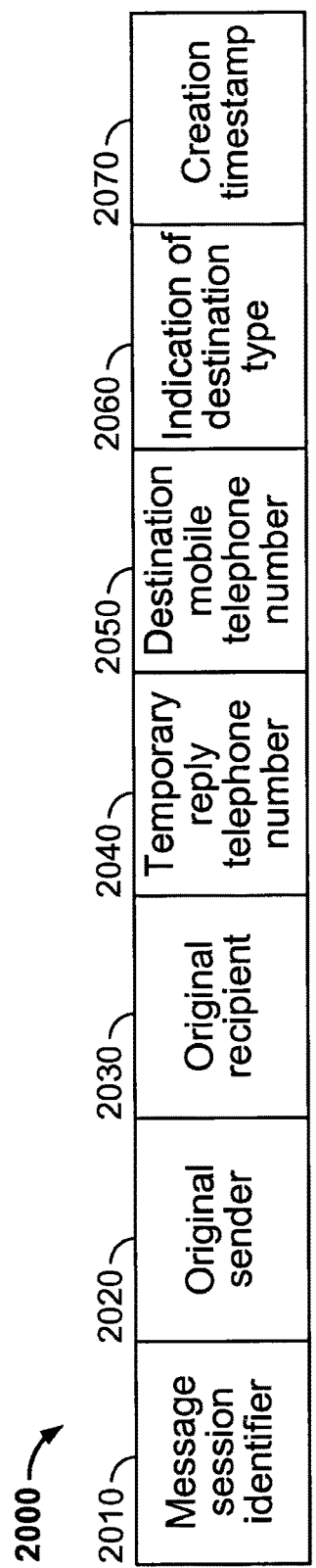
FIG. 20 is a diagram of an exemplary data structure for message session information.
Figure 21A:
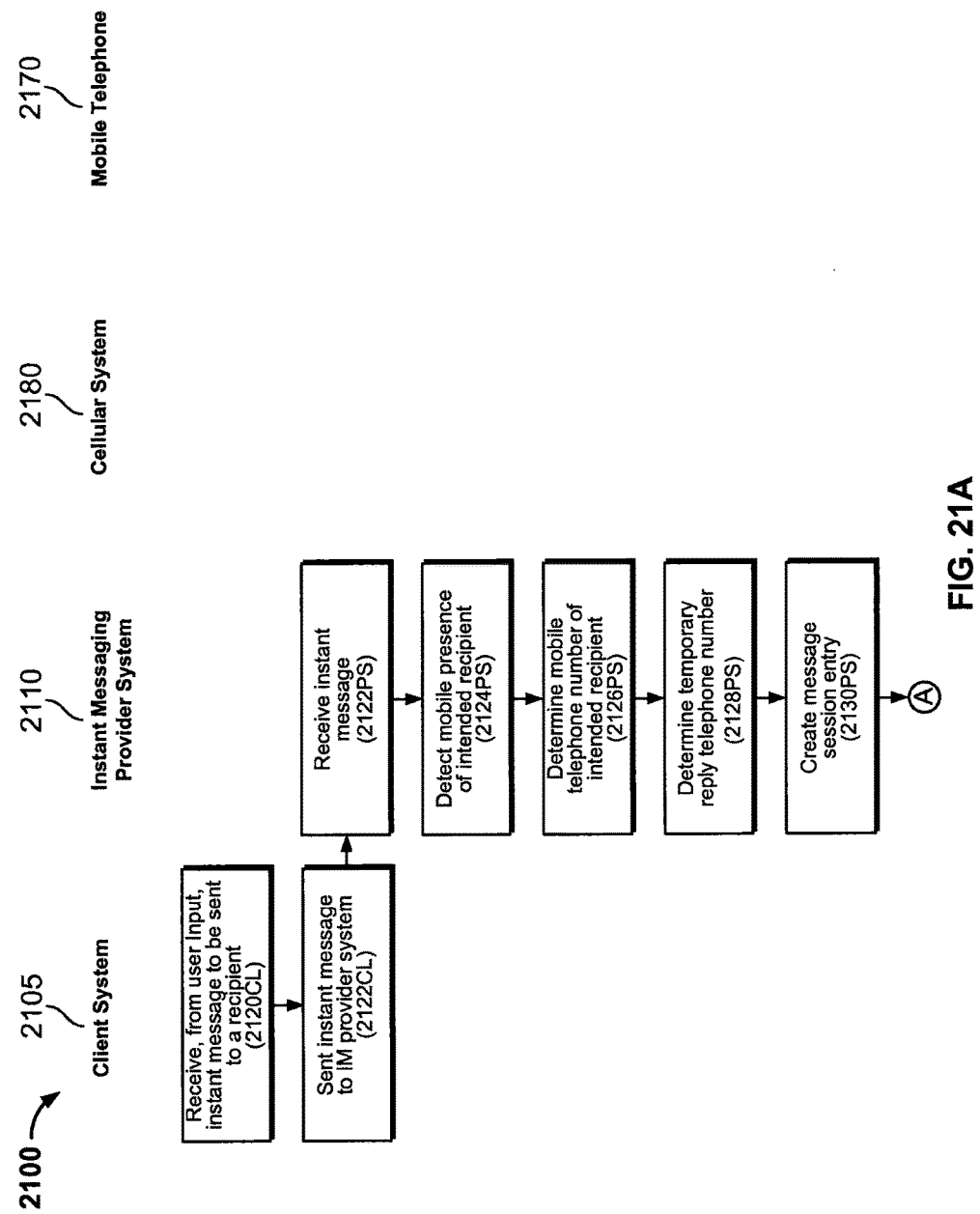
Figure 21B:
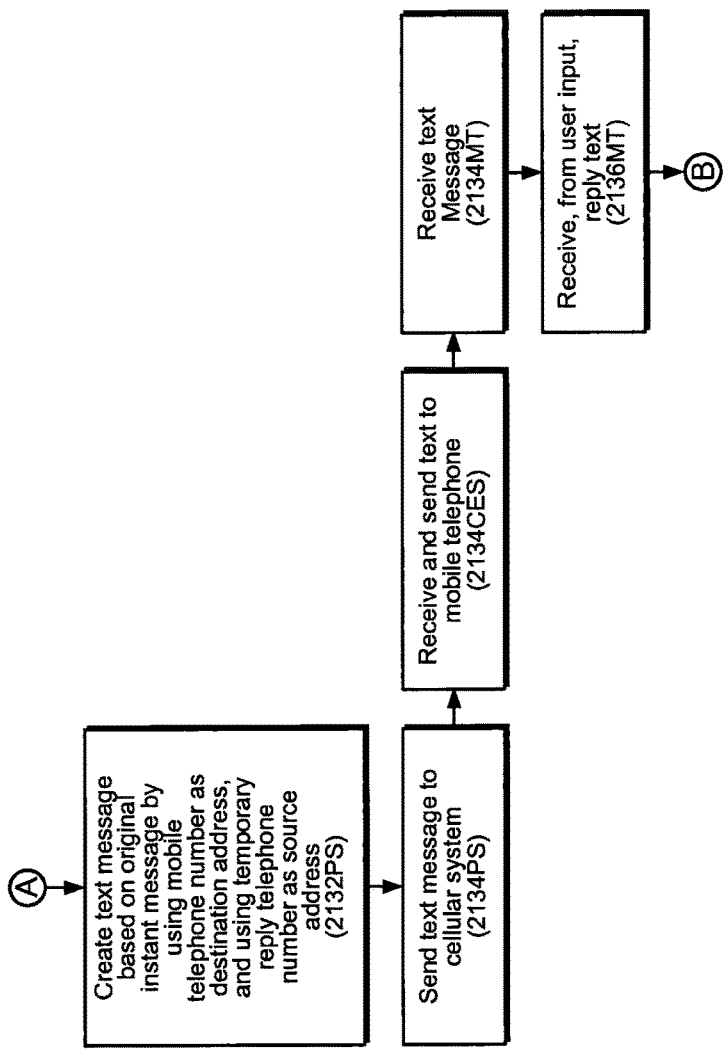
Figure 21C:
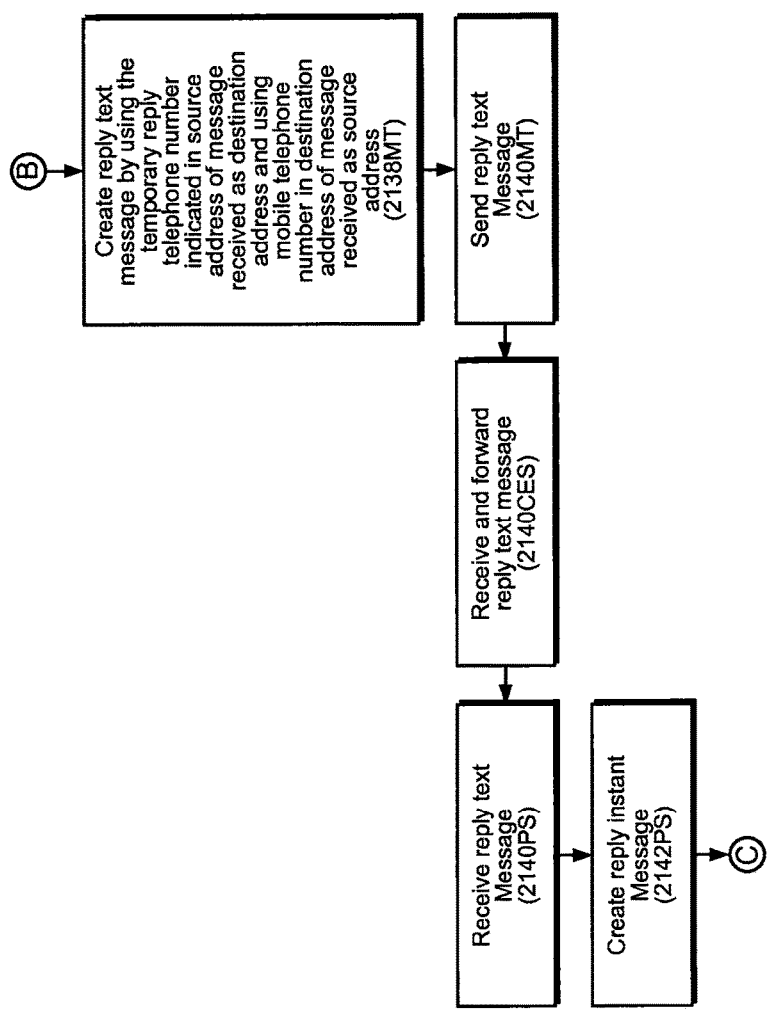
Figure 21D:
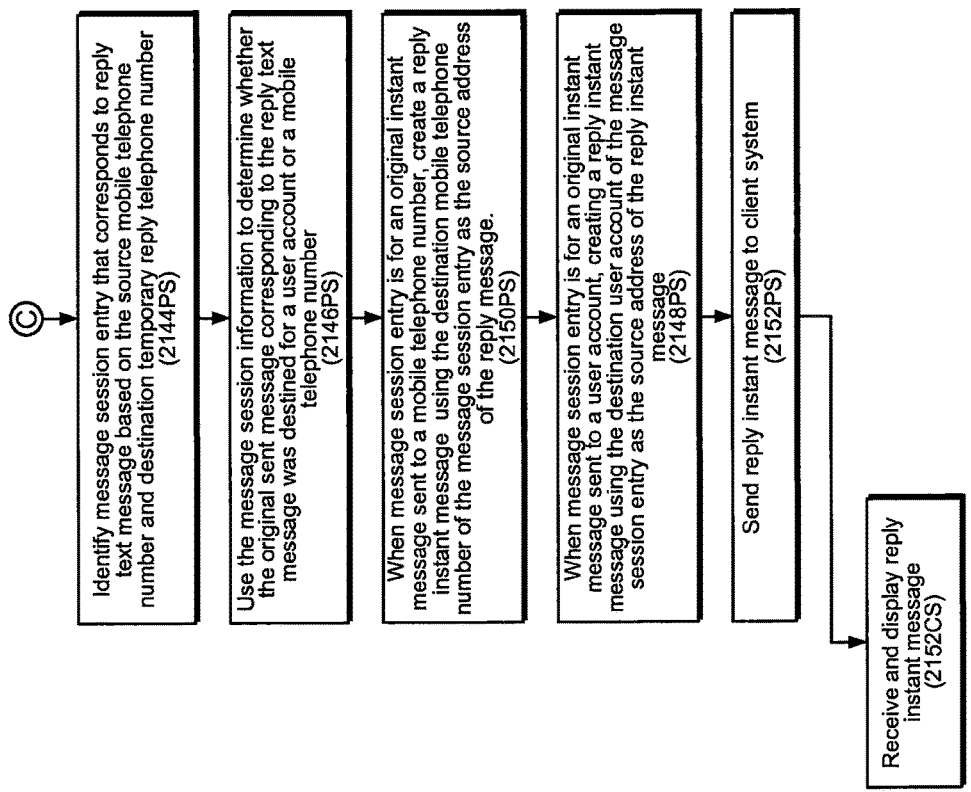

Before discussing additional detail regarding the method by which an instant message is communicated to a mobile telephone enabled with text messaging, an example format that may be used for a message session information entry is first described in FIG. 20. FIG. 20 shows an example data structure 2000 for a message session information entry in simplified form. The data structure 2000 includes a message session identifier 2010 to uniquely identify each entry in the message session information. The data structure 2000 also includes an original sender 2020 that identifies an original source indicator of the original instant message sent by the sender, and an original recipient 2030 that identifies an intended destination indicator for the original instant message.

The data structure 2000 also includes a temporary reply telephone number 2040 that may be used as a source indicator in text messages sent to a mobile telephone device based on an instant message directed to recipient 2030. The temporary reply telephone number 2040 also may be used as a destination indicator for a reply text message sent from the mobile telephone device in response to text messages sent to the mobile telephone device based on the original instant message.

The data structure 2000 also includes a destination mobile telephone number 2050 that identifies the destination mobile telephone device of a text message sent to the mobile telephone device based on the original instant message. The destination mobile telephone number 2050 may be used as a destination indicator in a text message sent to a mobile telephone device based on a mobile telephone number that is associated with the recipient 2030 of the original instant message. Alternatively, the destination mobile telephone number 2050 may correspond to the mobile telephone number specified in the buddy list entry or input by command line entry, for example, when the original instant message is directed to a mobile telephone identity such as mobile telephone identity 1805D of FIG. 18 or sent using a dialog box or command line entry to specify a mobile telephone number as the destination address for a message initiated via instant messaging.

The data structure 2000 also may include an indication 2060 of a destination type of original instant message—e.g., whether the message is directed to an instant message account entity (such as a screen name) or a mobile telephone entity. The indication 2060 also may be referred to as a destination flag. An indication of the type of original destination may be discerned from information other than the indication 2060, enabling confirmation or elimination of indication 2060. For example, some implementations may include a destination mobile telephone number 2050 only when the recipient 2030 is an instant message entity and the recipient account is associated with a mobile telephone number to which instant messages are to be sent as text messages. In such a case, a determination of the type of entity that is associated with the destination of the original instant message may be based on whether the destination mobile telephone number 2050 is filled in for the entry. Stated differently, some implementations may fill in the destination mobile telephone number 2050 only when the recipient 2030 is an instant message entity (and is not a mobile telephone entity); otherwise, the destination mobile telephone number 2050 is not filled in (when the recipient 2030 is a mobile telephone entity).

The data structure 2000 also may include a creation timestamp 2070 or other indication of when the message session entry was created, the age of the entry, or a time when the entry is to expire. The creation timestamp 2070 may be useful to guide the deletion, expiration, or purging of aging message session entries in message session information.

FIG. 21 shows a process 2100 by which a client system communicates an instant message through an instant messaging provider system to a mobile telephone that is enabled with text messaging capabilities and a reply to the instant message is returned to the client system. The process 2100 involves a client system 2105, an instant messaging provider system 2110, a cellular system 2180, and a mobile telephone 2170 enabled with text messaging capabilities. In general, the process 2100 enables an instant message sent by the client system 2105 to be received and processed by the instant messaging provider system 2180, which, in turn, sends a text message based on the instant message to the mobile telephone 2170 over the cellular system 2180. A user associated with the mobile telephone 2170 replies to the text message received by the mobile telephone 2170. The reply text message is sent from the mobile telephone 2170 over the cellular system 2180 to the instant messaging provider system 2180. The instant messaging provider system 2180 sends to the client system 2105 a reply instant message based on the reply text message received from the mobile telephone 2170. The reply instant message includes the intended destination of the original instant message as the source indicator of the reply instant message. Thus, the source indicator of the reply instant message prevents disclosure of any information that was not previously available to, and used by, the sender of the original instant message. This may be useful, for example, to protect a mobile telephone number associated with the intended recipient of the original instant message from being revealed to the sender of an instant message when the instant message is forwarded to the recipient's mobile telephone number by the instant messaging provider system 2180.

More particularly, a user associated with the client system 2105 identifies an intended recipient of the instant message by selecting an entity from the user's buddy list and enters text for the instant message, which is received by the client system 2105 (step 2120CL). The instant message, as described previously, includes a source indicator of the instant message that indicates that the instant message is sent from the sender's instant message account. This may be accomplished by identifying the sender's screen name as the source indicator. The instant message also includes a destination indicator that identifies the entity selected from the user's buddy list. The selected entity may be a mobile telephone entity for which a mobile telephone number, rather than an instant message user account, is identified as the destination address of the instant message. Alternatively, the selected entity may be an instant message entity for which a user account of the instant message service is identified as the destination address of the instant message. The client system 2105 sends the instant message, which may be referred to as an original instant message, to the instant messaging provider system 2180 (step 2122CL).

The instant messaging provider system 2180 receives the instant message (step 2122PS) and detects the mobile presence of the intended recipient of the instant message (step 2124PS). Detecting mobile presence may include determining whether the instant message needs to be routed as a text message to a mobile telephone, and determining whether the original instant message is addressed to a mobile telephone entity (e.g., a mobile telephone entity was selected by the sender of the original instant message), which implies the need to route the original instant message as a text message to the mobile telephone. When the original instant message is addressed to an instant message entity (e.g., a screen name), the mobile presence of the intended recipient may be detected based on the offline status of the instant message entity that has configured the user's instant message account to forward instant messages to a mobile telephone number. In some implementations, the detection of mobile presence of the intended recipient may be determined merely by querying on-line presence information to determine whether the user account is associated with a mobile indicator, as previously described.

In response to detecting the mobile presence of the intended recipient (step 2124PS), the instant messaging provider system 2180 determines a mobile telephone number of the intended recipient (step 2126PS). This may be accomplished, for example, by accessing a user-device registry, such as user-device registry 1735 of FIG. 17, that associates a mobile telephone number with a user account when an instant message entity is the intended recipient of the original instant message. In contrast, when a mobile telephone entity is the intended recipient of the original instant message, the mobile telephone number of the entity may be determined directly from the entity.

The instant messaging provider system 2180 also determines a temporary reply telephone number for the text message (step 2128PS), as described previously.

The instant messaging provider system 2180 creates an entry of message session information that corresponds to the original instant message (step 2130PS). Using the data structure 2000 as an example, a message session identifier 2010 may be assigned to uniquely identify the message session entry, the sender indication of the original instant message may be stored as the original sender 2020, the intended destination may be stored as the original recipient 2030, the temporary reply telephone number is stored as the temporary reply telephone number 2040, and the determined mobile telephone number may be stored as the destination mobile telephone number 2050 in the message session entry. Thus in this example, when the intended recipient of the original instant message is a mobile telephone entity, the original recipient 2030 and the destination mobile telephone number 2050 both reflect same mobile telephone number. When the intended recipient of the original instant message is an instant message entity, the original recipient 2030 is the screen name of the intended recipient and the destination mobile telephone number 2050 is the mobile telephone number to which the user associated with the screen name desires instant messages to be forwarded. The indication 2060 of the destination type also is set to indicate that a screen name was identified as the recipient by the sender of the original instant message when the intended recipient of the original instant message is an instant message entity. In contrast, when the intended recipient of the original instant message is a mobile telephone entity, the indication 2060 is set to indicate a mobile telephone number was identified as the recipient by the sender of the original instant message.

The instant messaging provider system 2180 creates a text message based on the instant message using the determined mobile telephone number as the destination address and using the temporary reply telephone number as the source address (step 2132PS). The instant messaging provider system 2180 then sends the text message to the cellular system 2180 (step 2134PS), which, in turn, receives and sends the text message to the mobile telephone 2170 (step 2134CES).

The mobile telephone 2170 receives the text message and enables a user of the mobile telephone 2170 to review and respond to the text message (step 2134MT). The mobile telephone 2170 receives, from user input, reply text (step 2136MT) and creates a reply text message using the reply text as the message text, using the mobile telephone number as the reply source address and using the temporary reply telephone number as the reply destination address (step 2138MT). As is conventional, the reply text message uses the source address of the text message (here, the mobile telephone number of the mobile telephone 2170) as the destination address of the reply text message. The reply text message uses the destination address of the text message (here, the temporary reply telephone number) as the source address of the reply text message. The mobile telephone 2170 then sends the reply text message to the cellular system 2180 (step 2140MT), which, in turn, receives and forwards the reply text message to the instant messaging provider system 2180 (step 2140CES). For example, the cellular system 2180 may determine that the reply text message is to be forwarded to the instant messaging provider system 2180 based on the temporary reply telephone number in the reply text message.

The instant messaging provider system 2180 receives the reply text message (step 2140PS) and creates a reply instant message based on the reply text message by using the message text as the message text of the instant message (step 2142PS). The instant messaging provider system identifies an entry in the message session information that corresponds to the original instant message that inspired the reply text message (step 2144PS). The entry is identified based on the mobile telephone number in the source address of the reply text message and the temporary reply telephone number in the destination address of the reply text message (step 2144PS). This may be accomplished, for example, by searching message session information for an entry that has a temporary reply telephone number 2040 that corresponds to the destination address of the reply text message and a destination mobile telephone number 2050 that corresponds to the source address of the reply text message.

The instant messaging provider system 2180 then uses the message session entry to determine whether the destination of the original instant message was identified by the sender as an instant message account or a mobile telephone number (step 2146PS). To do so, the instant messaging provider system 2180 may access the indication 2060 of the destination in the message session entry or, alternatively, the instant messaging provider system 2180 may access the destination mobile telephone number 2040 of the message session entry, as described previously.

When the original instant message was directed by the sender to an instant message entity, the instant messaging provider system 2180 uses the recipient 2030 of the message session entry as the source address of the reply instant message that corresponds to the reply text message (step 2148PS). In contrast, when the original instant message was directed by the sender to a mobile telephone entity, the instant messaging provider system 2180 uses the destination mobile telephone number 2050 of the message session entry as the source address of the reply instant message that corresponds to the reply text message (step 2150PS). In this case, when the text message was not forwarded by the cellular system to a different mobile telephone number (as may occur, for example, if the mobile telephone 2170 had enabled call forwarding to forward the text message to another mobile telephone number), the destination mobile telephone number 2050 is the same as the source address of the reply text message received by the instant messaging provider system 2180.

In some implementations, in lieu of steps 2144PS-2148PS being performed, the instant messaging provider system 2180 uses the original recipient 2030 as the source address of the reply text message received by the instant messaging provider system 2180. Thus, when the original recipient is a mobile telephone entity, the source address indicates the mobile telephone of the mobile telephone entity. When the original recipient is an instant message entity, the source address indicates the screen name of the instant message entity and does not indicate the mobile telephone number to which the instant message was forwarded.

The instant messaging provider system 2180 then sends the reply instant message to the client system (step 2152PS). The client system, in turn, receives and displays the reply instant message for the sender of the original instant message (step 2152CS).

Figure 22:
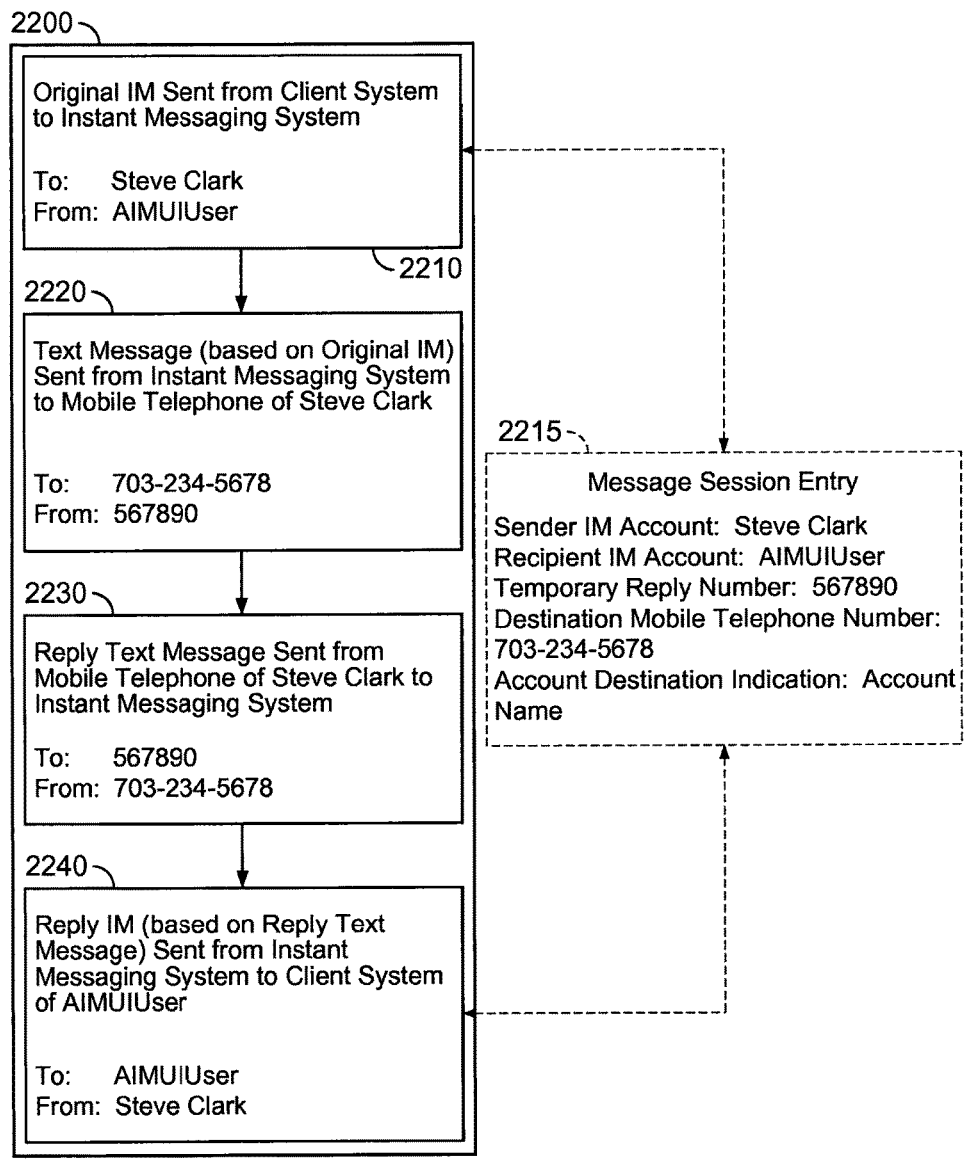
FIGS. 22 and 23 are illustrations of exemplary messages that may be sent between a client system and a mobile telephone.
Figure 23:
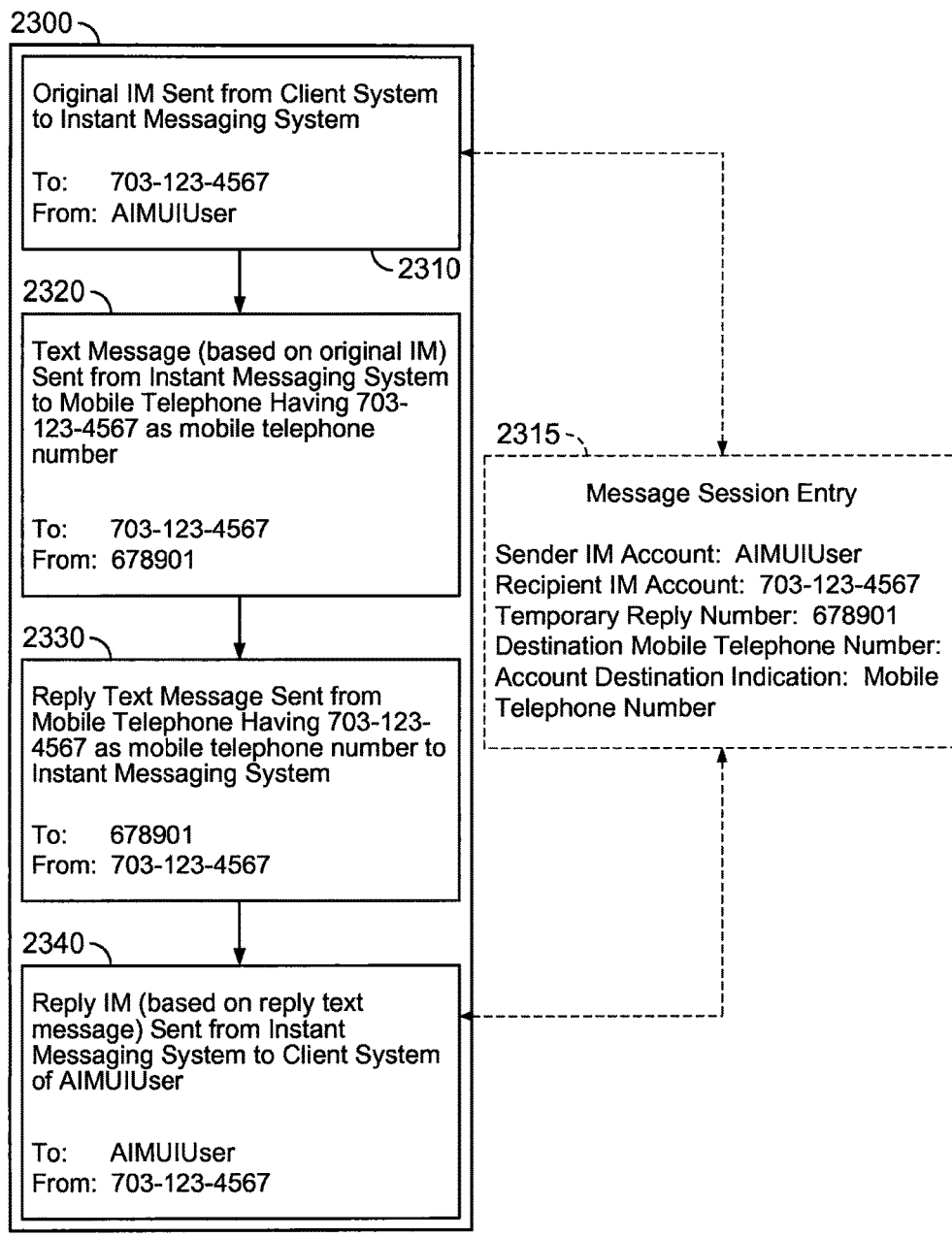

FIGS. 22 and 23 illustrate exemplary messages that may be sent, for example, using the process 2100 of FIG. 21. FIG. 22 shows a flow 2200 of exemplary messages inspired by an instant message sent from a client system and directed to an instant message account (e.g., screen name). A message session entry 2215 having message session information is created as part of the process during which the messages are created and processed. The entry 2215 is not part of the message flow 2200 but is used to create and process messages in the flow 2200.

The flow 2200 of exemplary messages includes a message 2210 that represents an original instant message sent by a sender from an instant message client system to an instant messaging provider system. The original instant message 2210 is directed to a screen name that corresponds to an instant message account for which mobile instant message forwarding is enabled. In particular, the screen name to which the original instant message is directed is "Steve Clark," which may correspond to the buddy 1810D in the buddy list 1800D of FIG. 18D. The screen name of the sender (here, AIMUIUser) is identified as the source indicator of the original instant message 2210.

The flow 2200 also includes a message 2220 that represents a text message (e.g., an SMS text message) generated based on the original instant message 2210. The text message 2220 (which also may be referred to as an original text message) is created by the instant messaging provider system based on the original instant message using the message session entry 2215. The text message 2220 is sent to the cellular system for routing to the mobile telephone associated with the intended recipient (here, Steve Clark). The text message 2220 identifies the mobile telephone number associated with Steve Clark as the destination address and identifies a temporary reply telephone number (described earlier) as the source address. As illustrated, the temporary reply telephone number is a short code that indicates to the cellular system that the messages so identified are to be routed to the instant messaging provider system.

The flow 2200 also includes a message 2230 that represents a reply text message that may be sent from the mobile telephone of Steve Clark to the instant messaging provider system. The reply text message 2230 is created by the mobile telephone in response to user input. The reply text message 2230 identifies the mobile telephone number associated with Steve Clark as the source address and identifies a temporary reply telephone number as the destination address. It is sent from the mobile telephone to the cellular system, which forwards the reply text message to the instant messaging provider system based on the destination address in the reply text message.

The flow 2200 also includes a message 2240 that represents a reply instant message generated based on the reply text message. The reply instant message 2240 is created by the instant messaging provider system with the use of message session entry 2215. The instant messaging provider system identifies the message session entry 2215 based on the destination address and source address of the reply text message. The reply instant message 2210 identifies the recipient of the reply instant message as the sender instant message account (here, "AIMUIUser"). Moreover, because the original instant message 2210 identified the intended recipient using a screen name (here, "Steve Clark"), the reply instant message 2240 identifies the sender of the reply instant message also using the same screen name (here, "Steve Clark"). As illustrated by the flow 2200, the mobile telephone number to which the instant message is forwarded (and from which the reply text message is generated) is hidden from the sender of the original instant message.

In contrast to FIG. 22, FIG. 23 shows a flow 2300 of exemplary messages exchanged in the process 2100 that are inspired by an instant message sent from a client system and directed to a mobile telephone number (e.g., a mobile telephone buddy), and an entry 2315 of message session information that corresponds to a message session entry created as part of the process 2100. The original instant message 2310 is directed to a mobile telephone number. In particular, the mobile telephone number entity to which the original instant message is directed is "703-123-4567," which may correspond to the buddy 1805D in the buddy list 1800D of FIG. 18D. The screen name of the sender (here, AIMUIUser) is identified as the source indicator of the original instant message 2310, as was the source indicator of the original instant message 2210 in FIG. 22.

The flow 2300 also includes an original text message 2230 that is based on the original instant message 2310. The original text message 2230 is created by the instant messaging provider system based on the original instant message using the message session entry 2315. The original text message 2230 also identifies the mobile telephone number identified as the recipient account name in the message session entry 2315 to which the original instant message was sent as the destination address and identifies a temporary reply telephone number as the source address. The original text message 2230 is sent to the cellular system for routing to the mobile telephone number identified as the destination address (here, "703-123-4567").

The flow 2300 also includes a message 2330 that represents a reply text message that is sent from the mobile telephone associated with the mobile telephone number 703-123-4567 to the instant messaging provider system. The reply text message 2230 identifies the mobile telephone number of 703-123-4567 as the source address and identifies the temporary reply telephone number as the destination address.

The flow 2300 also includes a reply instant message 2340 that is based on the reply text message 2330. The reply instant message 2340 is created by the instant messaging provider system with the use of message session entry 2315. The instant messaging provider system identifies the message session entry 2315 based on the destination address and source address of the reply text message. Because the original instant message 2310 identified the intended recipient as a mobile telephone number (here, "703-123-4567"), the reply instant message 2340 identifies the recipient of the reply instant message also a mobile telephone number (here, "703-123-4567"). The reply instant message 2340 identifies the recipient of the reply instant message as the sender instant message account (here, "AIMUIUser"). As illustrated by the flow 2300, the mobile telephone number to which the original instant message is directed is the same as the source indicator of the reply instant message. Thus, in this example, the identifiers not used by the original sender are obfuscated.

The techniques and concepts described with respect to forwarding an instant message directed to a screen name to a mobile telephone without revealing the mobile telephone number to which the instant message was forwarded may be used when the source indicator of an instant message or a destination indicator of an instant message is based on a linked account. Alternatively or additionally, whether the mobile telephone number to which an instant message has been forwarded is revealed in a reply message may be controlled based on a user preference. In one example, a user preferences for a user account may indicate whether the user associated with the user account desires to reveal a mobile telephone number. In another example, a user may be prompted when sending a reply to an instant message that has been forwarded to determine whether the mobile telephone number is to be revealed in the reply. When the user wishes to reveal the mobile telephone number, the source indicator of the reply instant message indicates the mobile telephone number to which the original instant message was forwarded and from which the reply message originated. This may be accomplished by using the destination mobile telephone number in the message session entry as the source indicator of the reply instant message. Alternatively, the source indicator of the reply instant message may correspond to the source address in the reply instant message.

The techniques and concepts of protecting information used to direct messages from being revealed, in a reply message, to a user who is not known to possess that information have been described in the context of forwarding an original instant message to a mobile telephone as a text message. The techniques and concepts may be applicable when a text message that originates from a mobile telephone is forwarded to an instant message service for presentation to an instant message recipient. In such a case, when the original text message identifies a screen name of the instant message recipient, the reply from the instant message service that is presented as a reply text message need not obfuscate the screen name of the reply sender. This is because the original text message identified the screen name and the reply that identifies the same screen name does not reveal information (here, the screen name) to the original sender.

Alternatively, when the original text message identifies a mobile telephone number that is forwarded to an instant message recipient from which a reply is received from the instant message service, the reply text message may obfuscate the screen name of the reply sender. This is because the original text message did not identify the screen name of the reply sender and a reply text message that identified the screen name of the sender of the reply would reveal information (here, the screen name) that the sender of the original text message was not known to possess. The techniques of forwarding electronic messages, particularly those formatted as SMS messages, from a mobile telephone that is enabled with text messaging capability is described in U.S. application Ser. No. 10/723,040, filed Nov. 26, 2003, and titled "Electronic Message Forwarding," which is incorporated by reference.

Although the techniques and concepts often are described above in terms of SMS text messaging, the techniques and concepts may be applied to other types of messages, such as a Multimedia Messaging Services (MMS) message, a video message and an audio message. Similarly, the techniques and concepts have been describe in terms of receiving an instant message is received at desktop computer receive instant messages addressed to the instant message identifier. Other electronic devices configured to receive instant messages may be used, such as a laptop computer, a personal data assistant (PDA) and a telephone receiver.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. As another example, a screen name is used throughout to represent a unique identifier of an account, but any other unique identifier of an account may be used when linking accounts. Accordingly, other implementations are within the scope of the following claims.

The invention claimed is:

1. A method comprising:
receiving a first type of electronic message;
determining that the first type of electronic message is addressed to a telephone number;
identifying, within the received first type of electronic message, a first type of source indicator that indicates a source of the first type of electronic message as an intended destination of a reply message;
identifying a first user account associated with the telephone number;
preparing, using at least one processor, a second type of electronic message based on the content of the first type of electronic message and comprising a second type of source indicator based on the indication of the first type of source indicator;
sending the second type of electronic message to the identified first user account; and
based on determining that the first type electronic message is addressed to the telephone number, and further based on sending the second type of electronic message to the identified first user account associated with the telephone number, generating a reply source indicator for any reply message received from the first user account, wherein the reply source indicator comprises the telephone number.

2. The method of claim 1, further comprising:
generating a message session information entry associated with the first user account; and
assigning the telephone number to the message session information entry.

3. The method of claim 2, further comprising:
identifying a mobile telephone number associated with a sender of the first type of electronic message; and
associating the mobile telephone number with first type of source indicator that indicates the source of the first type of electronic message.

4. The method of claim 2, further comprising selecting the telephone number from a pool of telephone numbers.

5. The method of claim 4, wherein the telephone number comprises a temporary telephone number.

6. The method of claim 4, wherein the telephone number comprises a short code.

7. The method of claim 1, further comprising:
identifying a second user account associated with a sender of the first type of electronic message;
in response to determining that the second user account indicates to hide the first type of source indicator, sending the second type of electronic message with a surrogate source indicator as the second type of source indicator and that indicates an original intended destination of the first type of electronic message; and
in response to determining that the second user account does not indicate to hide the first type of source indicator, sending the second type of electronic message with the second type of source indicator that is not a surrogate source indicator.

8. A method comprising:
receiving, from a first client device associated with a mobile telephone number, a first type of electronic message;

determining that the first type of electronic message is addressed to a telephone number associated with a first user account;

identifying, within the received first type of electronic message, a first type of source indicator that indicates a source of the first type of electronic message as an intended destination of a reply message;

identifying a second user account associated with the mobile telephone number;

preparing, using at least one processor, a second type of electronic message based on content of the first type of electronic message and comprising a second type of source indicator based on the indication of the first type of source indicator;

sending, from the identified second user account, the second type of electronic message to the first user account; and based on determining that the first type electronic message is addressed to the telephone number, and further based on sending the second type of electronic message to the first user account, generating a reply source indicator for any reply message received from the first user account, wherein the reply source indicator comprises the telephone number.

9. The method of claim 8, further comprising:
identifying a set of computing devices at which the first user account is active;
identifying a second client device from the identified set of computing devices; and
determining that the second client device is available to receive the second type of electronic message.

10. The method of claim 9, further comprising determining that the first user account was active most recently at the second client device.

11. The method of claim 9, further comprising determining that the first user account was active first at the second client device.

12. The method of claim 9, wherein the second client device comprises a mobile telephone.

13. The method of claim 8, further comprising:
in response to determining that the second user account indicates to hide the first type of source indicator, sending the second type of electronic message with a surrogate source indicator as the second type of source indicator and that indicates the original intended destination of the first type of electronic message; and
in response to determining that the second user account does not indicate to hide the first type of source indicator, sending the second type of electronic message with the second type of source indicator that is not a surrogate source indicator.

14. The method of claim 13, wherein the second type of source indicator comprises a username associated with the second user account and the surrogate source indicator comprises the mobile telephone number associated with the second user account.

15. A system comprising:
at least one processor; and
at least one non-transitory computer readable storage medium storing instructions thereon that, when executed by the at least one processor, cause the system to:
receive a first type of electronic message;
determine that the first type of electronic message is addressed to a telephone number;
identify, within the received first type of electronic message, a first type of source indicator that indicates a source of the first type of electronic message as an intended destination of a reply message;
identify a first user account associated with the telephone number;
prepare a second type of electronic message based on the content of the first type of electronic message and comprising a second type of source indicator based on the indication of the first type of source indicator;
send the second type of electronic message to the identified first user account; and
based on determining that the first type electronic message is addressed to the telephone number, and further based on sending the second type of electronic message to the identified first user account associated with the telephone number, generate a reply source indicator for any reply message received from the first user account, wherein the reply source indicator comprises the telephone number.

16. The system of claim 15, further comprising instructions that, when executed by the at least one processor, cause the system to:
identify a mobile device at which the first user account is active; and
determine that the mobile device is available to receive the second type of electronic message.

17. The system of claim 16, further comprising instructions that, when executed by the at least one processor, cause the system to determine that the first user account was active most recently at the mobile device.

18. The system of claim 17, further comprising instructions that, when executed by the at least one processor, cause the system to determine that the first user account is signed in to a communications system through the mobile device.

19. The system of claim 15, further comprising instructions that, when executed by the at least one processor, cause the system to:
identify a second user account associated with a sender of the first type of electronic message;
in response to determining that the second user account indicates to hide the first type of source indicator, send the second type of electronic message with a surrogate source indicator as the second type of source indicator and that indicates an original intended destination of the first type of electronic message; and
in response to determining that the second user account does not indicate to hide the first type of source indicators, send the second type of electronic message with the second type of source indicator that is not a surrogate source indicator.

20. The system of claim 19, further comprising instructions that, when executed by the at least one processor, cause the system to:
receive an indication of whether to hide a reply source indicator for a reply electronic message sent by the second user account; and
associate the indication of whether to hide the reply source indicator with the second user account.

* * * * *